United States Patent [19]

Thompson et al.

[11] Patent Number: 5,091,938
[45] Date of Patent: Feb. 25, 1992

[54] SYSTEM AND METHOD FOR TRANSMITTING ENTERTAINMENT INFORMATION TO AUTHORIZED ONES OF PLURAL RECEIVERS

[75] Inventors: John R. Thompson, La Quinta; C. J. Hunting, Altadena; William L. Phipps, Bermuda Dunes; Steven J. Raynesford, Cathedral City, all of Calif.; Philip H. Rittmueller, St. Charles, Ill.

[73] Assignee: NEC Home Electronics, Ltd., Osaka, Japan

[21] Appl. No.: 563,165

[22] Filed: Aug. 6, 1990

[51] Int. Cl.⁵ .................. H04L 9/02; H04N 7/167
[52] U.S. Cl. ............................. 380/21; 380/10; 380/28; 380/47; 380/45
[58] Field of Search ............... 380/10, 21, 28, 47, 380/45

[56] References Cited

U.S. PATENT DOCUMENTS

| 4,222,068 | 9/1980 | Thompson et al. | |
|---|---|---|---|
| 4,278,837 | 7/1981 | Best | 380/4 |
| 4,396,947 | 8/1983 | Cheung . | |
| 4,527,195 | 7/1985 | Cheung . | |
| 4,700,388 | 10/1987 | Okada et al. | 380/10 |
| 4,716,588 | 12/1987 | Thompson et al. . | |
| 4,771,458 | 9/1988 | Citta et al. | 380/21 |
| 4,890,320 | 12/1989 | Monslow | 380/10 |
| 4,965,804 | 10/1990 | Trbovich et al. | 380/21 |
| 4,972,472 | 11/1990 | Brown et al. | 380/21 |

OTHER PUBLICATIONS

T. Yoshino et al., "Sound Transmission Systems for Direct Broadcasting Satellites: PCM Sound Broadcasting in Direct Broadcasting Satellite", AES 3rd International Conference, (1985), pp. 95–99.

H. Ukai, "Sound PCM Decoder LSI's For Japanese DBS", IEEE International Conference On Consumer Electronics, (1984), pp. 166–167.

Primary Examiner—Stephen C. Buczinski
Attorney, Agent, or Firm—Guy W. Shoup; Brian D. Ogonowsky

[57] ABSTRACT

An audiovisual subscription system includes means for aperiodically inverting the lines of a transmitted video signal on a frame-by-frame basis and for decrypting encrypted PCM audio information which is transmitted along with the aperiodically inverted video information.

11 Claims, 44 Drawing Sheets

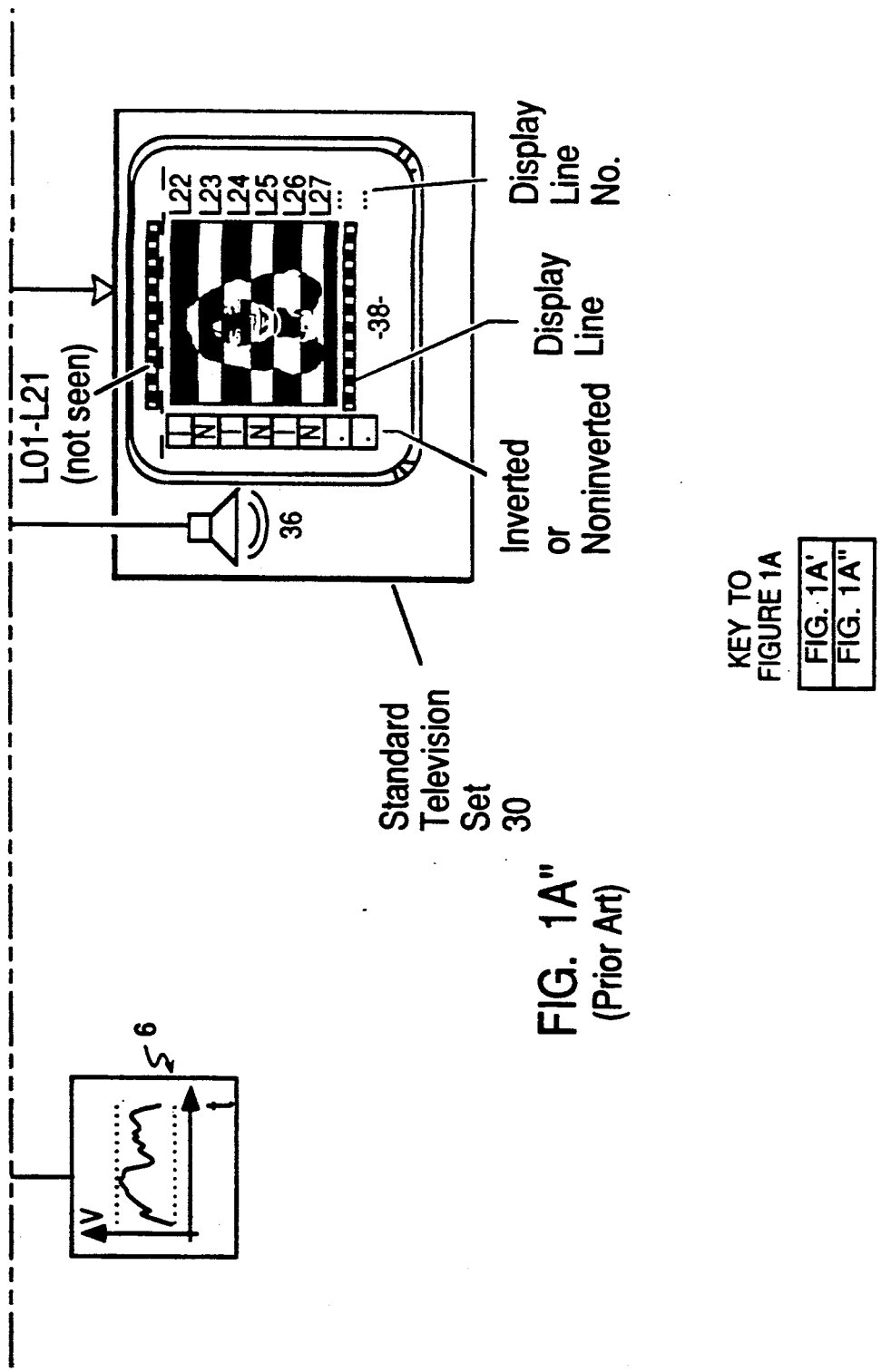

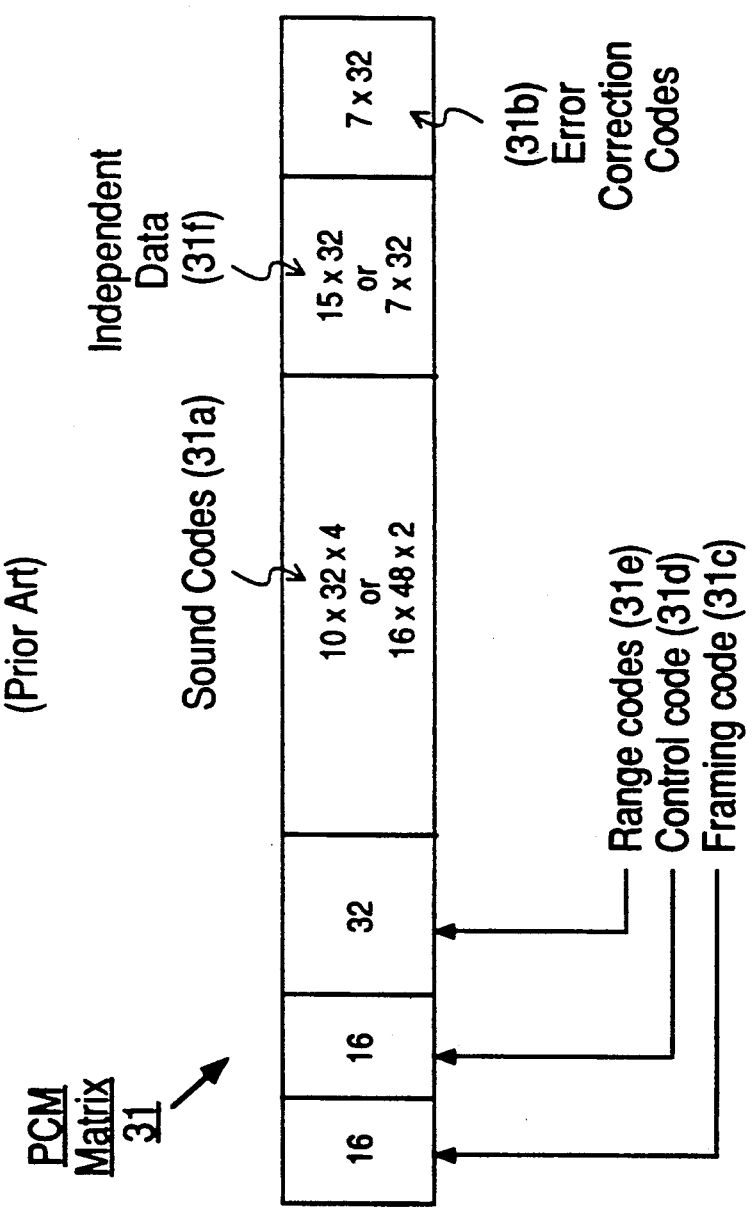

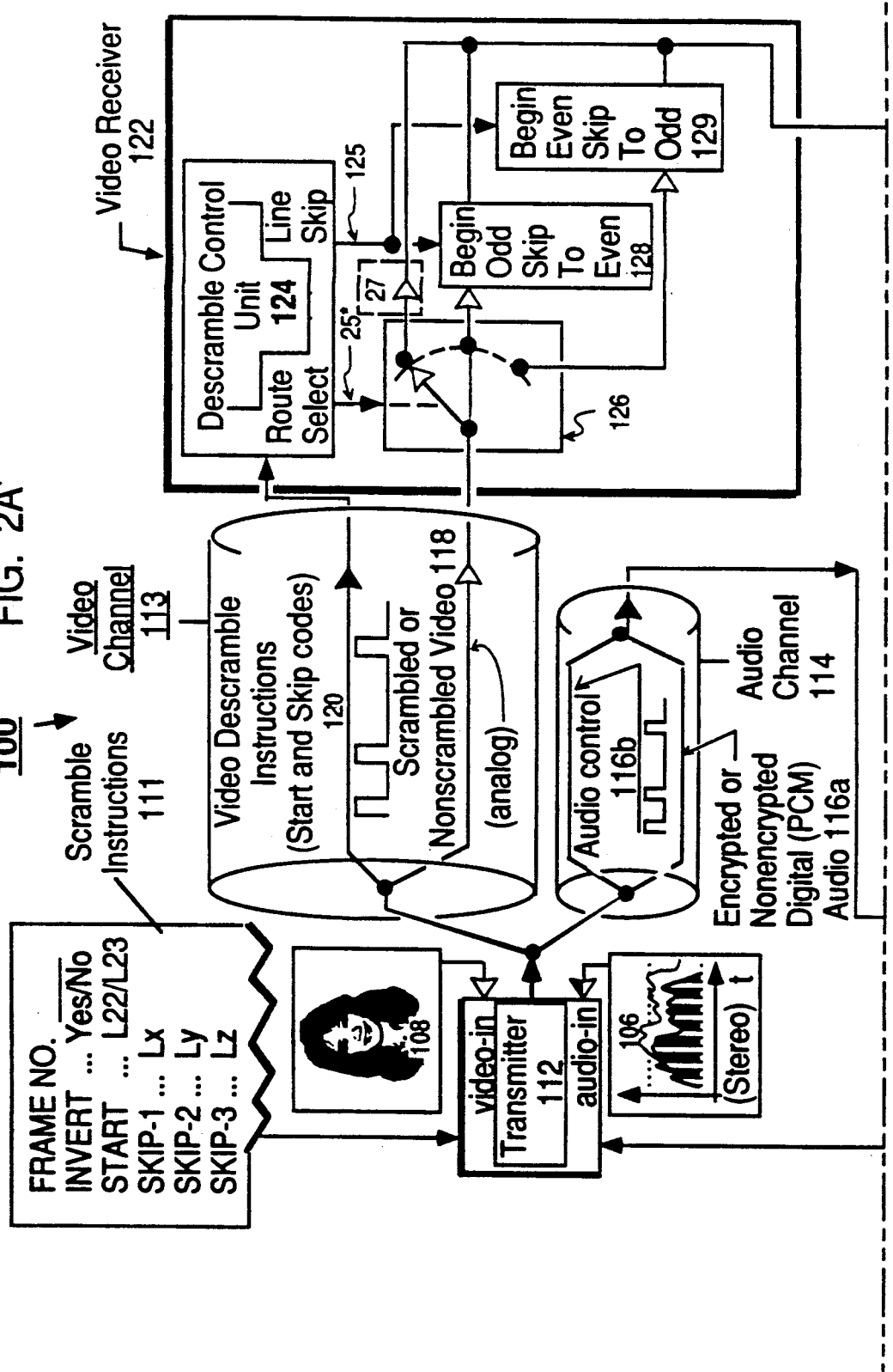

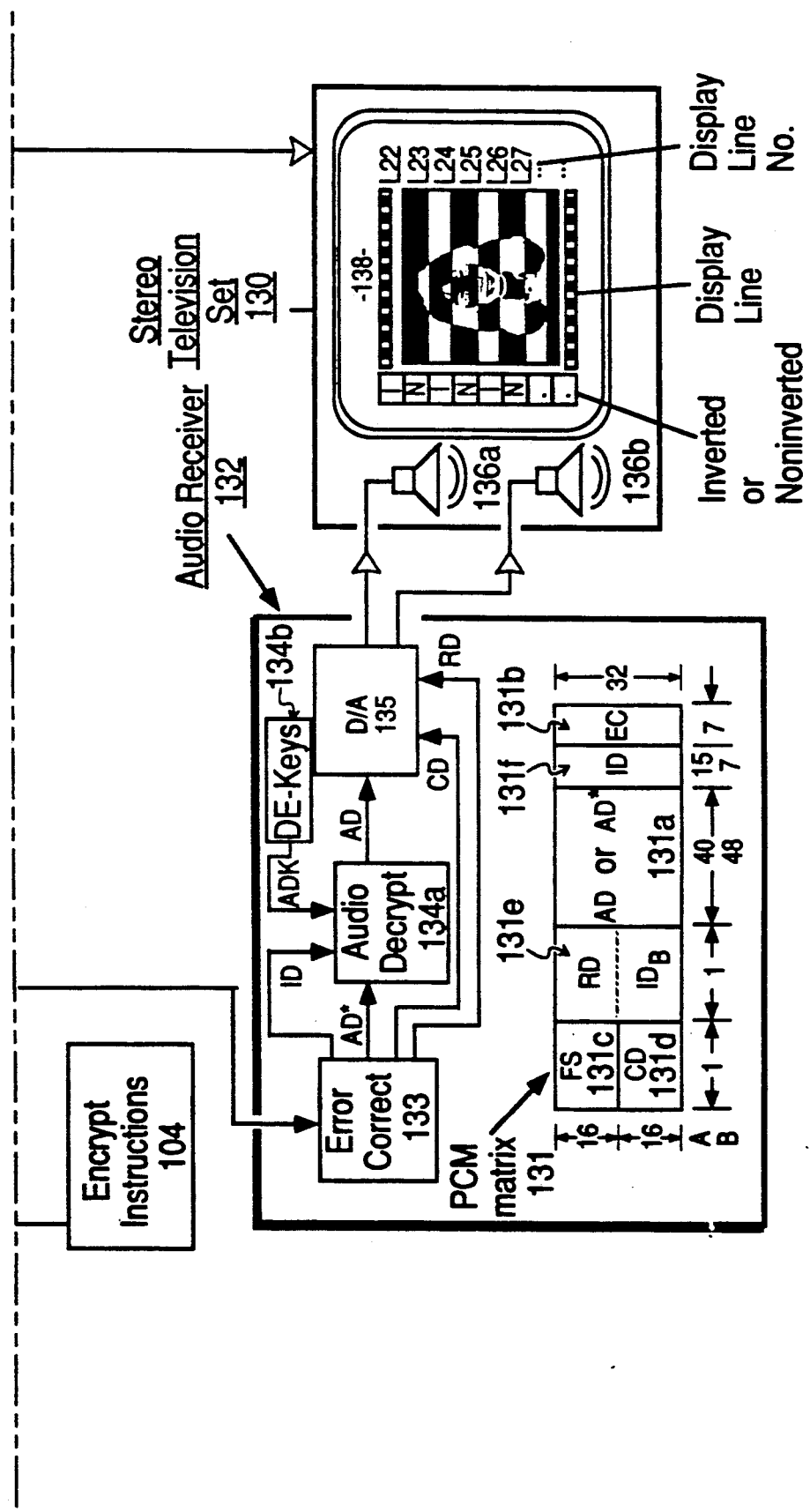

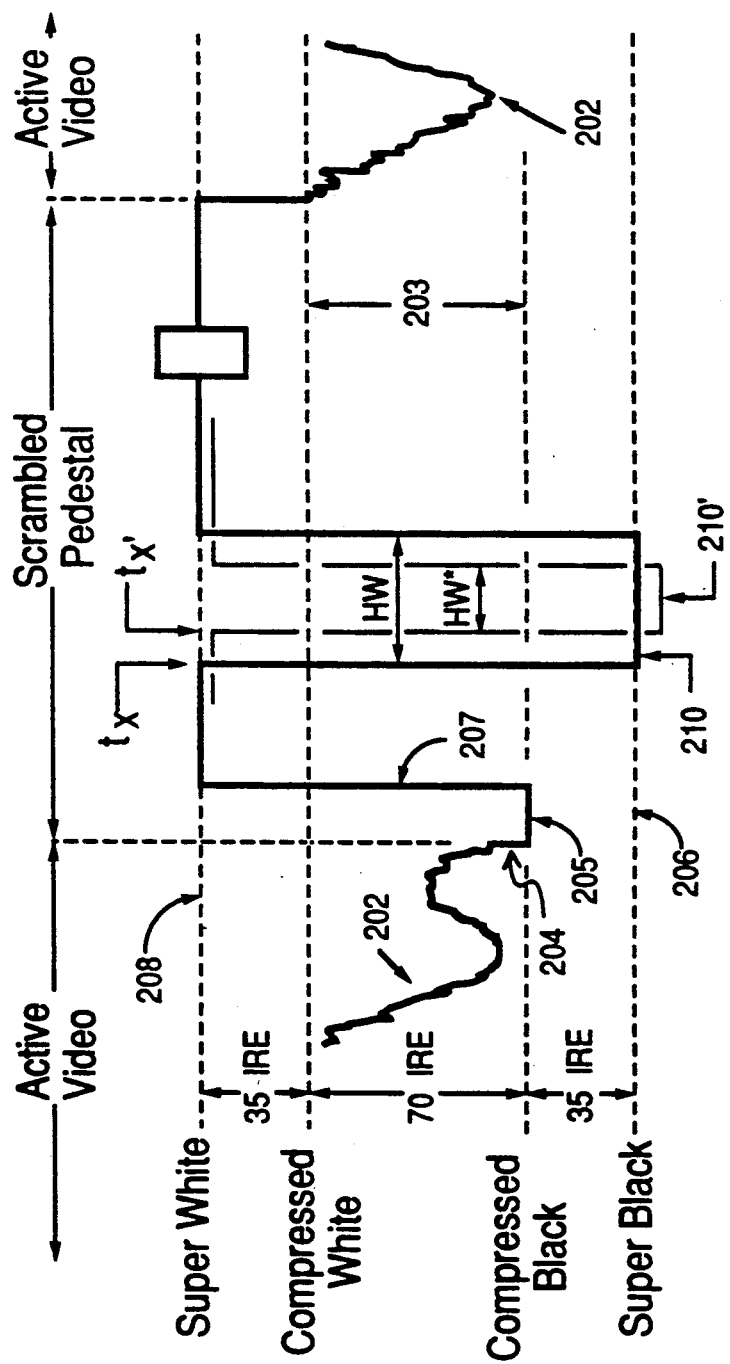

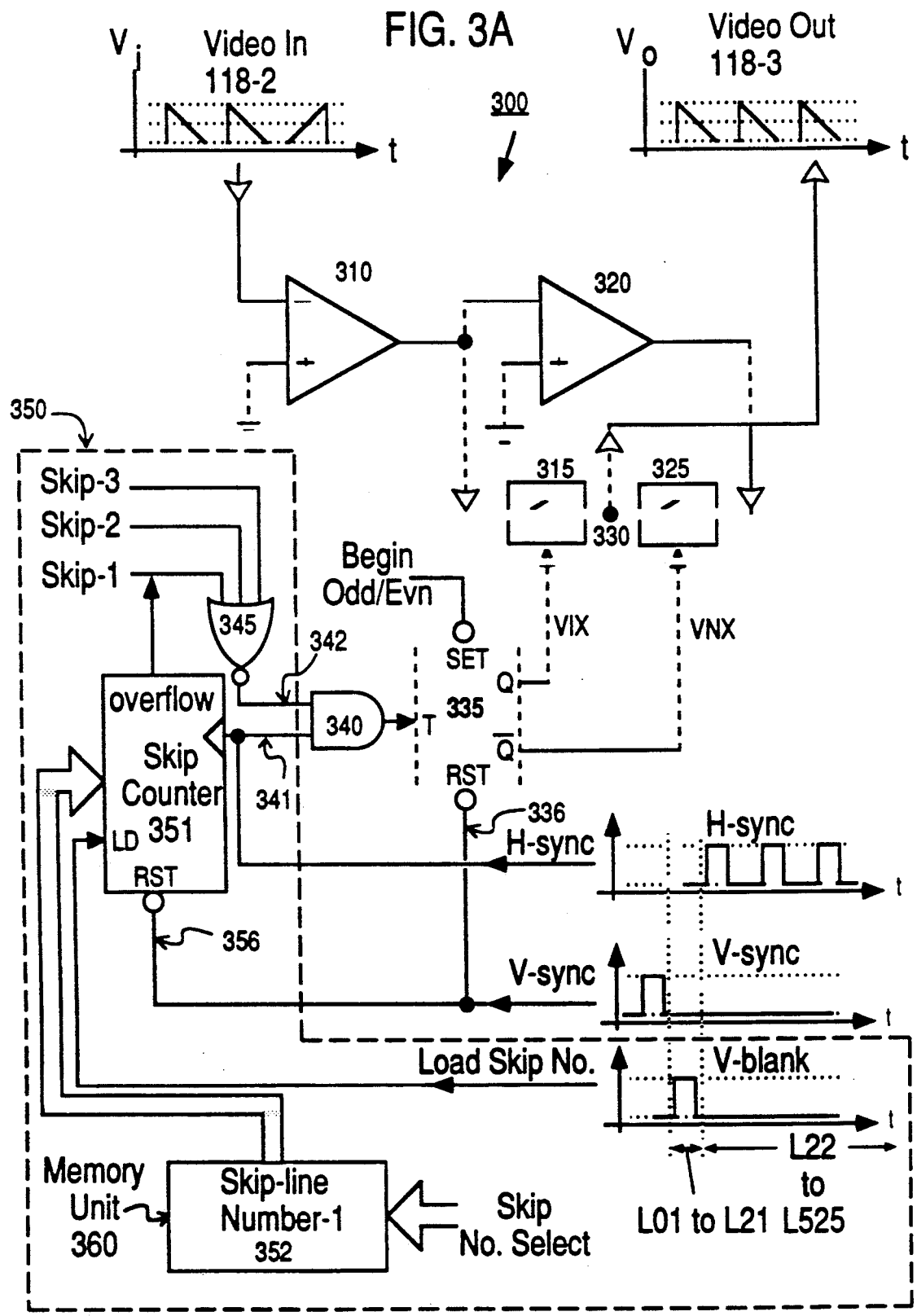

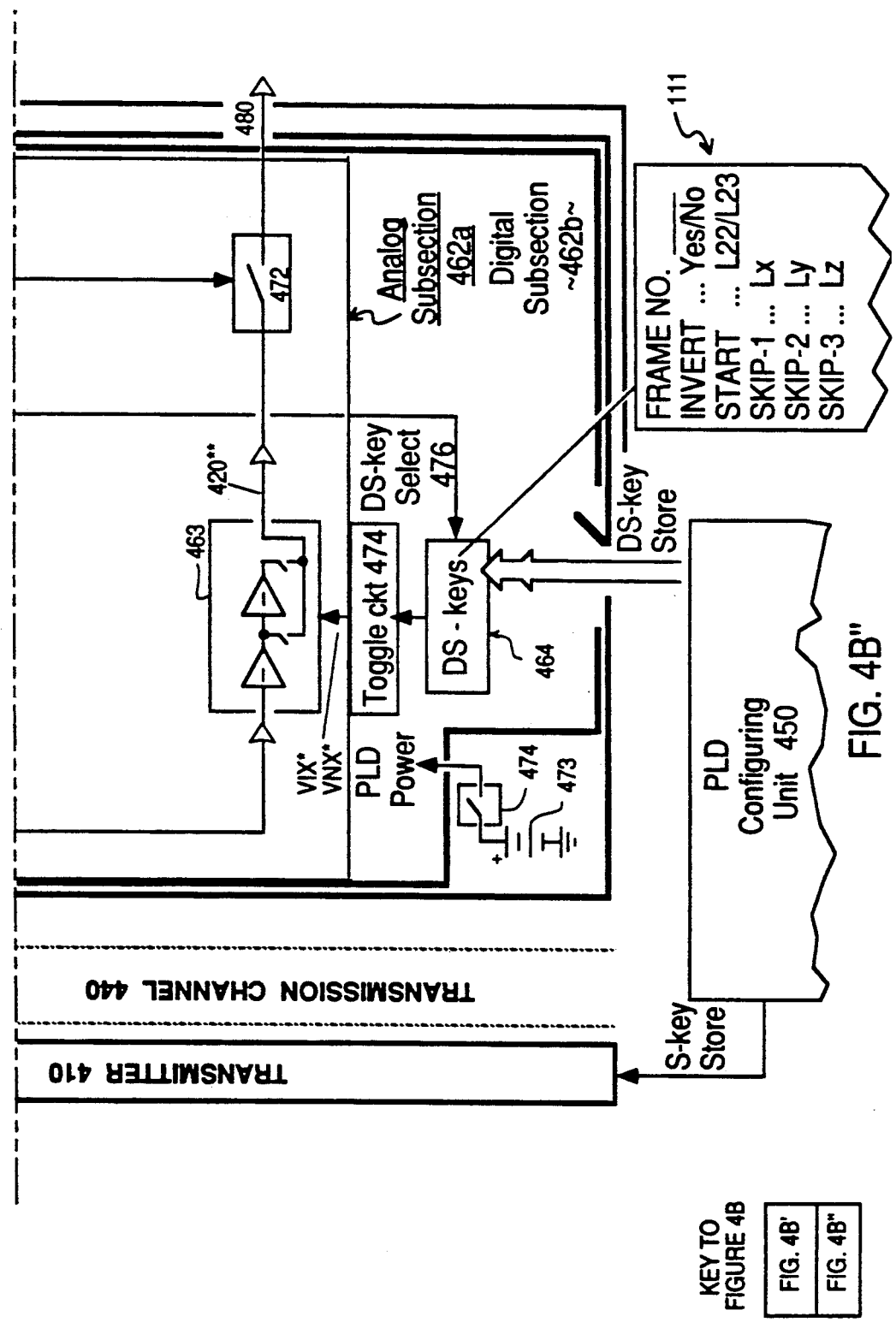

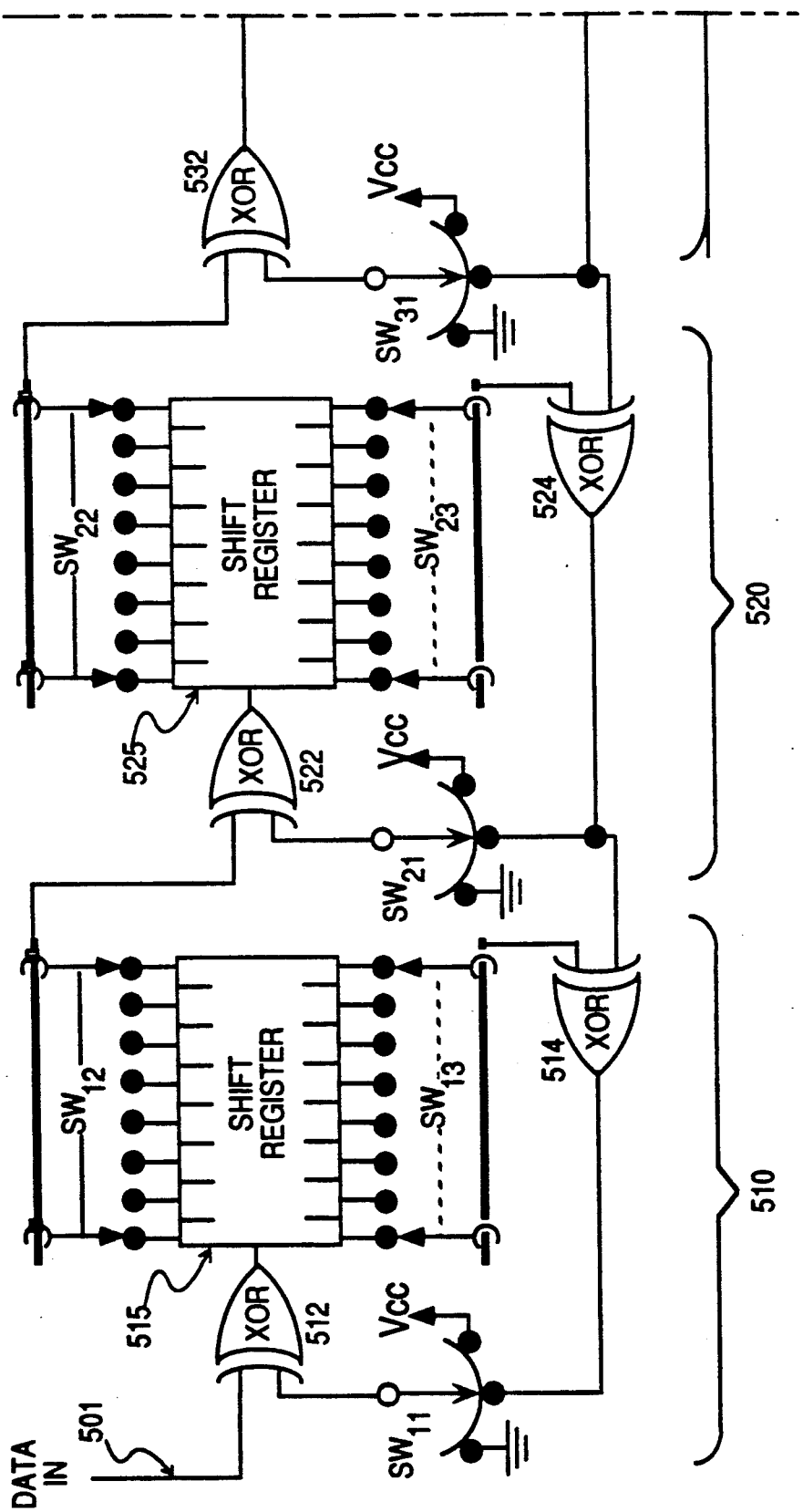

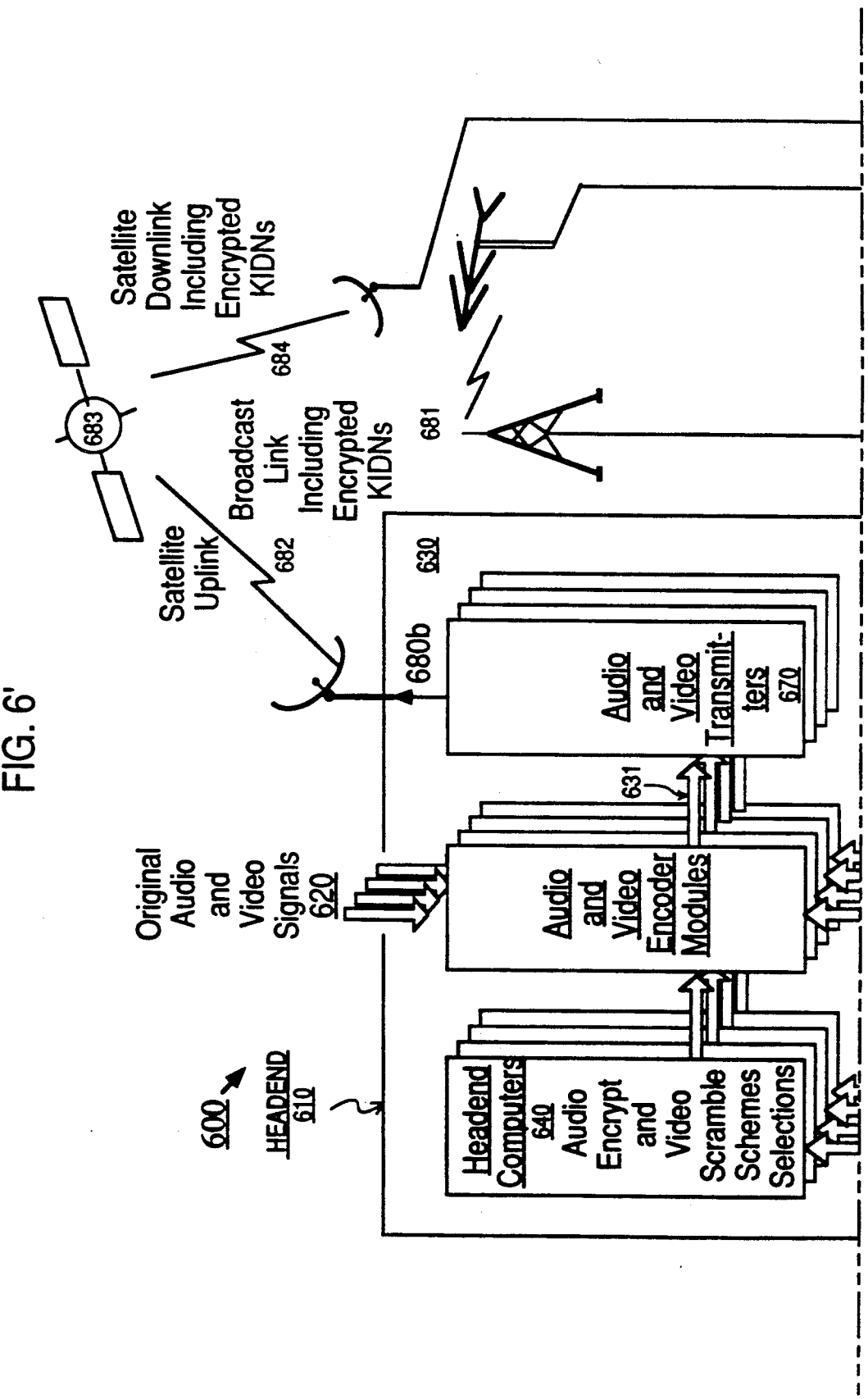

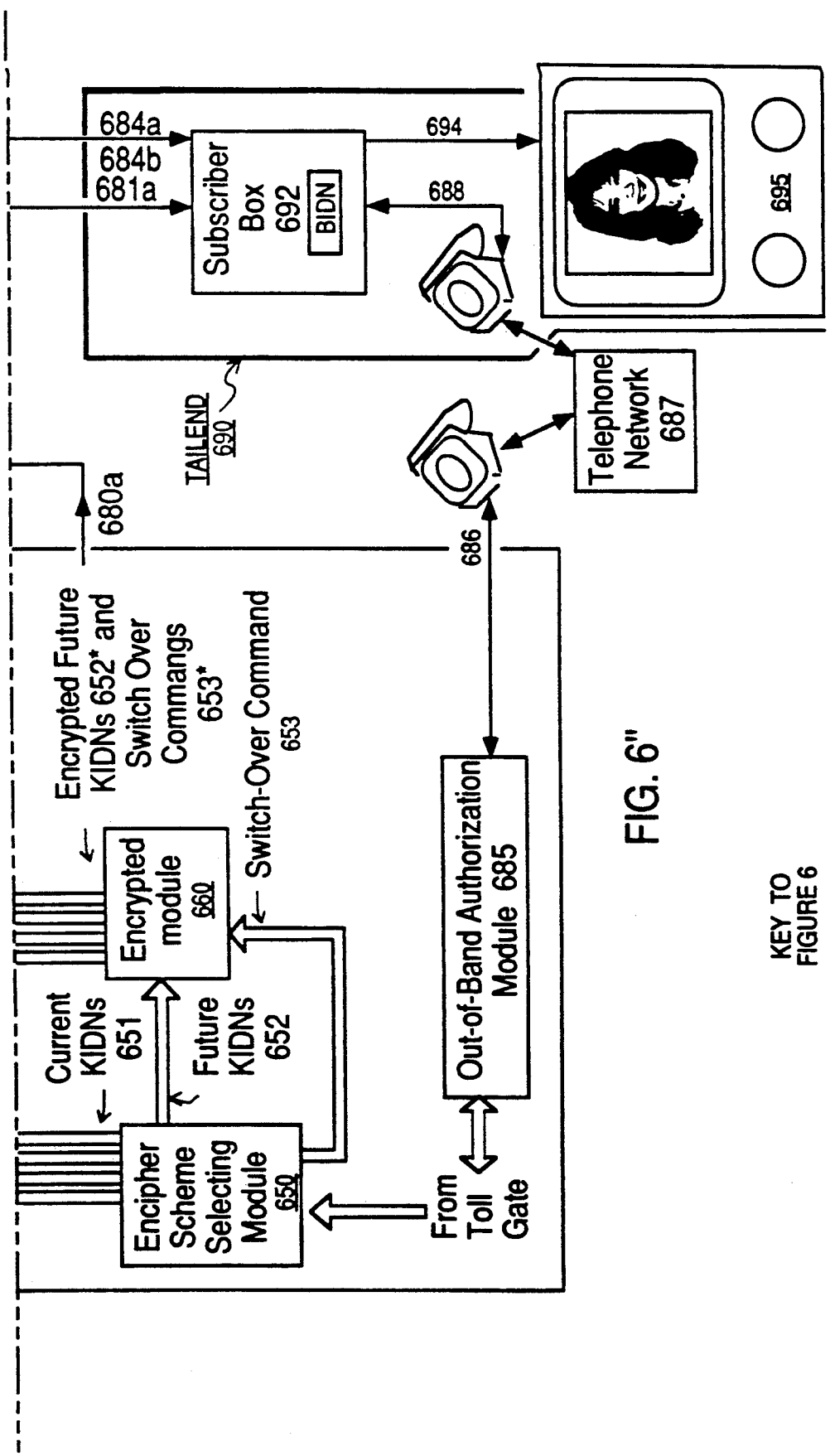
FIG. 6"

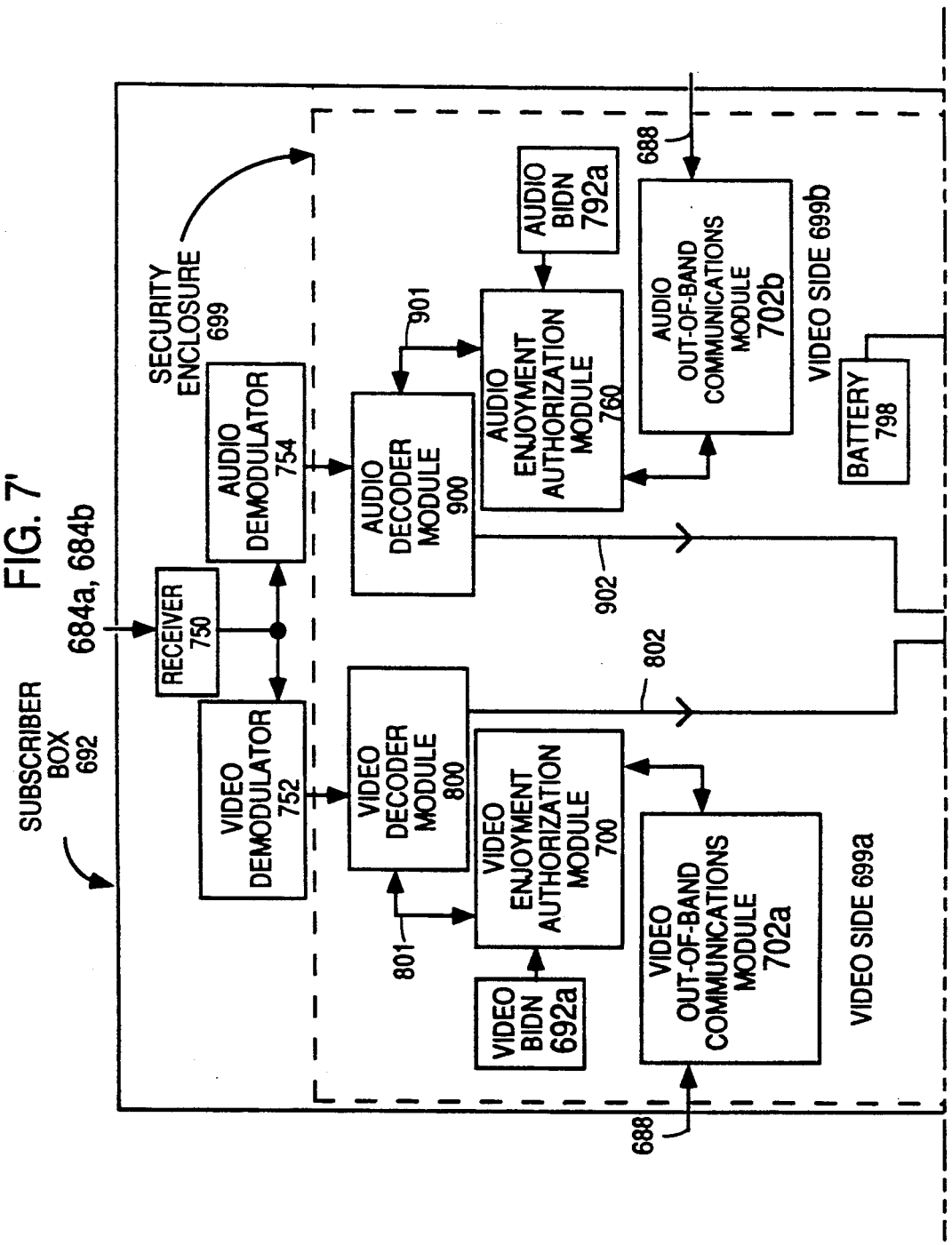

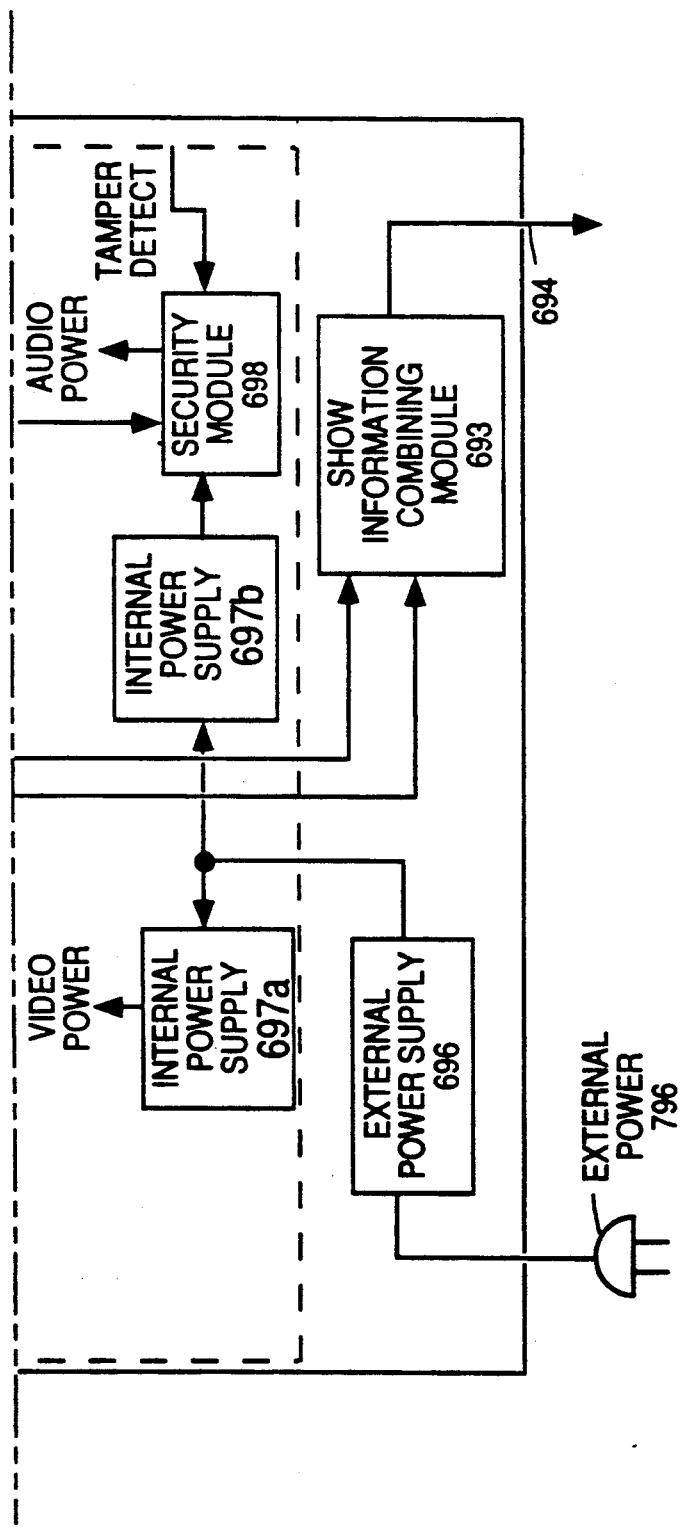
FIG. 7"

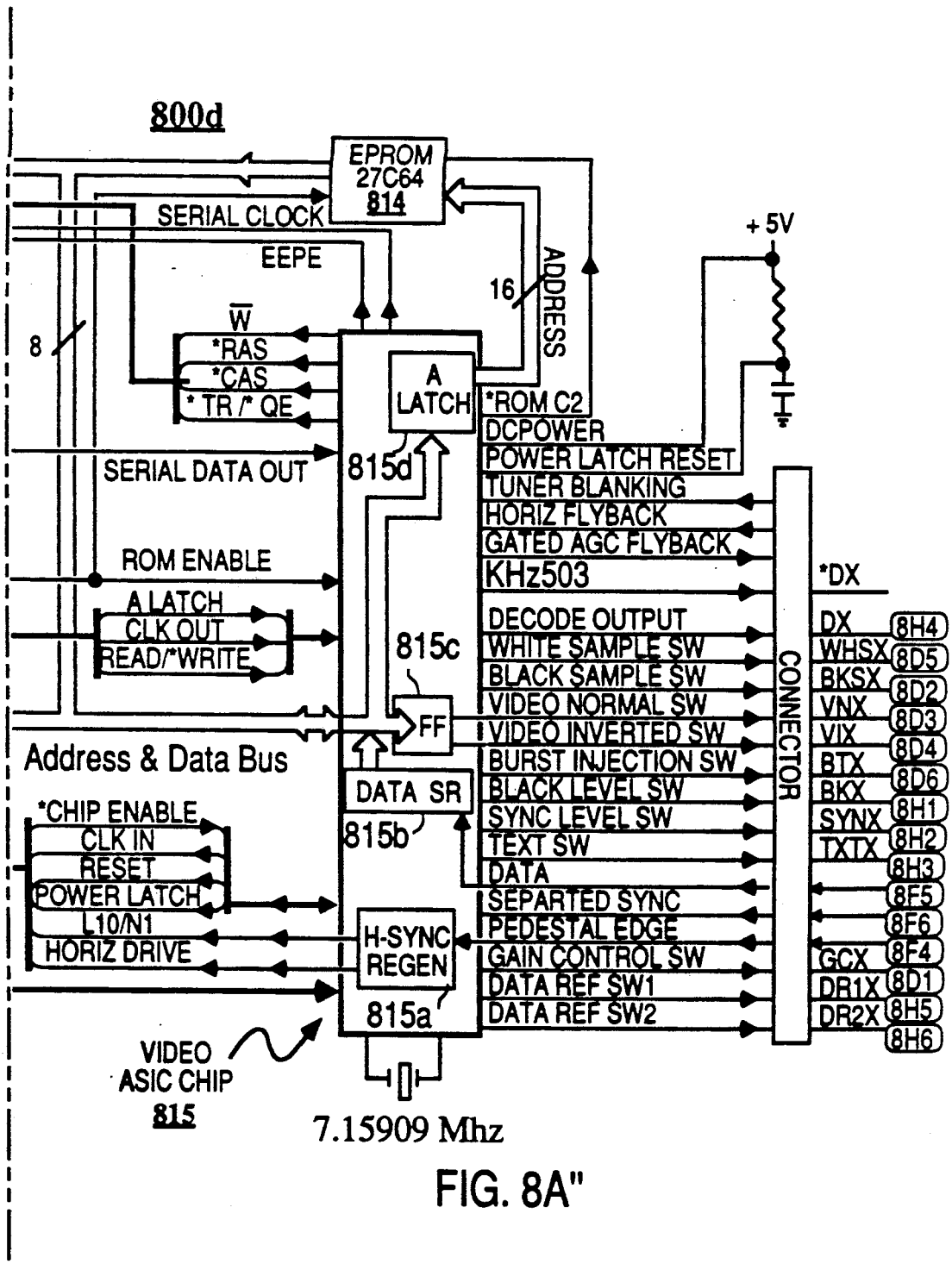
FIG. 8A"

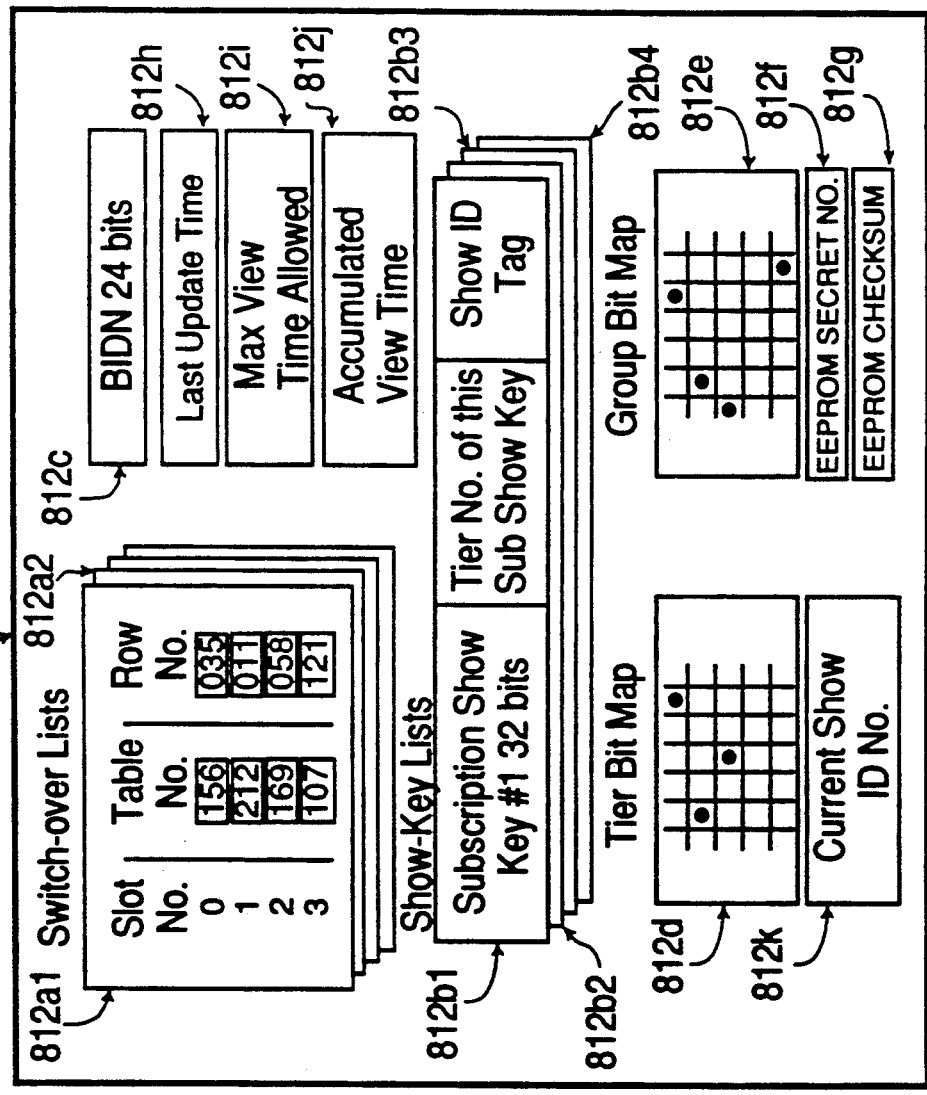

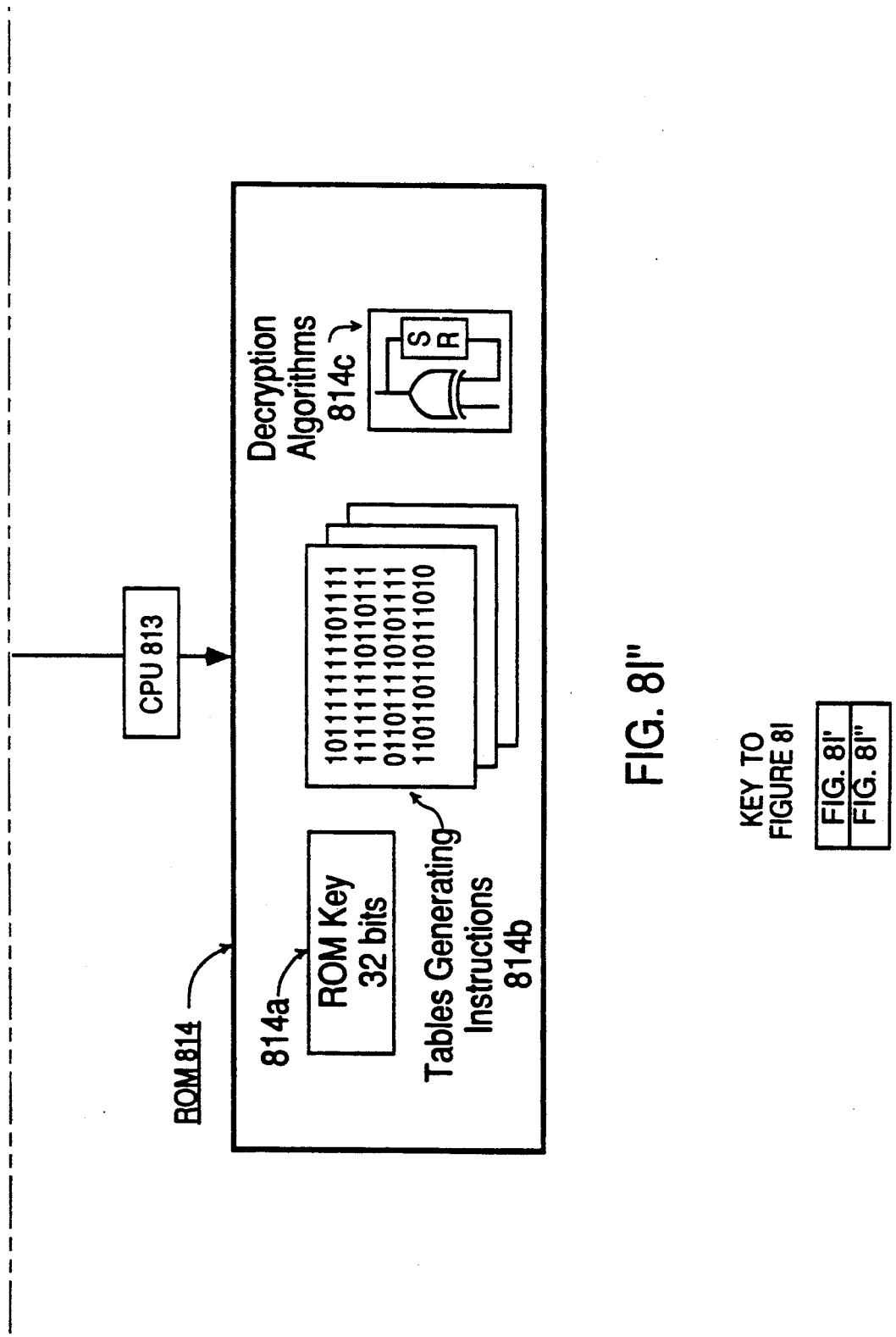
FIG. 8I"
KEY TO FIGURE 8I
| FIG. 8I' |
|----------|
| FIG. 8I" |

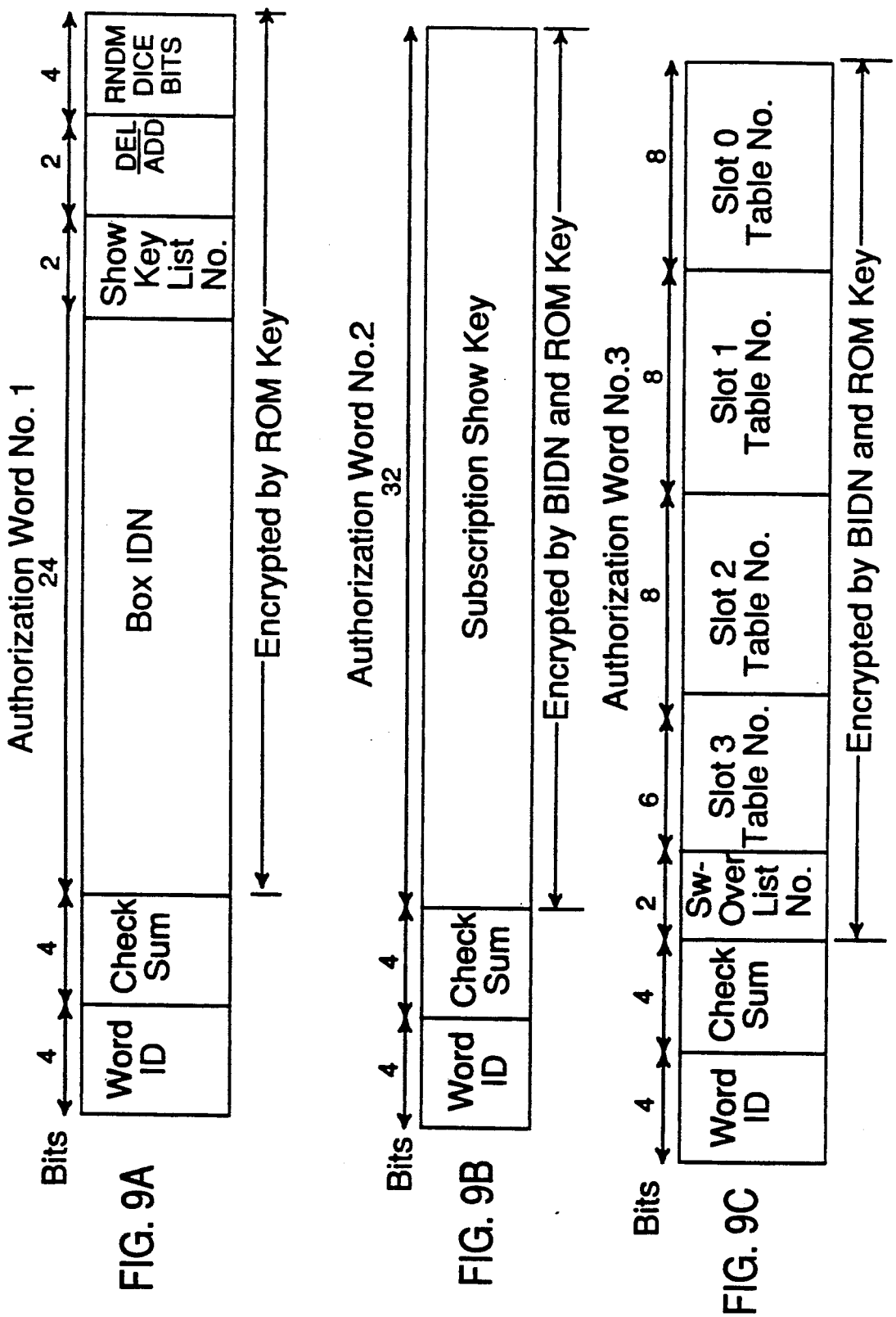

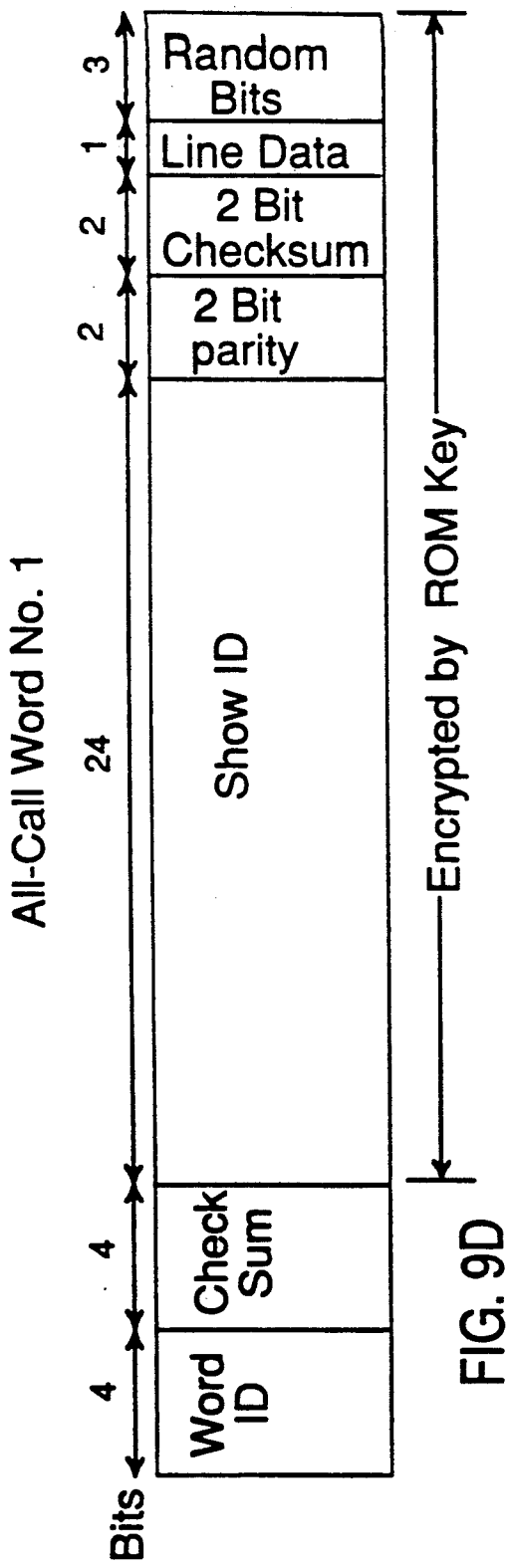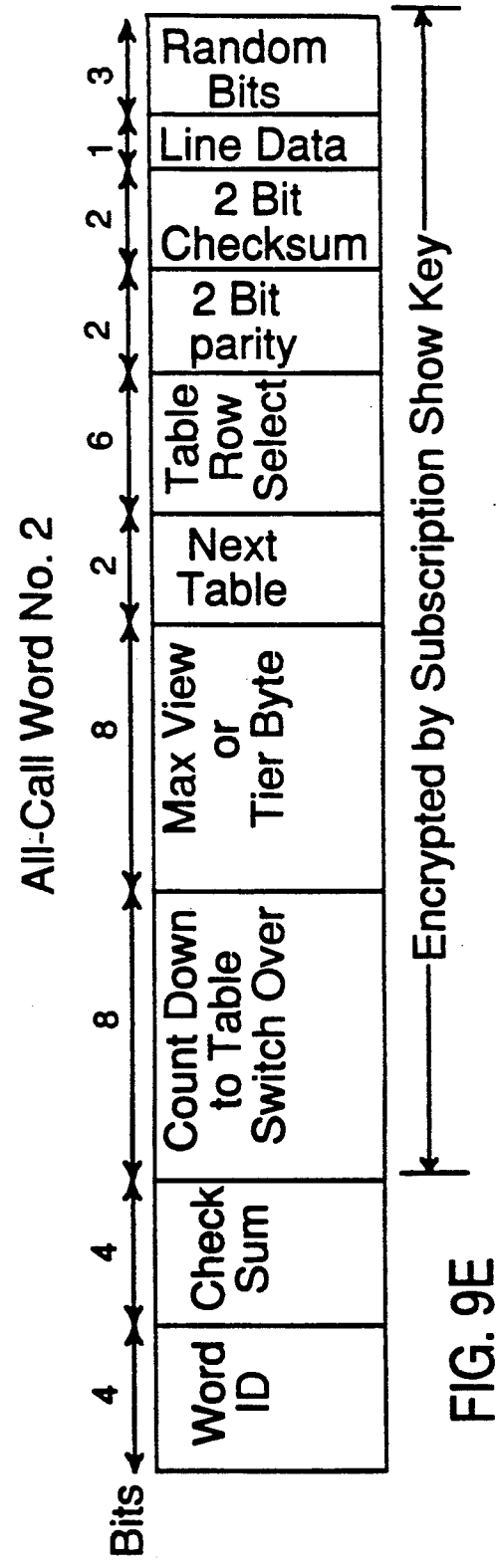

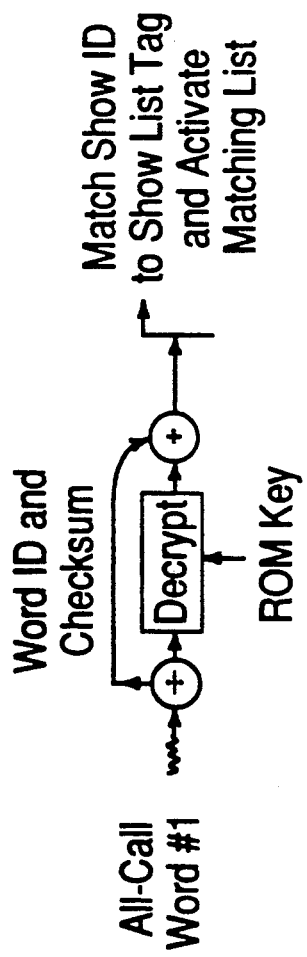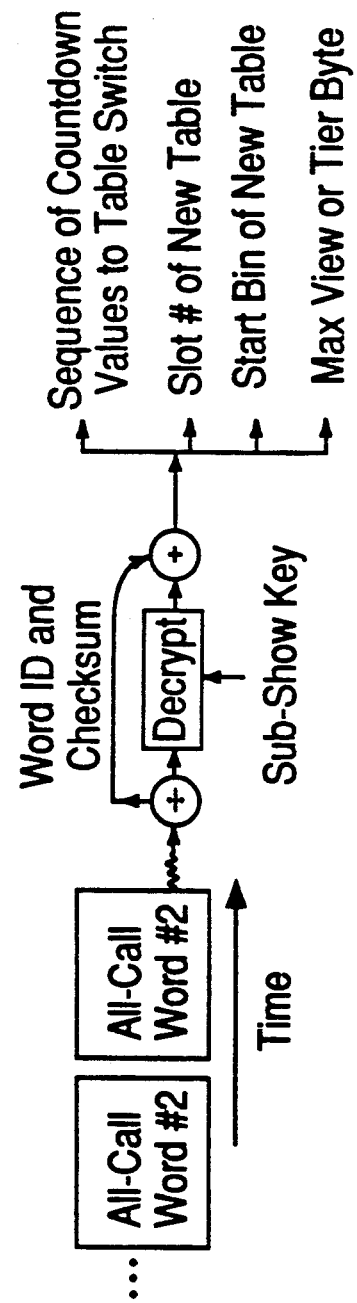

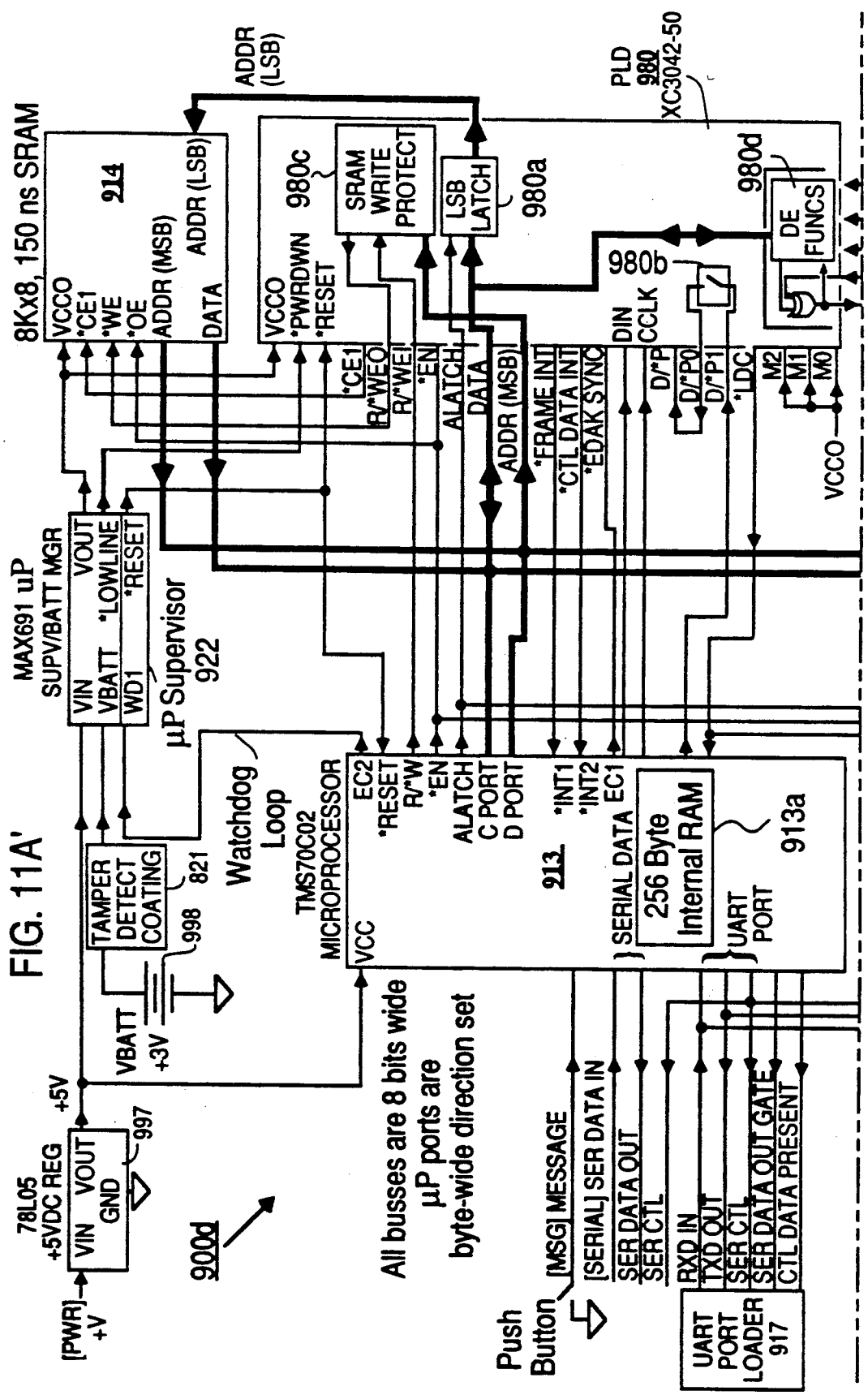

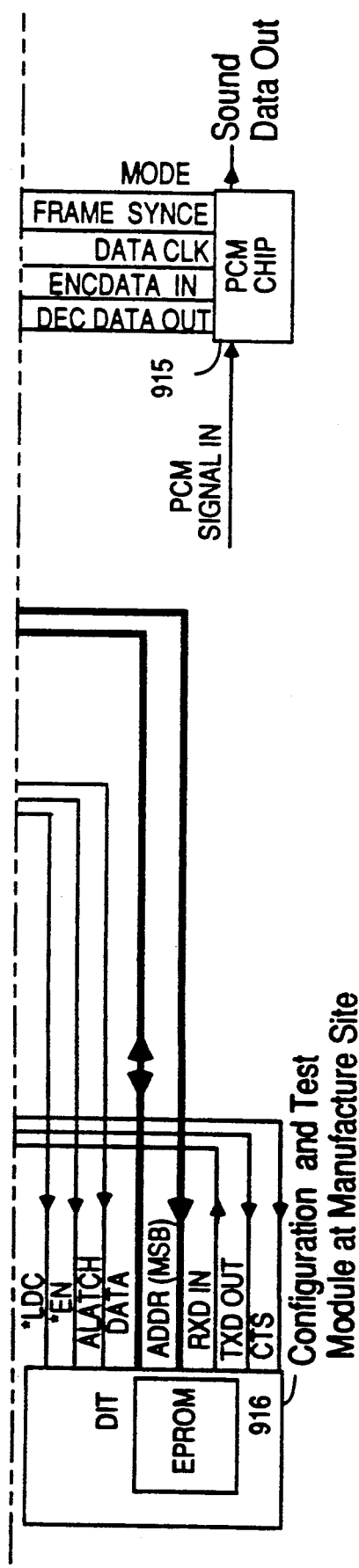
FIG. 11A"
KEY TO FIGURE 11A
| FIG. 11A' | FIG. 11A" |

SYSTEM AND METHOD FOR TRANSMITTING ENTERTAINMENT INFORMATION TO AUTHORIZED ONES OF PLURAL RECEIVERS

BACKGROUND OF THE INVENTION

1. Cross Reference To Microfiche Appendix

This application includes a plurality of computer program listings in the form of Microfiche Appendices A, B and C which are being filed concurrently herewith respectively as 137, 108 and 14 frames (not counting target and title frames) respectively distributed over 2, 2 and 1 sheets of microfiche in accordance with 37 C.F.R. §1.96. The disclosures of these appendices are incorporated into this specification by reference. It should be noted that the disclosed source code in these appendices and the object code which results from compilation of the source code and any other expression appearing in the listings or derived therefrom are subject to copyright protection. The copyright owner has no objection to the facsimile reproduction by anyone of the patent document (or the patent disclosure as it appears in the files or records of the U.S. Patent and Trademark Office) for the sole purpose of studying the disclosure to understand the invention but otherwise reserves all other rights to the disclosed computer listings including the right to reproduce said computer programs in machine executable form and/or transform them into machine-executable code.

2. Field of the Invention

The present invention is generally related to subscription entertainment systems such as pay-for-view television and more specifically to methods and systems for scrambling and descrambling entertainment information in a manner which substantially prevents receivers from obtaining entertainment value from transmissions which they are not authorized to enjoy.

3. Description of the Relevant Art

A method for scrambling the video content of a television signal is disclosed in U.S. Pat. No. 4,716,588, issued Dec. 29, 1987, to Thompson et al. under the title "Addressable Subscription Television System Having Multiple Scrambling Modes". The disclosure of this previous patent (Thompson '588) is incorporated herein by reference and its detailed disclosure will not be repeated here.

According to the Thompson '588 patent, video entertainment information may be transmitted in one of three modes. It can be transmitted either in (1) a straight forward nonscrambled mode (i.e., standard NTSC format), in (2) a first scrambled mode wherein the video signal content of all odd-numbered display lines in each frame are inverted while remaining lines are noninverted, or in (3) a second scrambled mode wherein the video signal content of all even-numbered display lines in each frame are inverted while remaining display lines are noninverted. Descramble instructions are sent to a descrambling receiver unit at a subscriber location for switching the descrambling unit among three corresponding and complementary receiving modes, namely, (1) forwarding received video signals straight through to a standard television set without additional processing, (2) descrambling a received video signal by inverting the video content of all odd-numbered video display lines in each frame while leaving remaining display lines of the frame in their received form and (3) descrambling the video content of a received signal by inverting all even-numbered display lines in each frame while leaving remaining display lines of the frame in their received form. The descramble instructions are digitally represented by pulses in the top 20 horizontal lines of each video frame. These top 20 horizontal lines constitute the nonviewable vertical blanking interval of a standard television display frame and accordingly, the typical viewer is left unaware of the presence of the descramble instructions.

While this technique may prevent novice viewers from obtaining unauthorized entertainment value out of transmissions, it is not difficult for sophisticated viewers to determine on a frame by frame basis whether or not line inversion is taking place and to further determine by-guessing, whether inversion begins at the first odd or first even numbered display line of each frame. Because frames are presented at a relatively slow rate (i.e., 60 frames per second), and because the audio portion of a television show is not scrambled, it can become relatively simple for sophisticated viewers to construct unauthorized devices for descrambling television signals which they are not authorized to enjoy. A more secure method for transmitting entertainment information and permitting only authorized viewers/listeners to obtain enjoyment from the same is needed in the industry.

Numerous alternate techniques have been proposed for preventing unauthorized program enjoyment. Included among these are a line chopping technique disclosed in U.S. Pat. No. 4,396,947, issued Aug. 2, 1983, to Chung, "Apparatus For Encoding of Information" and a so-called "line-cut and rotate" method proposed by Thompson S. A. and NewsData Security Products Ltd. These proposed methods suffer from design complexity and unreliability, especially when noise is present in the signal transmission channel.

SUMMARY OF THE INVENTION

It is an object of the present invention to provide an improved scrambling system and one or more methods for making it difficult for unauthorized receivers to obtain enjoyment value out of prescrambled entertainment signals.

In accordance with a first aspect of the invention, alternate horizontal lines in a single frame of a television signal are inverted, but at least one skip is made in the alternation process at one or more predetermined lines of a frame so that the invert/don't-invert alternation process is not entirely periodic across the frame. If odd-numbered lines are being first inverted above a preselected skip line, even-numbered lines will be inverted below the preselected skip line and remaining horizontal lines will stay in the noninverted, normal mode. To fully descramble such a nonperiodic frame without knowledge of the scrambling process, one must guess for each frame not only whether inversion begins at an odd or even line number (a 1 out of 2 guess) but also one must guess the line numbers of the specific line or lines among the N viewable lines in the frame where the skip occurs (a 1 out of N guess). The combined probability of guessing right is reduced from 50% per frame to approximately ($\frac{1}{2}$)(1/N) per frame or less depending on the number of skips allowed in each frame. Thus it becomes more difficult to descramble the picture information simply with guess-work.

Descrambling instructions may be sent to a descrambling unit in accordance with the invention over a nonsecured channel. The descramble instructions are in the form of digital information bits which indicate whether alternate inversion is to be used and if so, whether it should begin at the first odd or even numbered viewable line of a frame. The descramble instructions also include digital information for determining one or more line numbers at which the alternation process is to be skipped.

In accordance with a second aspect of the invention, the descramble instructions are encrypted using a preselected encryption key and a preselected data encryption circuit (or algorithm) so that even when there is a sophisticated user who can intercept and decipher the descramble instructions in their unencrypted form, such a user is faced with the further barrier of decrypting the encrypted instructions prior to being able to use them. A complementary data decryption circuit is defined in a tamper-resistant memory means such as, for example, a volatile-type configurable logic array and this decryption circuit is used in conjunction with a complement of the encryption key to decrypt the encrypted descrambling instructions before coupling them to a descrambling unit contained within a subscriber box (receiver unit). If someone attempts to separate the memory means from its power source or to otherwise tamper with the descrambling unit in order to copy its configuration, the configuration data is destroyed.

In accordance with a third aspect of the invention, a plurality of show descrambling keys are stored in an externally non-readable memory portion of the descrambling unit. The show descrambling keys are used in conjunction with a show signal descrambling means of the descrambling unit for descrambling show information. A preselected one of the show descrambling keys is selected in accordance with decrypted descrambling instructions provided by the decrypting means of the receiver unit. The selected descrambling key is used by the descrambling means to correctly descramble show information that the viewer is authorized to enjoy. If the secrecy of some descramble keys is compromised, a headend control system at the transmission site is given the option of switching to others of multiple descramble keys stored in the externally non-readable memory of the descramble unit.

In accordance with yet another aspect of the invention, an authorization signal is encrypted and superposed over the vertical blanking interval of a television frame along with the encrypted descrambling instructions. The authorization signal includes group assignment data for assigning one or more individual subscriber boxes to one or more number-identified groups. The authorization signal further includes group authorization data for enabling subscriber boxes belonging to a prespecified one or more groups to descramble show information belonging to one or more prespecified tiers of show enjoyment (i.e., standard channels plus bonus channels). If an individual subscriber box is assigned to a group which is authorized to enjoy show information belonging to one or more enjoyment tiers, a local authorization unit within that individual subscriber box, which is responsive to the authorization signal, enables that subscriber box to descramble the corresponding show information. The authorization signal may be used to remotely switch the group assignments and enjoyment entitlements of individual boxes as desired.

Yet another aspect of the invention is to use an out-of-band link such as a telephone network for exchanging encrypted or nonencrypted digital information (including authorization requests and grants) between individual subscriber boxes and a headend control system.

Further aspects of the invention will become apparent from the below detailed description.

BRIEF DESCRIPTION OF THE DRAWINGS

FIG. 1C shows a previous PCM encoding scheme for transmitting audio signals via satellite.

FIG. 2A is a block diagram showing a show scrambling/descrambling structure in accordance with the invention.

FIG. 2C is a time plot showing the introduction of a bogus horizontal sync pulse and the burying of the picture information in "the grass".

FIG. 3A is a schematic of a first circuit for realizing the inversion and alternate skipping technique of the invention.

FIGS. 5A and 5B combine to form a block diagram of a data encryption system usable in the system of FIGS. 4A and 4B.

FIG. 6 is a block diagram of a multi-band show transmission and enjoyment authorization system according to the invention.

FIG. 7 is a block diagram of a subscriber box which is adaptable to the line skipping technique of the invention.

FIG. 8I is a map of data contained in the EEPROM and ROM sections of the FIG. 8A circuit.

FIGS. 9A-9E are diagrams showing the structure of box authorization signals.

FIGS. 10A-10E are method diagrams showing how the signals of FIGS. 9A-9E are de-enciphered by the subscriber boxes.

FIG. 11A is a block diagram of a digital audio decoder module according to the invention.

DETAILED DESCRIPTION

The following detailed description covers various embodiments as presently contemplated by the inventors for carrying out the invention. This detailed description is intended to be merely exemplary of the invention and is not to be taken in a limiting sense.

Figure 1A:
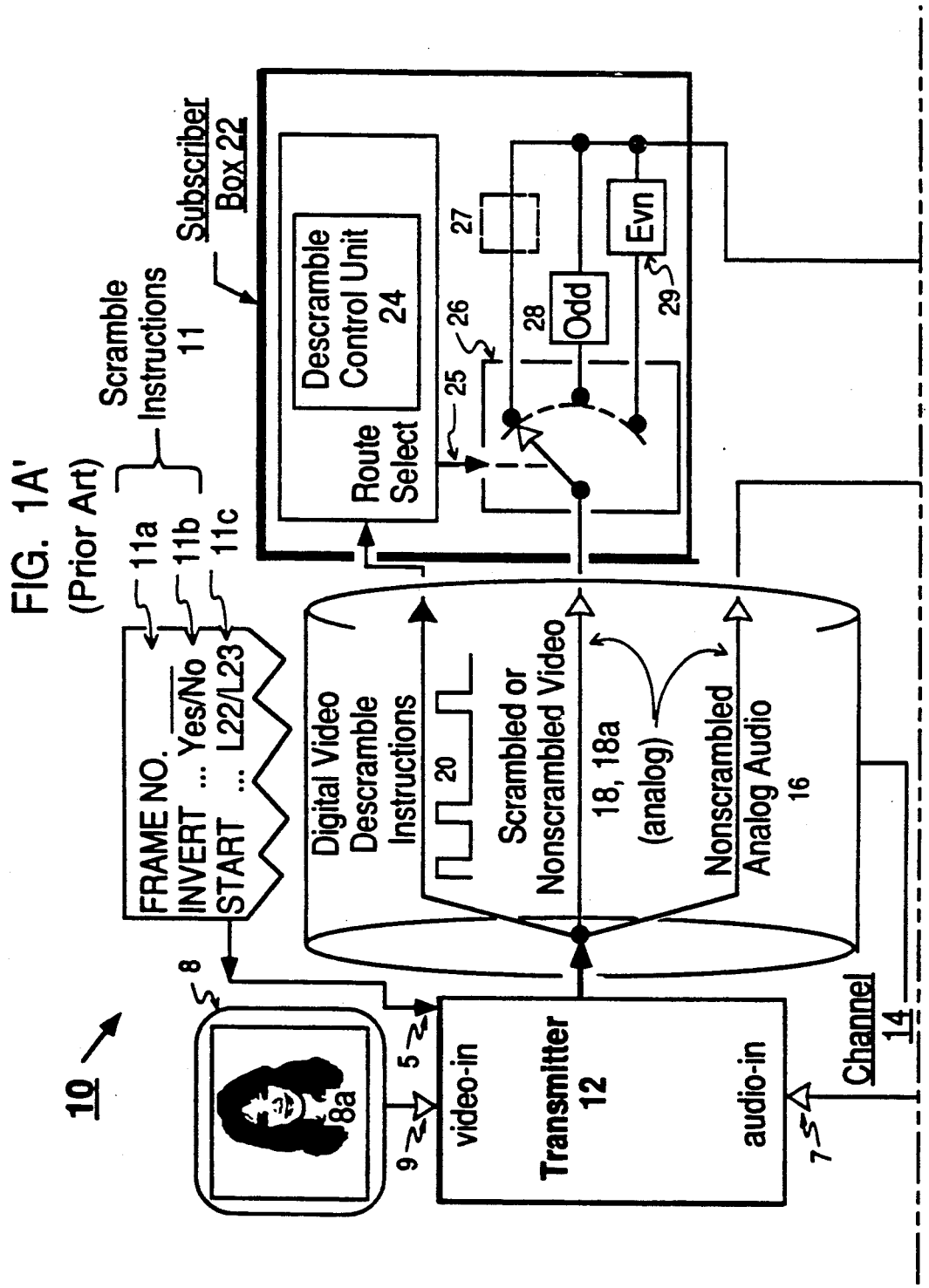
FIG. 1A is a block diagram of a previous structure for transmitting scrambled television signals.

Referring to FIG. 1A, in a previous entertainment transmission and reception system 10, audio-visual show information is presented in the form of a monoaural audio information signal 6 and a video information signal 8. Both the audio and video signals, 6 and 8, are first produced as analog electrical signals which occupy a low end or "baseband" portion of the frequency spectrum. They are then appropriately modulated in a transmitter unit 12 for transmission over a VHF (Very High Frequency) broadcast channel or some other publicly accessible channel (i.e., a television cable).

The video signal 8 is scrambled prior to transmission using a line inversion technique. Scramble instructions 11 are formulated for each video frame portion 8a of the video signal 8 (which frame 8a is identified by a frame number 11a) to indicate (11b) whether or not line inversion is to take place at alternate display lines of that video frame 8a (Invert ... YES/NO) and whether (11c) inversion is to start at the first or second viewable line (Start ... L22 or L23) of the frame 8a. These scramble instructions 11 are applied in the form of digital pulses to a scramble-instruction inputting port 5 of the transmitting unit 12. The video signal 8 is simultaneously applied to an analog video-input port 9 of the transmitting unit 12 and a corresponding audio signal 6 is applied at the same time in analog form to a monophonic audio-input port 7 of the transmitting unit 12.

The transmitting unit 12 scrambles each frame 8a of the video input signal 8 according to the scramble instructions 11 while leaving the audio input signal 6 in its original form. The transmitting unit then converts the nonscrambled audio signal 6 and scrambled video signal into transmittable form (i.e., VHF or UHF signals) and transmits them through one broadcast-type transmission channel 14 (which occupies a relatively continuous band portion of the frequency spectrum and utilizes a common communication path). The converted signals are respectively transmitted as a nonscrambled analog-audio signal 16 and a scrambled or nonscrambled analog video signal 18. The latter signal 18 has viewable lines of which alternate numbered ones in each frame (18a not shown) may or may not be inverted in accordance with the scramble instructions 11. Digital descramble instructions 20 corresponding to each frame-worth of scramble instructions 11 are superposed on the blanking interval portion of each transmitted frame 18a. Unshaded (white-filled) arrowheads are used in FIG. 1A to show the path of analog signals while shaded (black-filled) arrowheads show the path of digital signals.

A receiving unit or "subscriber box" 22 is provided at the receiving end of the single transmission channel 14. The subscriber box 22 includes a descrambling control unit 24 which extracts the descramble instructions 20 from the vertical blanking interval L1-L21 of each video frame 18a and uses the descramble instructions 20 to control a three-way analog-signal routing means 26. The routing means 26 routes the received video signal 18 in response to a digital routing control signal 25 supplied from the descrambling control unit 24 and selectively couples the received video signal 18 to a standard (i.e., NTSC) television receiving set 30 either directly 27, or during an entire frame through a first descrambling process 28 which inverts only odd-numbered display lines of the video signal 18, or during an entire frame through a second descrambling process 29 which inverts only even-numbered display lines of the video signal 18

As shown conceptually in FIG. 1A, if a video input signal 8 is scrambled at the transmitting end 12 to have all its odd-numbered display lines inverted and this scrambled signal 18 is transmitted directly 27 to a standard television monitor 30, the first viewable horizontal line (line L22) of the displayed picture 38 would appear in inverted form as indicated by the notation "I", the second viewable horizontal line (line L23) would be displayed in noninverted form as indicated by the notation "N", the third viewable horizontal line (L24) would be inverted ("I"), the fourth line (L25) would be noninverted ("N"), and this would continue throughout the entire frame in the same sequence thereby inhibiting enjoyment of the received video signal 18.

It is to be understood that the illustrated scrambled and nonscrambled pictures of a woman's face, 38 and 8a, as shown in FIG. 1A are merely conceptual aids and that inversion takes place on every other one of the 525 lines or other number of lines on the screen rather than over groups of such lines. Vertical blanking lines L01 through L21 are usually not seen on the standard TV set 30. The standard TV set 30 has only monophonic audio capabilities. It therefore receives the transmitted audio signal 16 directly, demodulates this signal 16 as necessary, and reproduces the audio content of the original show as analog audio signal 36.

Figure 1B:
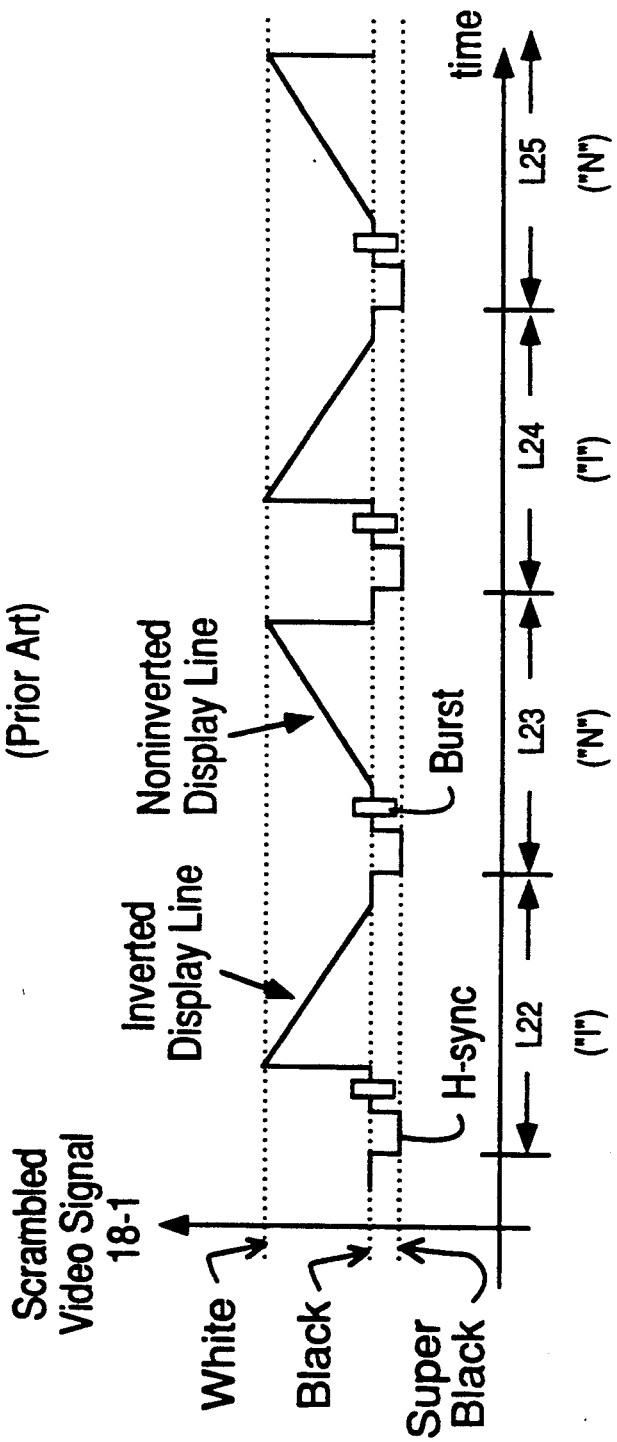
FIG. 1B is a time plot showing how black to white (drawn left to right) continuum lines would appear when scrambled according to the structure of FIG. 1A.

FIG. 1B is a time plot showing how the waveform of a transmitted video signal 18-1 may appear when alternate ones of the lines in each frame are inverted. The original image 8-1 (not shown) is assumed here to be a gray scale bar extending horizontally across the video frame and gradually changing from black to white in a left to right manner across the entire picture frame. As seen in FIG. 1B, the first viewable line L22 of the transmitted video signal 18-1 is inverted ("I") to instead scale across the screen from white to black, while the second viewable line L23 remains noninverted ("N") to scale opposingly from black to white and the same invert/noninvert sequence continues periodically throughout the entire frame (lines L24, L25, etc.).

Technically sophisticated users who have the receiving unit 22 of FIG. 1A in their possession can, by simple trial and error, determine whether inversion begins at the first or second viewable horizontal line in each frame (i.e., line L22 or line L23). Since a continuous and completely periodic inversion sequence, INININ ..., is used across the entire frame of the displayed picture, it is relatively simple to cut control wire 25 and inject a route-select overriding signal on wire 25 which will appropriately unscramble a scrambled picture by trial and error, given the 50% chance per frame of making a correct guess.

Referring to FIG. 2A, there is shown a block diagram of a first signal scrambling and descrambling system 100 in accordance with the invention. Like reference numerals are used (typically by adding 100) to indicate elements of FIG. 2A corresponding to those of FIG. 1A although many of the elements in these two figures may be substantially different.

Scrambling instructions 111 are formulated for each original video frame 108 to indicate (a) whether alternate line inversion will take place in the frame (Invert ...

YES/NO), to indicate (b) at which line (Start ... L22 or L23) inversion will start on, and to furthermore indicate (c) at which one or more lines (Lx, Ly, Lz, etc.) if any of the frame 108 the alternation process will be temporarily skipped. When a skip occurs, inversion no longer necessarily takes place at periodically spaced apart ones of all the lines in the entire frame but rather can occur aperiodically over the frame 108. To descramble a thusly inverted frame without guesswork, one must have knowledge of the location of the skip lines as well as the periodicity and phase of the inversion process.

In the system 100 of FIG. 2A, a transmitting station 112 receives original video frame signals 108 and original audio signals 106. The original audio signals 106 can be monophonic or multiphonic (e.g., stereophonic). Moreover the original audio signals can be in analog form or digital form as will be apparent shortly. (The audio-in arrowhead is accordingly shaded as half black and half white to represent these options.)

The transmitting unit 112 transmits, through an audio transmission channel 114, such as a satellite link (i.e., on a 5.2 MHz subcarrier within the frequency band) or through a cable, a digital, PCM-encoded audio signal 116a (which could be encrypted or nonencrypted). In the case where the original audio signals 106 are in analog form, the transmitter converts them to pulse-code-modulated (PCM) form prior to transmission. Audio control and decrypt instructions 116b are included in the digital stream sent over the audio channel 114.

A video signal 118 (which may be nonscrambled or scrambled in accordance with the invention) is transmitted through a video transmission channel 113 (i.e., a 6 MHz wide broadcast band channel or by cable). The video channel 113 is preferably separate from the audio transmission channel 114 in terms of one or both of its frequency and communications path. Video descrambling instructions 120 are superposed digitally on the vertical blanking interval of one or more transmitted frames of video information.

To avoid confusion, the enciphering of analog information will be referred to here as "scrambling" and the enciphering of digital information will be referred to as "encrypting". Thus, a digital "descramble-instructions carrying signal" is one which contains digital information for descrambling a scrambled video (or other analog) signal. Because of its digital nature, such a descramble-instructions carrying signal may itself be enciphered, as will be seen, to form an "encrypted" descramble-instructions signal (i.e., signal 431 of FIG. 4A) which needs to be decrypted before it can provide useable descrambling instructions. Similarly, a digital audio signal (i.e., PCM signal 116a of FIG. 2A) can be enciphered to form an "encrypted" digital audio signal which needs to be decrypted before it can be applied usefully to a digital-to-analog converter (i.e., D/A 135) so as to produce enjoyable sound. The encrypted digital audio signal can include encrypted audio control signals (i.e., 116b of FIG. 2A) within its bit stream.

Referring still to FIG. 2A, a video receiving unit (video decoder module) 122 is provided at the receiving end of the video channel 113. The video receiver 122 includes a descrambling control unit 124 for receiving and extracting the digitally-coded video descramble instructions 120 from the vertical blanking interval (L1-L21). The descramble instructions 120 include first digital information (start code) indicating whether alternate line inversion is to occur at all in a particular frame, and if so, whether alternate inversion is to begin at an odd-numbered viewable line or at an even-numbered viewable line of the frame. The descramble instructions 120 further contain second digital information (skip code) from which the video receiver 122 determines whether skipping is to occur, and if so, identifies the one or more line numbers at which the periodic inversion process is to be "skipped" within the frame so that, if alternate inversion began at an odd-numbered line above a preselected "skip" line, then inversion will occur at even-numbered lines below the preselected skip line or visa versa.

The descrambling control unit 124 supplies a routing control signal 25* in digital form to an analog routing unit 126 in accordance with the descramble instructions 120 to thereby place the routing unit 126 in one of three signal-routing modes for the entire frame. The three modes of the routing unit 126 are: (a) transmitting the received frame signal 118 directly 27 to a standard TV monitor 30 without any descrambling operation; (b) transmitting the received video signal 118 through a first alternate-inversion process 128 which begins inverting only odd-numbered ones of the viewable frame lines but may be optionally commanded to skip an inversion step at one of the lines in a frame and thereby switch itself to a process of inverting even-numbered ones of the viewable lines in the frame; and (c) a second alternate-inversion process 129 which begins to invert only even-numbered ones of the viewable lines in a frame but may be optionally commanded to skip an inversion step so that it will then be inverting odd-numbered ones of the viewable lines in the frame.

In addition to the route-selecting signal 25*, the descrambling unit 124 extracts the second digital information (skip code) from the blanking interval, determines the numbers of the "skip" lines at which the periodic inversion process is to be skipped within the frame, and supplies one or more line-skip commands 125 in digital form to the first and second inversion processes, 128 and 129, at times corresponding to the skip-lines. At each specified "skip" line, descramble processes 128 and/or 129 are temporarily halted for one or another odd number of lines and thus switched from inverting corresponding odd/even numbered lines to inverting instead corresponding even/odd numbered lines.

For each scrambled video frame, a sophisticated user in possession of the video descramble unit 122, but not in possession of the information represented by the digital descramble instructions 120, would have to guess both the polarity (odd/even) of the route-selecting signal 25* and the timings of the line skip commands 125 in order to fully descramble the video information 118 being transmitted over video transmitting channel 113. Since the standard (NTSC) television frame has at least N=250 viewable lines per field of a frame, the chance of correctly guessing the scrambling process used for each frame is approximately 1 out of 500 or less (calculated from [½] times [1/N]). This is a much lower chance than the 50% chance per frame associated with the scrambling structure 10 of FIG. 1A. Accordingly, the ability of sophisticated users to descramble show information which they are not authorized to enjoy simply by guessing and injecting guessed control signals 25* and 125 is substantially diminished.

It is possible to use the video scramble/descramble technique of FIG. 2A in combination with the conventional transmission of a nonscrambled, monophonic analog audio signal (see FIG. 1A) or by also scrambling such an analog audio signal with an analog inverting technique that is similar to the video inverting technique, but it is preferable in accordance with the invention to transmit the audio portion 106 of an audio-visual show (108+106) in the form of encrypted or nonencrypted digital signals (i.e., pulse code modulation signals, PCM) 116.

A conventional PCM transmission scheme is disclosed in an article entitled "Sound Transmission Systems for Direct Broadcasting Satellites: PCM Sound Broadcasting" by Takehiko Yoshino et al., AES 3rd International Conference, Tokyo, Japan, 1985 June 10–21, pages 95–99. Referring to FIG. 1C, in such a PCM scheme, audio information is transmitted in the form of one-millisecond wide frames 31 each consisting of 2,048 bits. Each frame 31 has sound code bits 31a organized in matrix form (e.g., 16×48× as an error correction column (EC). Each audio frame 31 further includes a frame sync portion 31c (FS, 16 bits) at its beginning and a control data portion 31d (CD, 16 bits) following to indicate whether the information is stereophonic, monophonic and whether amplitude compression is according to an A mode or a B mode. Range data 31e (RD, 32 bits) is also included to indicate the dynamic range of the A or B compression modes. Furthermore, an independent data section 31f (ID, 7×32 bits) provides space for general information.

Referring to FIG. 2A, a similar PCM matrix 131 is used in the show transmission and reception system 100 of the invention. The advantage of such a structure 131 is, of course, that improved signal to noise characteristics may be obtained by sending digitized signals over the audio channel 114 and further signal to noise improvement is attained by the use of digital error correction schemes. But an additional advantage of this digital-audio method is that, in accordance with the present invention, the audio data portion 131a (AD) may be encrypted as will be explained later, to form encrypted audio data AD* so that subscribers need an audio decryption unit 134 (composed of algorithm portion 134a and multiple-keys holding portion 134b) in order to obtain enjoyment from the encrypted audio transmission AD*. Information identifying a prespecified one of the multiple decryption keys (DE-Keys) is embedded in the independent data portion 131f (ID) of each audio frame 131 to indicate to the decryption unit 134 which, if any, of an arbitrary number, M, of prestored audio decryption keys (DE-Keys) is to be used for deciphering the received AD* (or AD) data. The decrypted signal AD is then supplied to a suitable digital to analog converter (D/A) 135 for producing analog sound having an enjoyable content. Preferably, the D/A unit 135 generates at least two independent analog sound signals, 136a and 136b, so that high-fidelity stereophonic or other multiphonic sound may be produced on a stereo television set 130. PCM matrix 131 has two modes. In an "A" mode, the RD field 131e is 1×32 bits (there is no $ID_B$ field), the AD field 131a is 40×32 bits and ID field 131f is 15×32 bits. In the "B" mode, a 1×16 bits $ID_B$ field squeezes the RD field 131e to 1×6 bits, the AD field 131a grows to 48×32 bits and the ,mean ID field 131f shrinks to 7×32 bits.

Figure 2B:
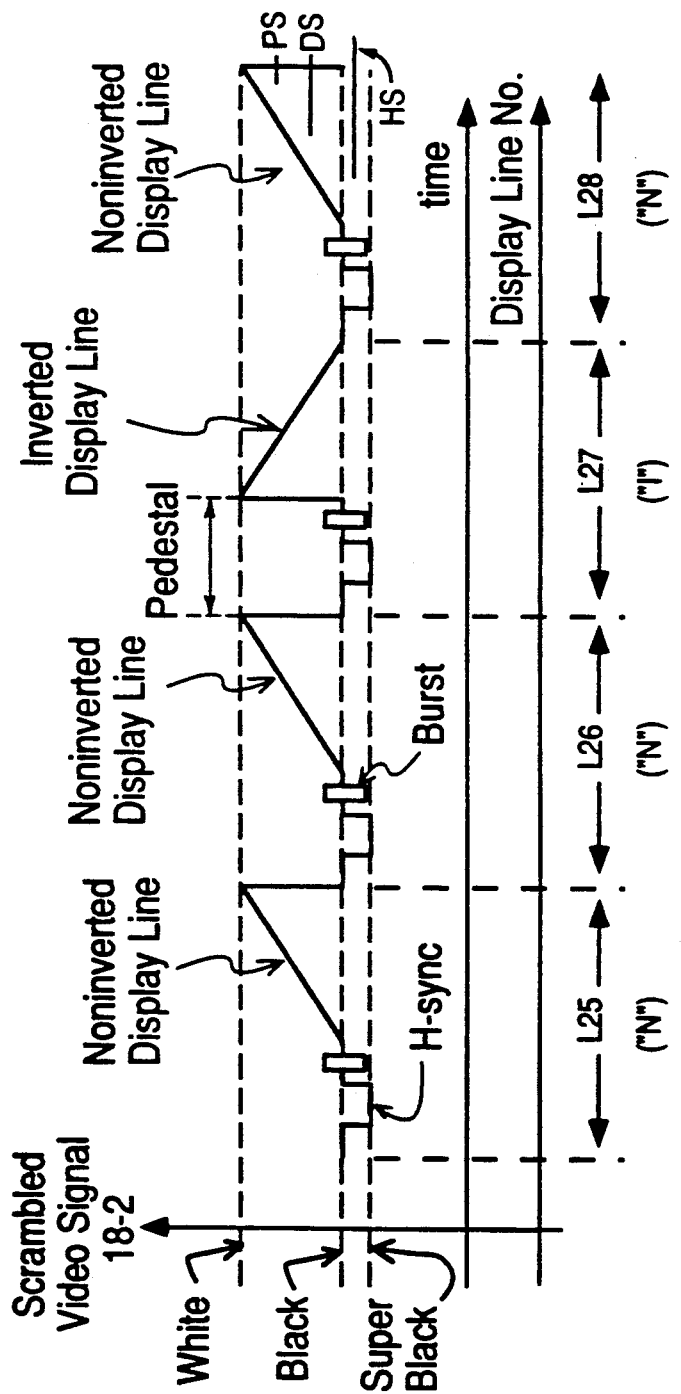
FIG. 2B is a time plot showing how black to white (drawn left to right) continuum lines would appear when scrambled according to a line skip technique of the invention.

Referring to FIG. 2B, a portion of a scrambled video signal 18-2 corresponding to the scrambling instructions 111 shown in FIG. 2A is illustrated. As seen in the time plot of FIG. 2B and in the displayed frame 138 of FIG. 2A, the fourth viewable line L25 is noninverted following the prior invert, noninvert, invert (INI) sequence of the previous first to third viewable lines L22, L23 and L24. One step of the invert/ noninvert sequence is skipped, however, at next viewable line L26. The result is that only even numbered lines (L22 and L24) are inverted in that portion the frame above line L26. Line L26 is not inverted (it is "skipped"). And only odd numbered lines (i.e., L27, L29, etc.) are inverted in that portion of the frame below skip line L26.

It is of course to be understood that one or more skips may be included anywhere within each frame in order to create an aperiodic invert/noninvert sequence across the frame. The above designation of line L26 as being a "skip" point is merely exemplary. In accordance with the invention, one or more skip points are preferably located near the middle of each frame so that, even if a correct guess is made as to whether odd or even numbered lines are being inverted within a first major portion of the frame, a second portion at an opposed side of the "skip" line will be displayed in scrambled form on the screen, and accordingly, a blanked-out or inverted band will appear across the picture to generate horizontal jitter or otherwise interfere with the enjoyment of non-authorized viewers.

Three signal "slicing" levels; PS, DS and HS representing respectively a Pedestal Slicing level, a Data Slicing level and a Horizontal Synchronizer Slicing level are depicted in FIG. 2B. These levels are used for generating binary decision signals which respectively represent the timing at the start of each signal pedestal, a one or zero decision level for digital DATA signals sent during the vertical blanking interval and a horizontal sync decision level used for detecting the presence of either real or bogus horizontal sync pulses.

Referring to FIG. 2C, a further step is taken to hide the entertainment content of transmitted video information. In FIG. 2C, the "active" video picture content of each display line is represented by wavy lines 202. The active video range 203 is compressed to a 70, IRE range positioned in the middle of a 140 IRE range. At the end of each active video waveform 202, there is a short return to black 204 which begins a so-called "pedestal" portion of the next-line waveform. The compressed black level 205 is set to 35 IRE above the super black level 206. A super white level 208 is established 35 IRE above the compressed video white level. Immediately after its return to the black level at 204, the signal rapidly rises 207 to the super white level 208 thus burying the active video portion in a range 203 smaller than that of the pedestal portion. At an arbitrary time $t_x$ after the rise 207 to super white, a bogus horizontal sync pulse 210 is inserted in place of the original H-sync pulse. A second positioning $t_x'$ of the bogus H-sync pulse is depicted by dashed pulse 210' to show that its positioning and duration are variable. The bogus H-sync pulse extends down to the super black level 206 and stays at that level for a duration of variable length HW before returning to the super white level 208. The bogous H-sync pulse duration HW is set to a first length for frame lines 1 and 10 and to a different length HW* for other frame lines in order to distinctly identify lines 1 and 10. The chroma burst follows at the back porch of the bogus H-sync pulse 210 and then the waveform returns to the video active range 203 for generating the next frame line.

Figure 2D:
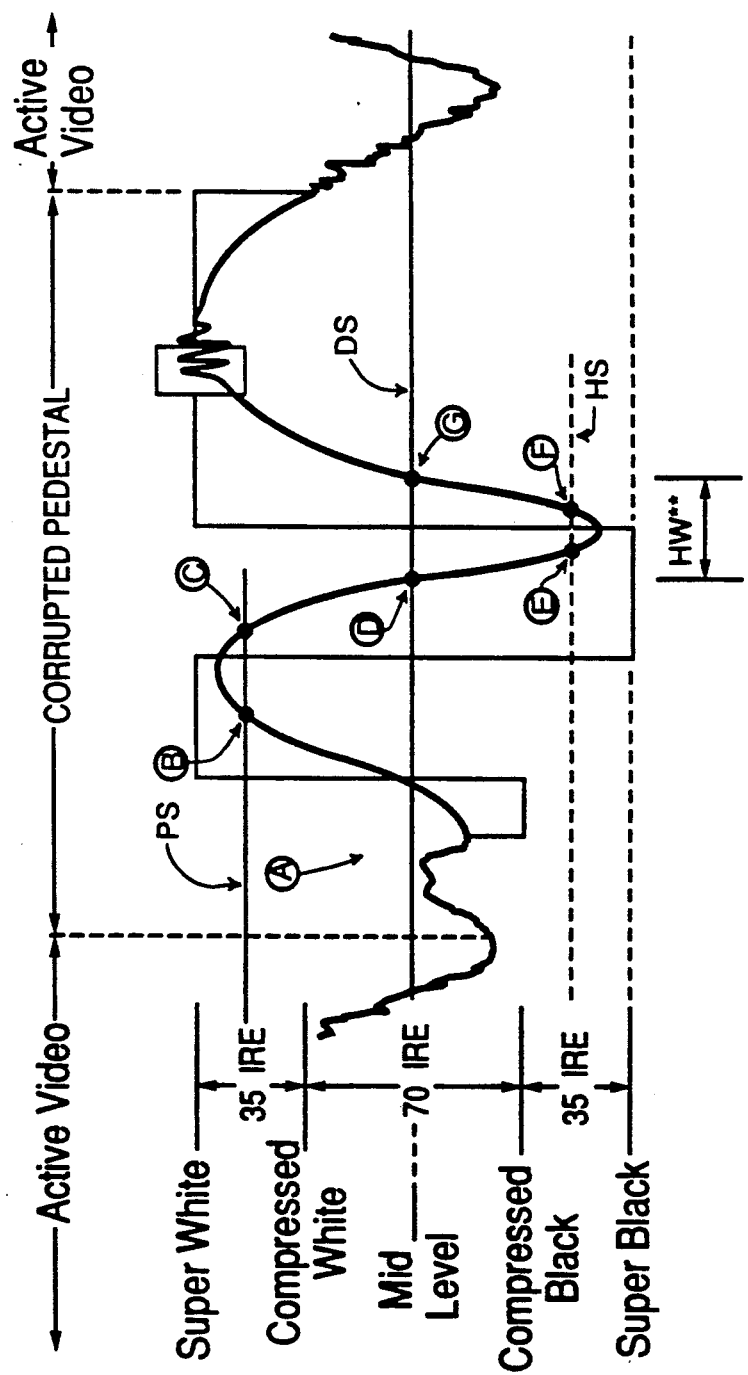
FIG. 2D is a time plot showing a transmission corrupted signal and explaining a signal reconstruction method.
Figure 2E:
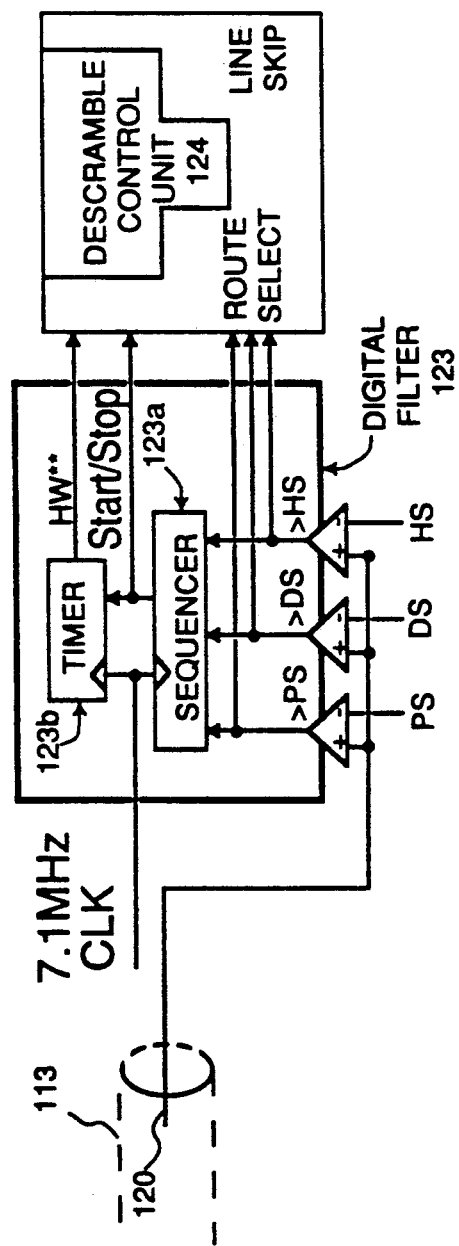
FIG. 2E is a schematic diagram of a video receiver including a digital filter according to the invention.

FIG. 2D shows a video signal having a transmission-corrupted pedestal portion. FIG. 2E shows a digital filter 123 used for reconstructing the waveform of a transmitted signal. In cases such as satellite transmission, it has been found that the transmitting channel 113 has a tendency to corrupt the pedestal portion as indicated in FIG. 2D. The original pedestal is dashed in as a background waveform to show the changes. In spite of this signal corruption, the duration HW of the bogus H-sync pulse needs to be determined so that a reference point can be established within each frame. In accordance with the invention, the digital filter 123 receives digitized signals, >PS, >DS and >HS which are digitized according to the three slicing levels, PS, DS and HS.

Often, the return to black at the beginning of a corrupted pedestal is missing as indicated at (A) in FIG. 2D. The digital filter 123 looks for first and second crossings of the PS level as indicated at (B) and (C) in FIG. 2D. If these first crossings (B) and (C) occur in a predetermined interval, the digital filter next looks for a crossing (D) of the DS level. The timing of this crossing (D) is stored within the digital filter 123 by starting a timer 123b within the filter. Next, crossings (E) and (F) of the HS level are looked for immediately following crossing (D). If crossings (E) and (F) occur, the digital filter 123 then waits for a further crossing (G) of the DS level. The timing difference between the first DS crossing at (D) and the second DS crossing at (G) is measured and this value is taken as the duration HW of the transmitted bogus H-sync pulse. This HW information is transmitted to the descramble control unit 124 together with other information so that the descramble control unit 124 can locate lines 1 and 10 of each frame and thus synchronize itself to frame boundaries.

As seen in FIG. 2E, the digital filter 123 comprises a sequential state machine (sequencer) 123a which receives the digitized signals, >PS, >DS and >HS from a corresponding set of comparators. Upon the occurrence of level crossing (D) in FIG. 2D, the sequencer 123a starts the timer 123b within the digital filter 123. At level crossing (G), the sequencer 123a stops the timer 123b. The timer 123b then sends the counted value of pulse duration HW** to the descramble control unit 124. The sequencer 123a and timer 123b are both clocked by a relatively high frequency clock (e.g., 7.1 MHz) whose frequency is much greater than two times the fundamental frequency of the corrupted pedestal portion. The sequencer portion 123a of the digital filter is preferably defined within a volatile PLD during prototyping in order to adjust the timing of its states for a particular transmission channel 113. After prototyping for a particular channel 113, the digital filter 123 is implemented in a nonvolatile gate array.

Referring next to FIG. 3A, a first scrambling/descrambling circuit 300 for providing the frame-aperiodic inversion function of the present invention is schematically illustrated. The circuit 300 comprises first and second analog amplifiers, 310 and 320, each designed to provide a unity gain inverting function. A nonscrambled-or-prescrambled video input signal 118-2 is applied to the inverting input terminal of the first amplifier 310. The output signal of the first amplifier 310 is supplied to the inverting input terminal of the second amplifier 320. The output terminals of amplifiers 310 and 320 are respectively coupled to a video signal output node 330 through first and second switch elements 315 and 325. The switch elements, 315 and 325, each have an analog-signal input terminal, an analog-signal output terminal and a digital control terminal for closing and opening a conductive path between the analog-signal input and output terminals. A field effect transistor (FET) or a CMOS transmission gate may be used to form each of switch elements 315 and 325.

Switch actuating signals VIX and VNX are respectively applied to the digital control terminals of the switch elements 315 and 325 to place each switch element in either a conductive (closed) or nonconductive (open) state. Signals VIX and VNX are generated by a digital control circuit (e.g., flip flop 335) to provide mutually exclusive closings of switching elements 315 and 325. A corresponding scrambled-or-descrambled video output signal 118-3 is produced at the video-signal output node 330 in accordance with the selective closings of one or the other of the switch elements 315 and 325.

In the circuit 300, the Q and Q-bar output terminals of a toggle-type flip flop 335 are operatively coupled to the switch elements, 315 and 325, for closing one of these switch elements while simultaneously forcing the other switching element open. A pulsed output signal from a controlling AND gate 340 causes flip flop 335 to toggle for every horizontal sync pulse (H-sync) provided at a first input terminal 341 of the controlling AND gate 340 except when an active-low "skip" command pulse appears at a second input terminal 342 of the controlling AND gate 340. The active-low "skip" command pulse of line 342 may be derived from one or more active-high skip command lines, i.e., Skip-1, Skip-2, Skip-3, etc. whose signals are combined through a NOR gate 345 and supplied from there to the second input terminal 342 of the controlling AND gate 340. A skip line counter, i.e., 351 (only one shown) may be provided for each skip command line, i.e., Skip-1, to indicate the specific line number (or time) at which a skip pulse is to appear on the second input line 342 of the controlling AND gate 340. During the vertical blanking interval (L01 to L21), the skip command counter 351 may be loaded with a predetermined count number 352 which is provided in the form of a digital signal from a memory unit 360 in which the predetermined number 352 was prestored. The skip-line number 352 is selected by a skip-number selecting signal applied to the address port of the memory unit 360. After being loaded into the skip counter 351, this number 352 is decremented in counter 351 with the occurrence of each horizontal sync pulse (H-sync) until an overflow pulse is generated on the Skip-1 line. The overflow causes a skip.

Vertical sync pulses (V-sync) are applied to a reset input terminal (RST) 336 of the toggle flip flop 335 and to a reset input terminal (RST) 356 of the skip counter 351 at the beginning of each video frame. Depending on the skip-line number 352 that was loaded into the skip counter 351, and on the bit length of the skip counter 351, skips may be produced at one or more arbitrarily selectable lines of each video frame. The toggling action of the toggle-type flip-flop 335 is rendered aperiodic by the skip commands. One copy of the scrambling/descrambling circuit 300 is provided within the transmitter 112 of FIG. 2A to scramble the video input signal 108 as desired and a duplicate copy of the circuit 300 may be provided in video receiver 122 for descrambling a received video signal 118 whose lines have been scrambled by the circuit 300 at the transmitter end. The same scrambling descrambling circuit 300 provides the functions of both the begin-even and begin-odd functions, 128 and 129. When a line-skip pulse is issued for the first viewable video line L22, the inversion process will begin on the second line L23 and when no skip pulse is issued during display of line L22, inversion can alternatively begin at the first viewable line L22.

Figure 3B:
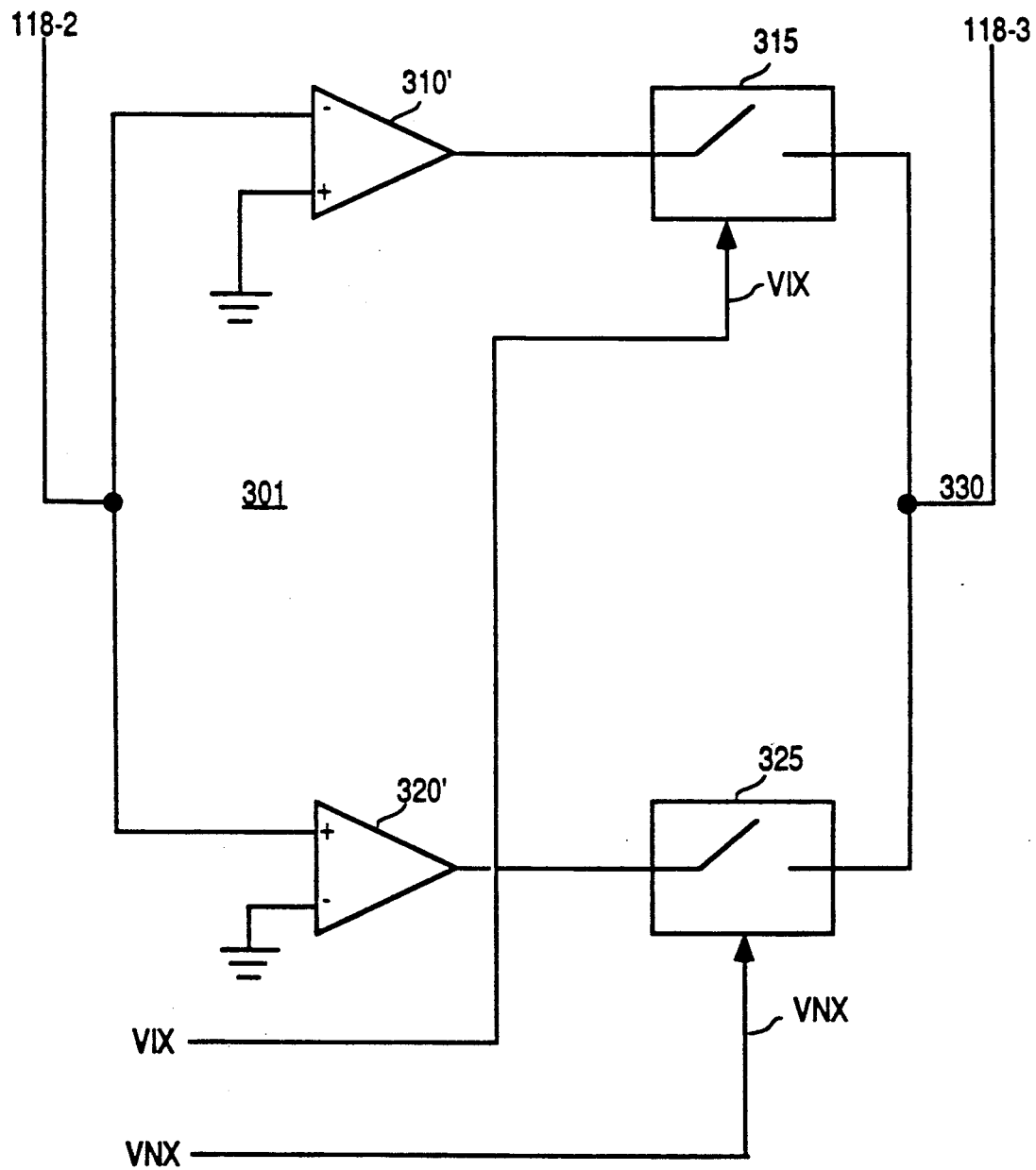
FIG. 3B is a schematic of an alternate version of one part of the circuit of FIG. 3A.

Referring to FIG. 3B, in a variant embodiment 301, first analog amplifier 310' and second analog amplifier 320' are connected in parallel as shown. The signal delays through the first amplifier 310' and the second amplifier 320' are equalized to assure synchronization between the inverted and non-inverted video signals output from the amplifiers, 310' and 320'.

Referring back to FIG. 3A, in another embodiment, the flip-flop 335 is controlled by a microcomputer which takes over the function of circuit portion 350. The microcomputer is described more fully below with reference to FIG. 8A. In that embodiment (FIG. 8A), the original H-sync pulse, which was replaced by a bogus H-sync pulse 210, is regenerated as a Horiz[ontal] Drive pulse produced by ASIC 815. The flip-flop 335 (FIG. 3A) is allowed to toggle on almost every Horizontal Drive pulse. The Horizontal Drive pulses indicate the start of the video lines much like the original H-sync pulses. At skip lines, the microcomputer 350 holds the flip-flop 335 from toggling. Because the microcomputer 350 is relatively slow, the lines of each frame are grouped into blocks of 8, 16 or some other number of lines and skips are allowed to occur only at block boundaries. The microcomputer 350 determines whether a skip will occur between blocks based on algorithm-selecting information provided to it from a transmitter as described in more detail below with reference to FIG. 3C.

Figure 3C:
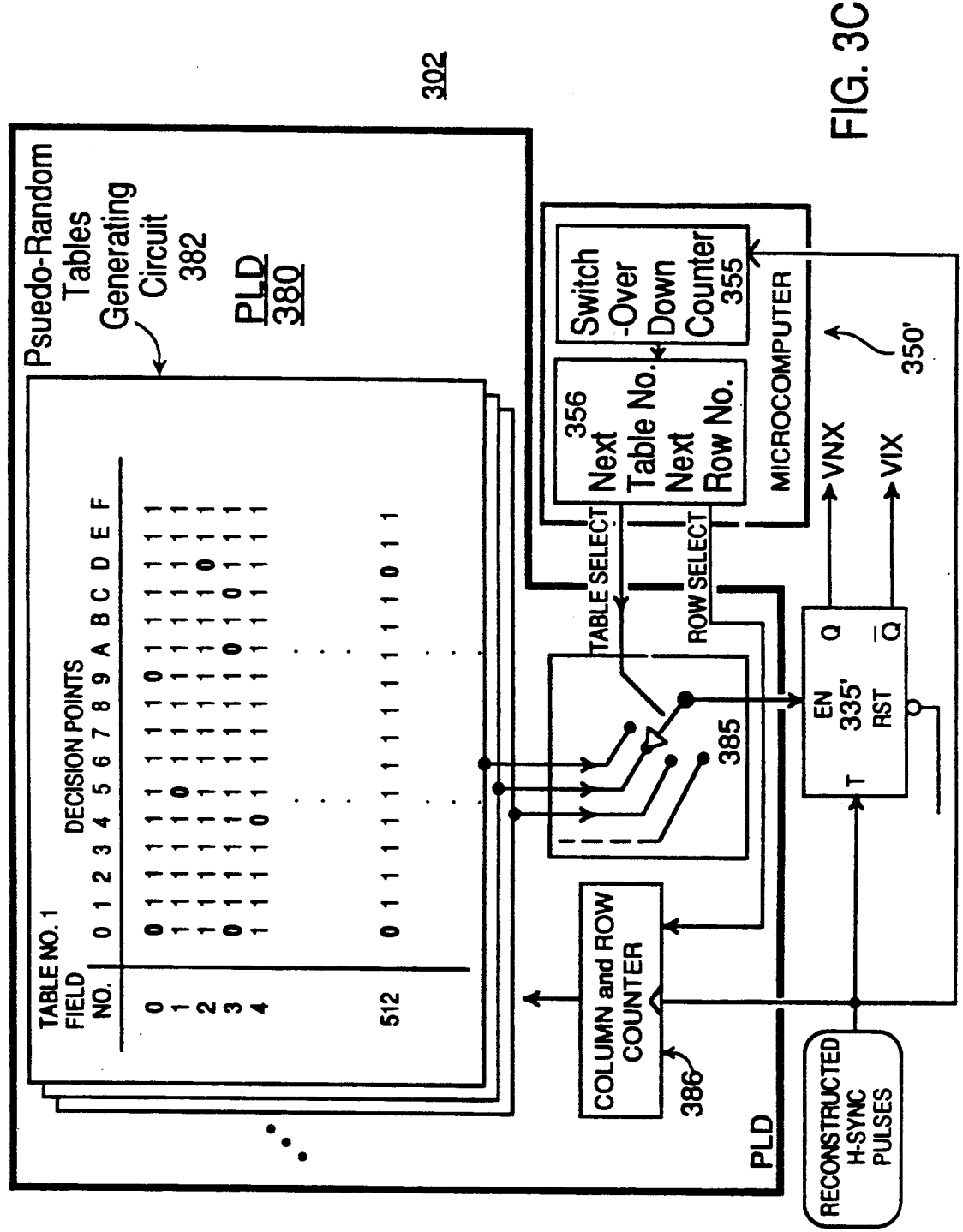
FIG. 3C shows yet another method of generating sporadic skips.

FIG. 3C shows a further embodiment 302 in which a line-inverting flip-flop 335' receives reconstructed horizontal sync pulses at its toggle (T) input terminal and outputs corresponding to VNX or VIX signal levels from its Q and Q-bar output terminals. The toggling function of flip-flop 335' is enabled only when a logic high level is presented at its enable (EN) input terminal. A programmable logic device (PLD) 380 also receives the reconstructed H-sync pulses, and for each such pulse, places a logic high or logic low signal level on the enable (EN) input terminal of flip-flop 335'.

Internally, the PLD 380 includes a tables generating circuit 382 which generates a stream of logic highs (1111 ... 1111) with an occasional logic low randomly distributed within the stream of logic highs (1111 ... 0 ... 1111). FIG. 3C shows a first table (Table No. 1) in which the stream of logic highs and sporadically inserted logic low levels are assigned to groups of sixteen decision points (No. 0-9, A-F). The decision points are provided in each of a predetermined number of fields (0, 1, 2, 3, 4, ..., 512, ...). For each decision point of a particular field, the toggle function of the flip flop 335' is either enabled or disabled according to a corresponding 1 (high) or a 0 (low) provided in the controlling table (Table No. 1). A plurality of similar tables underlie Table No. 1. A pseudo-random distribution of occasional logic low levels (0's) is provided within the stream of logic high levels (1's) stored in the underlying tables. The distribution of each table is, of course, different from that of the other tables.

A table-selecting switch 385 within PLD 380 selects one of the plural tables and feeds its corresponding stream of logic highs and occasional logic low levels (1111 ... 0 ... 1111) to the enable (EN) input terminal of flip-flop 335'. Counter 386 is clocked by the reconstructed H-sync pulses so as to address the contents of the selected table circuit 382. The counter 386 sequentially addresses one decision point after the next in a first row (field number) and then in subsequent rows of the selected table. The addressed bit in the table is output through switch 385 to the EN terminal of flip flop 335'.

Microcomputer 350' controls the table selecting switch 385 and table addressing counter 386 such that, at any arbitrary time, a switch-over may be made from a first table to a second table and to a prespecified new row (or even individual bit position if desired) within the newly selected table. Microcomputer 350' includes storage means 356 for storing in advance the number of the new table to be used upon switch-over and for storing in advance the new row number (or bit position) from which the toggle stream of new enable and disable bits will be generated. The data stored within storage means 356 is transferred to the table-selecting switch 385 and table-driving counter 386 at a critical switch-over time. A switch-over down-counter 355 is provided within microcomputer 350' and clocked by the reconstructed H-sync line in order to synchronize the microcomputer 350' with the PLD 380. At a preselected reference time such as at line 10 of a frame (identified by a bogus H-sync pulse of a special duration HW*), a time delay value for the switch-over operation is loaded into the switch-over down counter 355. The counter 355 is thereafter clocked by the reconstructed H-sync line to synchronously initiate the switch-over operation at the critical time which follows the referenced load time. The switch-over time can occur many fields after its timing is loaded into the down counter 355. Preferably, the critical time is selected such that the last rows of the current table are not played-out and the first row of the table re-played immediately thereafter. With this process a would-be pirate is never sure of the length of a table and the repeat-pattern of its corresponding pseudo-randomly generated code. It is to be understood that pseudo-random generating circuitry such as shown for example by the XOR and shift register feedback structures in FIGS. 5A and 5B may be used in place of bit-storing tables for generating the streams of logic highs with sporadically introduced logic lows.

PLD 380 may be a user-configurable non-volatile type of gate array which retains its configuration even if power is lost or a volatile device such as a Xilinx XC3020 ™ device available from Xilinx, Inc. of San Jose, Calif. A volatile PLD loses its configuration if power is removed from the integrated circuit chip. This can be used to provide greater security for the information stored in the PLD as will be explained later. As another variation of the VNX and VIX pulse generating circuit, the logic functions of PLD 380 may be incorporated into the software instructions of microcomputer 350'. Greater security is believed to be provided by using a volatile PLD 380 or other volatile "RAM-based" structure since it is more difficult to reverse engineer the internal configuration of a PLD 380 than it is to reverse engineer the internal configuration of program instructions stored within an externally-readable memory section (not shown) of the microcomputer 350' and, if a tamper attempt is detected, the contents of a volatile PLD or RAM-based other structure can be quickly erased.

Figure 4A:
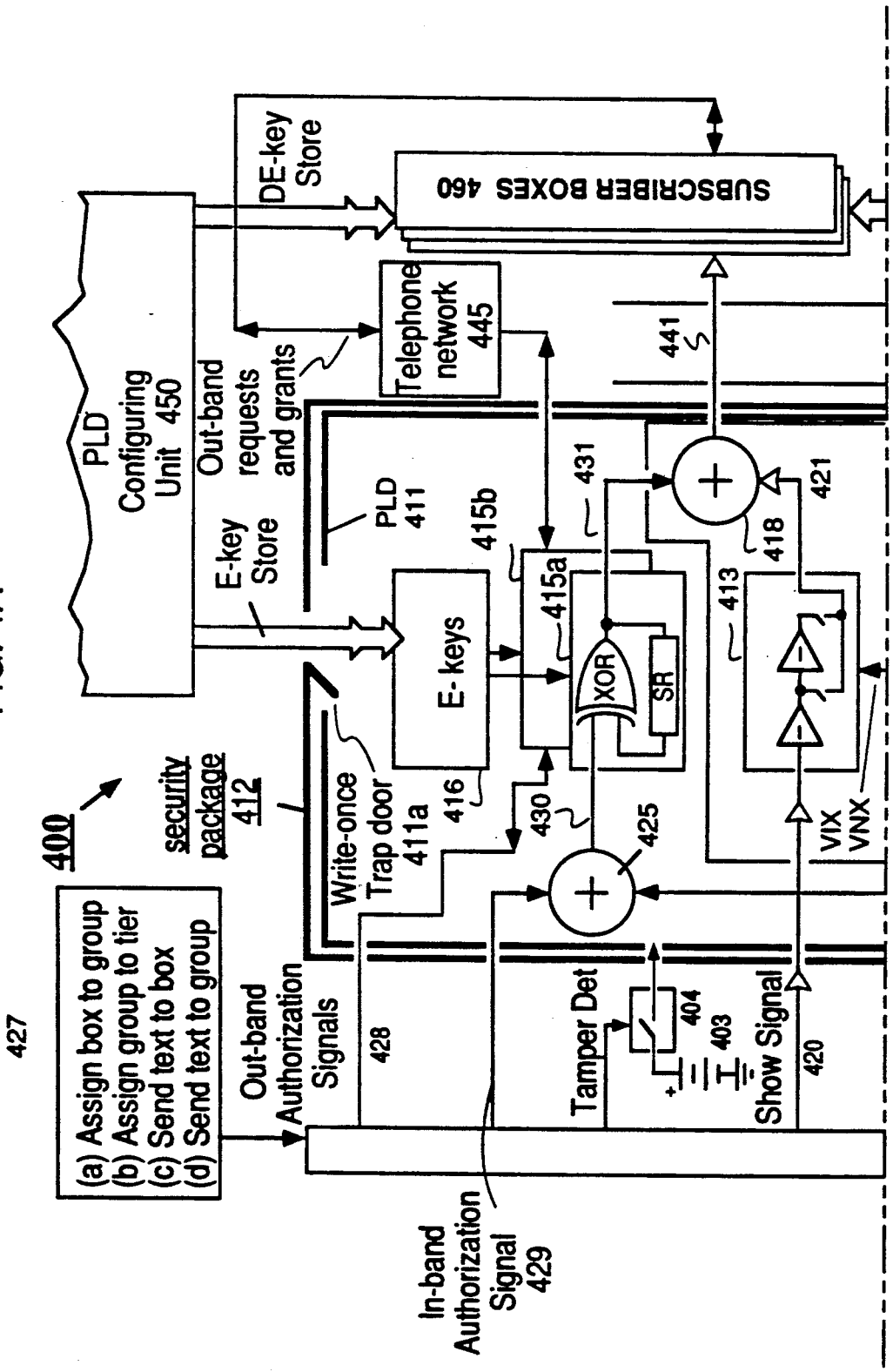
FIGS. 4A and 4B form a combined block diagram of a signal transmission and reception system in accordance with the invention.
Figure 4A:
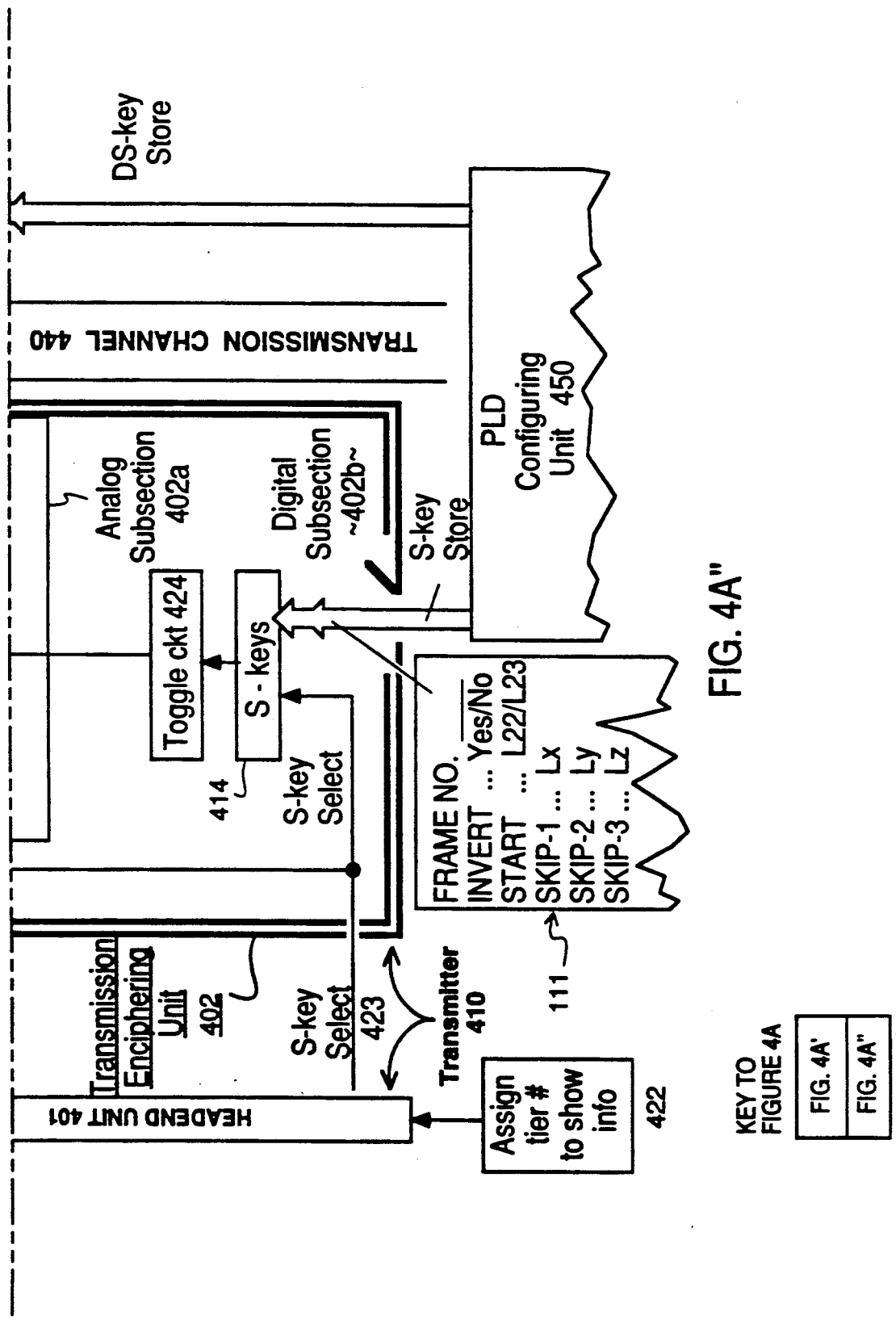
Figure 4B:
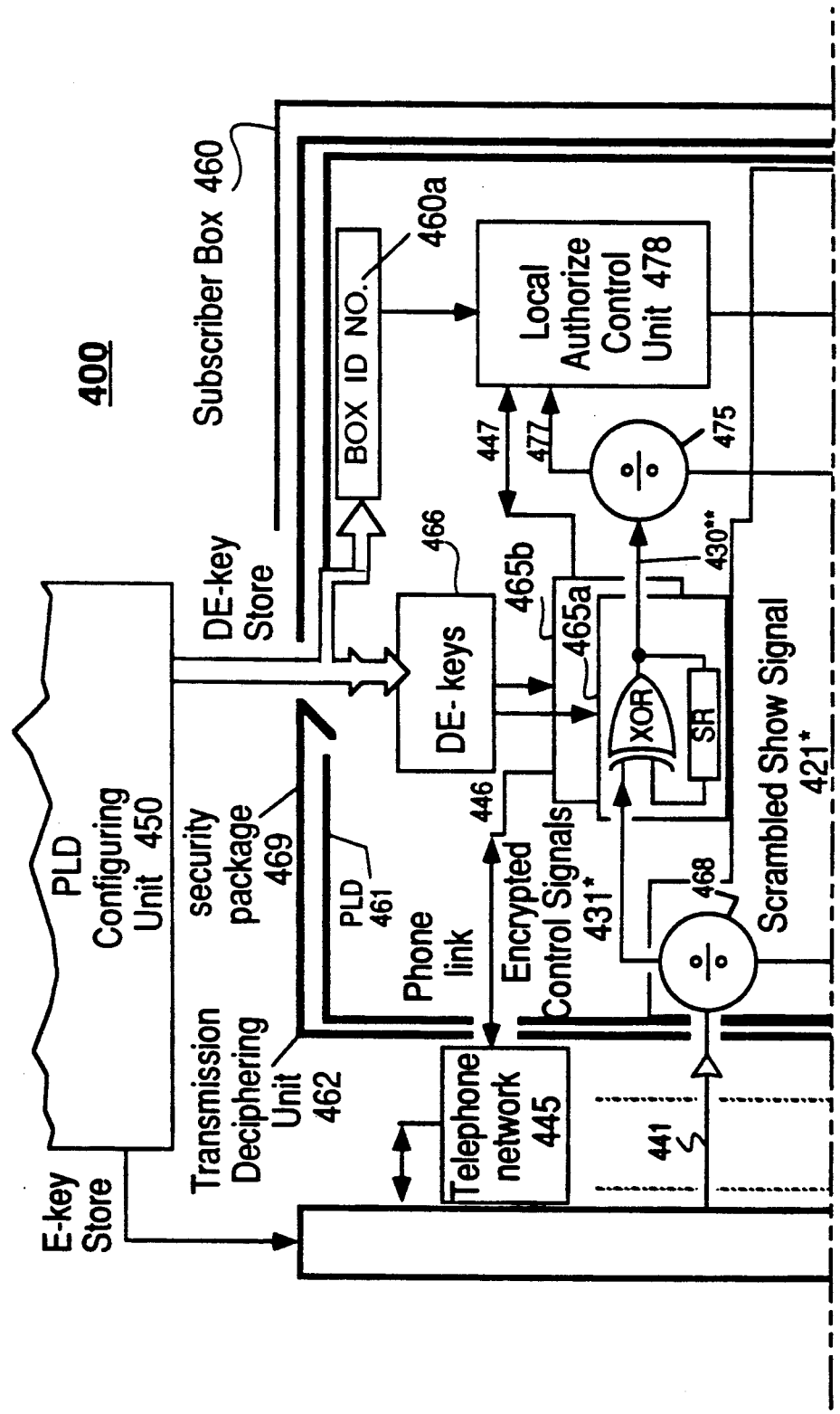

Referring to FIGS. 4A and 4B, a block diagram is shown for another embodiment 400 of a show information transmitting and receiving system according to the invention. FIG. 4A illustrates a transmitting side 410 in detail while FIG. 4B illustrates a receiving side 460 in detail. The two FIGS. 4A and 4B, are first described together in broad terms and then each figure is individually discussed in more detail.

In the embodiment 400, descrambling instructions are not themselves transmitted over a publicly accessible channel 440. Instead, information representing these instructions is stored, during manufacture of the transmitter unit 410 and during manufacture of each of a large plurality of receiver units (subscriber boxes) 460, within a corresponding plurality of write-once/(optionally-readable-only-once)/and thereafterwards-externally-nonreadable memory sections 414 and 464 included in a set of so-called programmable logic devices or "PLD's" for short. The PLD's 411 and 461 of FIGS. 4A and 4B are preferably volatile logic array integrated circuits such as the Xilinx XC3020 or XC3042 programmable logic chip available from Xilinx Inc. of San Jose, Calif. These PLD chips are included in each transmitting unit (410) and corresponding set of receiver units (subscriber boxes 460). The transmitter side PLD 411 has an encrypting circuit 415 defined therein while the receiver side PLD 461 has a complementary decrypting circuit 465 defined therein. Digitally encrypted control data 431 is transmitted over the public channel 440 to the receiver PLD 461 for selecting one of plural descrambling instructions which have been volatilely stored within the receiver PLD 461 during manufacture. The selection number does not reveal the contents of the descrambling instructions but rather designates one of plural slots within the receiver PLD 461 where the descrambling instructions are stored. The volatilely stored descrambling instructions will be referred to herein as descrambling keys (or more simply DS-Keys). The DS-Keys are used for generating the skip/don't skip pattern under which the video line inverting circuit will operate. A complementary set of show scrambling keys (S-Keys) are stored in a similar volatile type of PLD 411 at the transmitter side.

The digital bits of each S-Key and each DS-Key identify a raster-style scan-through area in a unique one of plural look-up tables as earlier described for FIG. 3C or a unique one of plural algorithms or circuits which are used to generate the ones and zeroes of hypothetical look-up tables. The generated ones and occasional zero levels, whether produced from look-up tables or equivalent circuits, represent the scramble instructions 111 previously described. The odd/even start-line information (decision point 0) and the arbitrary skip-line information (decision points 1-F) of the scramble and descramble keys (S-Keys and DS-Keys) are preferably known only to authorized factory personnel who manufacture a show enciphering unit 402 contained within the transmitter 410 and a complementary set of show deciphering units 462 contained in the subscriber boxes (receivers) 460. During manufacture, the volatile PLD chips 411 and 461 are loaded with configuration information in a write-once/(optional read-back-once)/and-thereafterwards-externally-nonreadable mode 411a. This one-way trap door technique 411a of storing both the scramble and descramble (S and DS) keys prevents personnel at the transmitting station 410 or persons in possession of a subscriber box 460 from easily learning the contents of the scramble and descrambling instructions. The digital bits of the S-Keys and DS-Keys are stored in a volatile memory means such as static or dynamic random-access-memory (RAM) or registers within the PLD and these bits may be easily erased when an external but unauthorized access attempt is detected.

In accordance with the invention, the video scrambling process earlier explained with reference to FIG. 2A may be arbitrarily configured to include more than one skip-line per frame or field as shown for example in FIG. 3C, at field no. 3. The scramble keys (S-Keys) and corresponding show-scrambling patterns (scrambling instructions 111) may be used to define binary words, each having for example, a first bit indicating whether alternate line inversion is to begin at either the first or second viewable display line of a frame (decision point 0) and one or more other bits each representing a respective one or more decision points (skip-lines or block boundaries) at which the alternation process is to be skipped. In one embodiment, at least 14 decision points are provided for each video field (a frame has two fields), the fields are grouped into nonrepetitive field groups of at least 512 or 1024 fields each and each such field group defines the contents of a table contained in a pool of look-up tables having 128, 256 or more tables therein. The length of the tables is kept confidential and no table is fully played-out during a given show. This makes it difficult for would-be pirates to discover the length or full contents of the tables.

Referring now to the details shown in FIG. 4A, the transmitter section 410 includes a headend unit 401 and a video encoder module 402. A first programmable logic device (PLD) 411 such as a Xilinx XC3042 integrated circuit chip is provided within or as part of a substantially closed security enclosure 412. The security enclosure is a metal box or other means which is designed for securely housing within its interior, a memory means which stores digital data representative of sets of scramble instructions 111 and sets of encryption keys. The IC package of the PLD 411 may define part or all of the security enclosure 412 as well as all or part the memory means. The first PLD 411 forms a digital subsection 402b of the video encoder module 402. An analog subsection 402a of the video encoder module is also shown securely enclosed within the security enclosure 412 but it is typically provided separate from the PLD 411. Analog subsection 402a is shown extending into the interior of PLD 411 for the sake of illustrative expediency.

First PLD 411 is volatilely configured to have a first externally-nonreadable memory section 414 defined therein for storing scramble keys (S-Keys) in the form of digital bits. The PLD 411 is further configured to have a toggle circuit 424 defined therein for generating invert and noninvert control signals, VIX and VNX, according to scramble-pattern bits that are derived from the scramble keys (S-Keys).

The PLD 411 is yet further programmed to have a second externally-nonreadable memory section 416 defined therein for storing one or more encryption keys (E-Keys) in the form of digital bits. PLD 411 is yet further configured to define therein respective first and second digital data encrypting units, 415a and 415b. The encrypting processes carried out by units 415a and 415b are determined by a preselected one or more of the E-Keys stored in memory section 416.

The phrase "externally nonreadable" is used here to mean that the memory contents of a memory section within the first PLD 411 cannot be transmitted externally of the security enclosure 412 except perhaps once-only during an in factory test for verifying correct programming. The PLD memory contents are, however, accessible internally within the PLD 411. Since the configurations of the elements within PLD 411 are not externally readable, the design of the S-Keys, E-Keys and encrypting units (415a, 415b) which are defined therein may be kept proprietary.

A battery 403 or other uninterruptible power source is preferably used for powering the PLD 411 to maintain the volatile information within the PLD 411. Separation of the volatile PLD 411 from its power source 403 results in destruction of the configuration data. The electrical conductor from the battery 403 to the PLD 411 passes tightly over PLD 411. In one embodiment, the conductor is a visually nondiscernible segment of electrically conductive epoxy which is adhered to the PLD 411. This makes it difficult to nondestructively remove the PLD 411 from its printed circuit board for the purpose of dissecting the PLD 411 or otherwise probing it in an effort to discover its proprietary contents. Additional safeguards may be included to secure the configuration information of the first PLD 411 by providing a tamper-activated switch 404 which automatically interrupts the supply of power to the PLD 411 in the event that an attempt to open a housing enclosing the PLD 411 or some other attempt to tamper with the circuit is detected.

As earlier mentioned, in addition to the video encoder module 402, the transmitter 410 includes a headend unit 401. The headend unit 401 supplies a scramble key select signal 423 through the security enclosure 412 to an address input port of the externally-nonreadable memory section 414 in which the proprietary set of S-Keys are stored. The particular S-Key specified by the select signal 423 is then transmitted within PLD 411 to the toggle control circuit 424. In response, the toggle control circuit 424 produces a sequence of mutually exclusive invert and noninvert pulses, VIX and VNX, one after the next except at lines of a video frame where the selected S-Key commands a sequence skip operation.

Parts of the scramble circuit 300 shown in FIG. 3A may be defined within the first PLD 411 to provide the toggle control function 424. In one embodiment, memory unit 360 of FIG. 3A corresponds to the S-Key storage means depicted as 414 in FIG. 4A. A microcomputer (not shown) may be coupled to the toggle circuit 424 and S-key storing unit 414 in order to establish unique sequences of VIX and VNX pulses as indicated by FIG. 3C. The resulting VIX and VNX digital pulses are transmitted to an analog scrambling unit 413 having a structure corresponding to the analog portion of the video scrambling (or descrambling) circuits 300 or 301 shown in FIG. 3A or FIG. 3B.

A nonscrambled analog show signal (original video show signal) 420 is supplied from the headend unit 401 through the security enclosure 412 to the analog input side of the scrambling unit 413. A corresponding scrambled analog show signal 421 which is scrambled according to the S-Key selected by signal 423 is then output at the analog output side of the scrambling unit 413. The signal scrambling process of the scrambling unit 413 is controlled by the selected S-Key signal that is transmitted from the securely enclosed memory unit 414 to the toggle circuit 424.

The scramble key selecting signal 423 output from headend unit 401 is further coupled within the first PLD 411 to a digital signal combining unit 425 where it is digitally combined with (i.e., concatenated to) an in-band authorization signal 429 also generated by the headend unit 401. The in-band authorization signal 429 is passed into the security enclosure 412 and coupled to the enclosed combining unit 425. The combined digital signals (423 and 429) define a composite digital signal 430 which passes through the first encryption unit 415a to be encrypted in accordance with a first E-Key stored in the securely enclosed E-Key memory unit 416. The resulting encrypted composite digital signal 431 (hereafter also encrypted control signal 431) is coupled to a superposing unit 418 which superposes the encrypted control signal 431 on the vertical blanking interval (L01 to L21) of a video frame whose viewable lines are formed by the scrambled show signal 421.

The combination of the scrambled video signal 421 and the encrypted control signal 431 defines a composite frame signal 441. The composite frame signal 441 is transmitted across a video transmitting channel 440 to one or more subscriber boxes 460.

The transmitting channel 440 may be a radio-frequency broadcast channel (i.e., in the 50 MHz to 450 MHz range), a satellite channel or a cable TV channel which is easily accessed by a large number of subscribers or nonsubscribers. Among the subscribers and/or nonsubscribers there may be a number of people who want to but are not authorized to enjoy the show content (420) of the received composite frame signal 441. Since the transmitted version of the show 420 is the scrambled show signal 421 and since the scramble instructions 111 are represented within the transmitted frame signal 441 only by the encrypted control signal 431, a compatible and properly authorized subscriber box 460 will be needed at the receiving end for enjoying the transmitted frame signal 441.

Figure 4C:
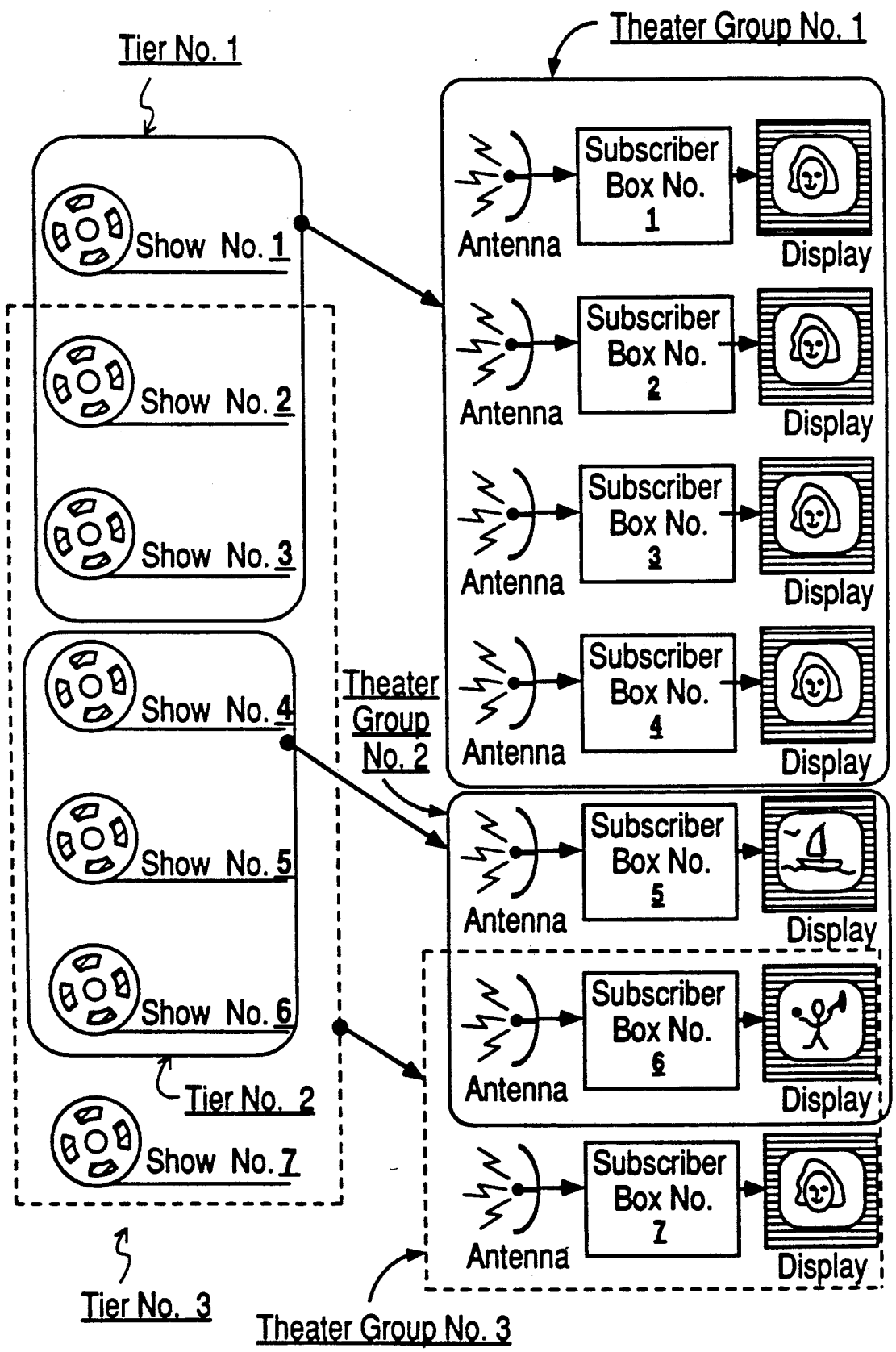
FIG. 4C is a Venn diagram for explaining how subscriber boxes are assigned to theater groups and how shows are assigned to tiers.

The in-band authorization signal 429 which forms part of the composite frame signal 441 may include digital commands addressed to an individual one or more of the plural subscriber boxes 460 located at the receiving end of the open channel 440. One such command assigns an addressed box to a predefined theater group. Referring to FIG. 4B, it can be seen that each subscriber box has a unique box identification number (abbreviated BIDN) 460a by which it may be addressed. Referring to FIG. 4C, individual boxes 460 may be authorized to join one or more theater groups by toggling theater group bits in an authorization bit map contained within a writable memory section of each box 460. A first theater group may be authorized to enjoy a particular show while a second theater group is not. As shown in the Venn diagram of FIG. 4C, shows are assigned to tiers much in the same way as subscriber boxes are assigned to theater groups. A show can belong exclusively to one tier or to many tiers. A box can belong exclusively to one theater group or can be included in many theater groups. Each subscriber box 460 thus has a large menu of entertainment options for which it can be authorized. The show provider can assign different costs to each of the entertainment options and tailor the end receiver's authorization bit map according to payments received for the options.

The in-band authorization signal 429 of FIG. 4A may be structured to include digital commands for authorizing a predefined theater group to enjoy a predetermined set (tier) of show options by setting corresponding bits in the authorization bit maps of corresponding boxes 460. Moreover, the authorization signal 429 may include digital text messages which are to be displayed only on the screen of an individual subscriber box or on the screens of a designated one or more predefined groups of subscriber boxes. These options are denoted at 422 and 427 of FIG. 4A.

As further depicted in FIGS. 4A and 4B, a telephone network 445 may be optionally used to bidirectionally exchange out-of-band authorization-request and/or authorization-grant signals 428 between the headend unit 401 and one or more individual subscriber boxes 460. Out-of-band exchanges are defined here as communications carried over private channels rather than over public channels. These out-of-band telephone signals are receivable by a receiver just like a private telephone call. The authorizations received in this manner are processed similarly to those received in-band. They are merely introduced to the subscriber box 460 through a different port. Such out-of-band exchanges may be encrypted and decrypted if further security is desired by passing them through the second encrypting unit 415b within the transmitter enclosure 412 and a corresponding decrypt unit 465b within the subscriber box 460 (see FIG. 4B) using the encryption keys and decryption keys (E-Keys and DE-Keys) which are pre-stored in the PLD's 411 and 461 of the transmitter and receiver respectively.

As an alternative to bidirectional out-of-band request and authorization, a request from a specific subscriber box 460 to the headend 401 may be transmitted through the out-of-band channel 445 and a responsive authorization signal 429 may be transmitted in-band over the public channel 440. The in-band authorization signal is addressed to that specific box 460 which sent the out-of-band request. In this alternate approach, a subscriber keys in a desired show option into an optional keyboard attached to his subscriber box 460, the subscriber box 460 passes the request through encrypting unit 465b and transmits the encrypted request over the telephone network 445. The request is then passed through decrypting unit 415b and forwarded to the headend unit 401. If the request is found proper, the headend unit 401 then transmits authorization over open channel 440 to the subscriber box 460 of the requesting subscriber. This approach allows subscribers to request individual shows and pay for each show individually as desired.

Referring to top and bottom ends of FIG. 4A, the operative structure (which is defined in part by PLD 411) of the video encoder module 402 is preferably configured by a PLD configuring unit 450. Referring to FIG. 4B, this same configuring unit 450 is also used for configuring a complementary video decoder unit 462 in each of the subscriber boxes 460. The encryption key (E-Key) and scramble keys (S-Keys) of the video encoder (transmission enciphering) unit 402 may be kept secret by limiting access to the configuration data produced by the PLD configuring unit 450. Once the E-Key and S-Keys are written into the externally-nonreadable memory sections of the volatile PLD's 411 and 461, it is difficult to extract the same data out of the PLD's. Accordingly, even though personnel at a transmitting station may have possession of the transmission enciphering unit 402, they are effectively prevented from learning what scramble keys (S-Keys) are stored in the externally-nonreadable memory section 414 and from learning what encryption keys (E-Keys) are stored in the externally-nonreadable memory section 416.

Referring to FIG. 4B, there is shown a block diagram of the complementary transmission deciphering unit (video decoder module) 462 included in each subscriber box 460. The transmission deciphering unit 462 is secured in a substantially closed security enclosure 469. The IC packaging of the receiver PLD 461 may define part or all of the security enclosure 469. The deciphering unit 462 includes an analog subsection 462a and a digital subsection 462b. The digital portion 462b is defined within a configurable logic array device (PLD) 461 such as a Xilinx XC3020 or XC3042 integrated circuit.

The enciphered video frame signal 441 transmitted from the transmitter 410 over the public channel 440 is received by a signal splitting unit 468 within the security enclosure 469. Splitting unit 468 splits (divides) composite signal 441 into a received-but-still scrambled analog show signal 421* and a received-but-still encrypted digital control signal 431*. (Asterisks are used here to indicate the relation between the original non-encrypted signals and encrypted versions of these signals such as occurs between signals 431 and 431*.) The encrypted control signal 431* is passed through a first decryption unit 465a within the receiver PLD 461. This first decryption unit 465a performs a decryption operation complementary to the encryption operation performed by the first encrypting unit 415a (FIG. 4A). Decryption within the first unit 465a is carried out in accordance with a first decryption key (DE-Key) stored in an externally nonreadable memory portion 466 of the receiver PLD 461. The deciphered digital control signal 430 which is produced by the first decrypting unit 465a is divided at separating unit 475 into a descrambling-key selecting signal 476 which is supplied to the address input port of an externally-nonreadable memory unit 464 within the receiver PLD 461 and another signal 477. (The double asterisks at the end of 430 indicate that signal 430 has been once processed to form encrypted signal 430* and then processed a second time to form supposedly decrypted version 430**.). The memory unit 464 contains a plurality of secret descrambling keys (DS-Keys) which are complements of the scramble keys used in the transmitter 410. When an appropriate descramble key (DS-Key) is selected and applied to second toggle circuit 474, the received but still scrambled show signal 421* is descrambled by descrambling unit 463 to produce a descrambled show signal 420. If the wrong DS-Key is selected, the produced signal 420 will not be enjoyable.

Separating unit 475 also extracts a deciphered authorization signal 477 from the deciphered control signal 430. The authorization signal 477 is supplied to an internally contained, local authorization control unit 478 of box 460. The local authorization control unit 478 operates a show-outputting switch element 472 for allowing the output signal 420 of the receiver's video descrambling unit 463 to be output externally of enclosure 469 and thus enjoyed. The local authorization unit 478 contains suitable memory means wherein there are defined the theater group bit map which assigns the local subscriber box 460 to one or more theater groups and the tier assignment bit map which assigns tiers to each theater group.

The descrambling keys (DS-Keys) of memory unit 464 are initially defined and stored in the PLD configuring unit 450 which also provides the S-Keys to the complementary transmission enciphering unit 402 within the transmitter 410. Non-authorized persons in possession of the subscriber box 460 are prevented from reading back the DS-Keys stored in the externally-nonreadable memory section 464 and from reading out the DE-Keys (decrypting keys) stored in the externally-nonreadable memory section 466. Accordingly, information required for decrypting and/or descrambling the composite transmission signal 441 is secreted away from both personnel at the transmitting unit and from persons in possession of a deciphering unit 462 at a receiving end of the system 400.

As earlier mentioned, each deciphering unit 462 is loaded with a unique subscriber box identification number, BIDN, which is stored in a local memory means 460a. This BIDN identification number is used by the local authorization control unit 478 to determine whether to flip various bits in its group and tier bit maps thereby to assign the local box 460 to a particular theater group and/or tier, and by such association, enable the subscriber to enjoy a show within a tier to which the theater group has access. Access switch 472 is closed by the authorization unit 478 when the local box 460 is found to be entitled to enjoy the received show signal 421 and the same access switch 472 is opened when the local box 460 is not so entitled. An enjoyable show signal 480 is not output from subscriber box 460 unless access switch 472 is closed.

To secure the information stored in memory sections 464 (DS-Keys) and memory section 466 (DE-Keys), an interruptable power supply 473 (e.g., a lithium battery) is housed within the security package 469. If a breach of the security enclosure 469 is detected, a power interrupting switch 474 opens, the power to the volatile memory sections 464 and 466 is interrupted and the DE and DS keys are erased.

Figure 5B:
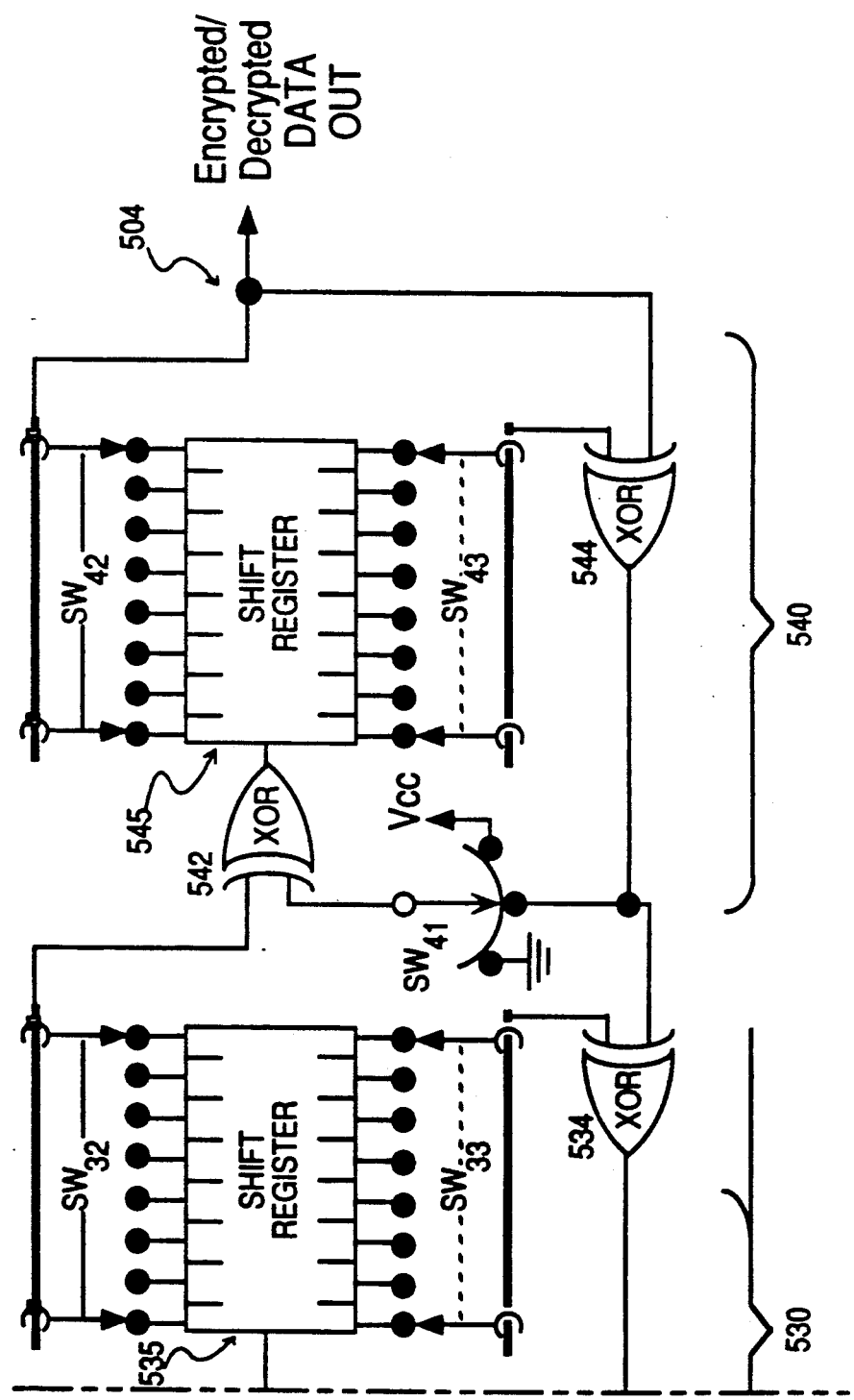

Referring to FIGS. 5A and 5B in combination, there is shown a schematic diagram of a generic data encryption circuit 500. The circuit 500 comprises of a plurality of exclusive OR gates (i.e., 512, 522, 532 and 542) for selectively inverting digital data as it passes through various points in a chain of serial shift registers 515, 525, 535 and 545. Electronically controllable switches (i.e., $SW_{12}$, $SW_{13}$, $SW_{22}$, $SW_{23}$, etc.) are provided for selecting output tap points of each shift register. A data feedback loop formed for example of exclusive OR gates 544, 534, 524 and 514 may be employed to redundantly shuffle (rotate) the data as it passes through the shift registers. A predetermined encryption key (E-Key) determines the settings of all the switches shown in FIGS. 5A and 5B as well as the initial data which is loaded into the shift registers prior to the introduction of data that is to be encrypted. Those skilled in the art will realize that a complementary decryption circuit may be suitably formed with the same circuit 500 by generating a decryption key which causes the signal to, in essence, flow in a time reversed manner through the circuit 500. It is to be understood that the data encryption circuit 500 of FIGS. 5A and 5B is merely exemplary and that any one of numerous means may be used for defining a data encryption/decryption system, such as for example DES encryption systems used commercially or in military applications. It is also to be understood that for many variations of circuit 500, a pseudo-random number generator may be formed by feeding the data output signal back to input line 501. Such a pseudo-random number generator may be defined in a PLD or it may be defined from a CPU in combination with software instructions in a memory means. The pseudo-random number generating means may be used for generating the ones and occasional zeroes data streams (1111 ... 0 ... 1111) which are coupled to the enable (EN) terminal of the toggle flip-flop 335' shown in FIG. 3C.

The generic encryption circuit 500 is divided into sections 510, 520, 530 and 540. A digital bit stream which is to be encrypted or decrypted is input at input terminal 501. A corresponding encrypted/decrypted bit stream emerges at output terminal 504. For the sake of brevity, the operation of only the first circuit section 510 will be described and it will be understood that similar operations occur within the succeeding sections 520, 530 and 540. Each input bit entering on terminal 501 is selectively inverted or left in an uninverted state as it passed through exclusive-OR gate (XOR) 512, depending on the setting of switch $SW_{11}$. When switch $SW_{11}$ couples the second input terminal of the XOR gate 512 to ground, no inversion takes place. When switch $SW_{11}$ couples the second input terminal of XOR gate 512 to $V_{cc}$, all the input bits on input terminal 501 are inverted before entering shift register 515. When switch $SW_{11}$ couples the second input terminal of XOR gate 512 to the output terminal of XOR gate 514, inversion will take place or not take place depending on the logic level output by XOR gate 514. Tap points are provided for accessing any desired stage of shift register 515. Switch $SW_{12}$ is programmably set to couple a predetermined tap point of shift register 515 to the input terminal of the XOR gate 522 in the next section 520. Switch $SW_{13}$ is programmably set to select the same or a different tap point for generating a feedback term from the shift register 515 to feedback XOR gate 514. XOR gate 514 receives a further feedback signal from the output of XOR gate .524 in the next succeeding section 520. A relatively long feedback path is provided by the coupling of output terminal 504 to the input of the first XOR gate 512 through feedback gates 544, 534, 524 and 514. Relatively shorter feedback paths may be provided within each encryption section (510-540) by appropriate setting of corresponding feedback switches $SW_{13}$-$SW_{43}$. It will be apparent that unless a person knows of the full structure (e.g. shift register length) of the circuit 500 and the settings of all initial states and switches that is difficult to decrypt an encrypted signal. Units 415 and 465 of respective FIGS. 4A and 4B are appropriate variations of circuit 500 for securing the data 441 transmitted over channel 440.

Referring to FIG. 6, there is shown yet another show distribution system 600 in accordance with the invention. The distribution system 600 includes a headend section 610 into which there is fed original audio and video signals 620. One or more audio signals may be paired with a video signal to define an audio-visual show. The original show signals 620 are coupled to audio and video encoder modules 630 wherein they are appropriately enciphered (scrambled or encrypted) according to encrypt and scramble instructions supplied from a corresponding set of headend computers 640. The encrypt and scramble instructions of the headend computers 640 are selected by an encipher-scheme selecting module 650. The selecting module 650 supplies a set of current key identification numbers (KIDN's) 651 to the headend computers 640 for selecting predefined ones of the audio encrypt and video scramble schemes available within the headend computers 640.

The key selecting module 650 further supplies future key identification numbers (KIDN's) 652 which it plans to use in the future to an encryption module 660 which encrypts the future KIDN's 652 to thereby produce encrypted future KIDN's 652*. At arbitrarily determined times, the encipher scheme selecting module 650 switches the current KIDN's 651 which it feeds to the headend computers 640 to the values of previously produced "future" KIDN's 652. At start-up, the selecting module 650 selects a set of KIDN's already known to the subscriber boxes 692. Each subscriber box 692 at the other end of the transmission channel needs to somehow have both the current KIDN's 651 and the future KIDN's 652 loaded into it so that it can decipher present transmissions but quickly switch over to the future KIDN's when a switch-over is commanded. At a predetermined time before the switch-over takes place, the selecting module 650 sends a switch-over advance-warning command 653 to encrypt unit 660. In response, the encrypt unit 660 produces an encrypted version of the switch-over command signal 653*. The encrypted future KIDN's 652* and/or encrypted switch-over signals 653* are combined within the encoder modules 630 together with corresponding encrypted audio and scrambled video information 620* (not shown) to produce secured information signals 631 for transmission by transmitter units 670 over an open channel to receivers at a tailend 690 of the channel.

A show signal 620 may have its encrypted audio and scrambled video counterparts 620* transmitted together over a single channel or these counterpart signals 620* may be sent over different channels. A first portion 680a of each transmittable signal may for example be transmitted over a broadcast link 681 while a second portion 680b of the transmittable information is transmitted over a second channel 682 such as a satellite uplink to an orbiting communications satellite 683. In one embodiment, satellite signal 680b comprises both video and audio information which are respectively received at the tailend 690 as satellite signals 684a and 684b.

At the tailend 690 of the system 600, the transmitted signals 680 are received via one or both of the broadcast link 681 and a satellite downlink 684. The corresponding received signals, 681a and/or 684a, 684b are applied to a subscriber box 692. Each subscriber box 692 has an individual box identification number (BIDN) by which it may be individually addressed. Control signals are included in the transmitted signals 680 for assigning each subscriber box 692 to one or more theater groups and for authorizing members of each theater group to enjoy shows belonging to one or more tiers. Within the enciphered information received by the subscriber box 692 are the encrypted future KIDN's 652* and switch-over warning commands 653* needed for descrambling and/or decrypting the enciphered show signals 620*. The deciphered output 694 of the subscriber box 692 is applied to a monophonic or stereophonic television set 695 which then reproduces the original show information 620 for enjoyment by authorized users.

Individual subscriber boxes 692 or predefined groups thereof (theater groups) may be authorized to enjoy preselected shows by sending appropriate authorization signals over the public channels 681 and/or 682, 684. Alternatively, authorization may be provided through an out-of-band channel such as a telephone network 687 which connects the subscriber box 692 to a headend 610. A "toll gate" system (not shown) determines which subscriber boxes will be assigned to which theater groups and which shows will be assigned to which tiers. For in-band authorization, a subscriber box automatically sends its BIDN and a request-for-authorization signal to the headend 610 over telephone link 687. The headend 610 then determines whether such authorization is warranted, and if it is, sends authorization signals to the BIDN addressed box over the public channels 681 or 682, 684.

For out-of-band authorization, the toll gate is coupled to an out-of-band authorization module 685 which, when dialed up by the subscriber box, sends authorization signals 686 through the telephone network 687 to the dialing subscriber box 692, and accesses the subscriber box 692 through an out-of-band port 688. The out-of-band authorization module 685 can call the subscriber box 692 to collect information about shows watched by the subscriber. Such information can be of use to the system operator. In one embodiment, new or extended authorizations are sent by the module 685 to the subscriber box 692 during such information collecting calls.

Referring to FIG. 7, the internal structure of a subscriber box 692 in accordance with the invention will now be described broadly. Enciphered satellite signals 684a and 684b which respectively arrive as main carrier and subcarrier band signals that respectively contain video and audio information enter the box 692 through an RF receiver 750. A video demodulator 752 extracts a composite video signal including scrambled video information and enciphered video authorization information from the received video signal 684a. An audio demodulator 754 likewise extracts encrypted audio PCM signals and audio control signals from the received audio signal 684b. The received video and audio signals are then processed separately and afterwards combined in a show information combining and remodulating module 693. A secured internal portion 699 of the box 692 is hypothetically divided into a video side 699a and an audio side 699b for simplifying the explanation.

The video demodulator 752 demodulates the received video signals and sends them through a security enclosure 699 of the subscriber box to a video decoder module 800 housed therein at the video side 699a. The video decoder module 800 splits the received video signal into control and show portions. The control portions are sent over link 801 to a video enjoyment authorization module 700 contained within the subscriber box enclosure 699. If the video enjoyment authorization module 700 determines from the control signals of link 801 that the subject subscriber box 692, as identified by a unique video box identification number (Video BIDN) stored in memory unit 692a, should be entitled to enjoy the received video signal, then a video entitlement signal is sent back to the video decoder module 800 over link 801. The video decoder module then descrambles the received video signal and supplies a descrambled video signal over link 802 out through the security enclosure 699 to the show information combining module 693 also contained within the subscriber box 692. If the video enjoyment authorization module 700 does not send an entitlement signal to the video decoder module 800, then a descrambled video signal is not supplied to the show information combining module 693.

Similarly, the audio demodulator 754 demodulates the received audio signal and sends it through the security enclosure 699 to an audio decoder module 900 housed in the audio side 699b of security enclosure 699. The audio decoder module 900 splits the audio signal into a control section which is sent over bidirectional link 901 to an audio enjoyment authorization module 760 and into a show portion which is to be sent over link 902 to the show information combining module 693 if the box 692 is authorized to enjoy it. When the audio enjoyment authorization module 760 determines from the control signals received over link 901 that the subject subscriber box 692, as identified by a unique audio box identification number (Audio BIDN) 792a, should be entitled to enjoy the received audio signal, then an audio entitlement signal is sent through link 901 to the audio decoder module 900 to enable the audio decoder module 900 to de-encipher the audio signal and thereby provide an enjoyable audio show signal over link 902.

If the video show portion sent over link 802 and the audio show portion sent over link 902 are both appropriately deciphered, the show information combining module 693 remodulates and outputs the combined video and audio show portions as an audio visual show signal 694 that can be used by a monophonic or stereo TV set. Out-of-band communications modules 702a and 702b couple authorization modifying signals from an out-of-band communications channel 688 to the respective enjoyment authorization modules 700 and 760 for reading and/or modifying authorization information contained therein.

Electrical power to the modules within the subscriber box 692 is supplied from an external power source 796 through an external power supply unit 696, through the security enclosure 699 to internal video and audio power supply module 697a and 697b. From the internal power supply module 697a, power is supplied to the video side modules, 700 and 800. From the internal power supply module 697b, power is supplied to the audio side modules, 760 and 900. The electrical power of the audio side 699b passes through a security module 698 before being applied to the other audio modules, 760 and 900, within the subscriber box 692. The security module 698 also receives power from a battery 798. The battery 798 is coupled to the security enclosure 699 by a breakable conductor in a manner which allows the security module to detect an attempted breach of the security enclosure 699. A tamper detect line also couples hidden switches or breakable lines directly to the security module 698 for detecting attempts to breach the security enclosure 699. When a breach is signaled, the security module 698 cuts off power to the audio side modules within the subscriber box 692 thereby erasing proprietary information contained within volatile memory sections of the audio side 699b. As it is cutting power off to the volatile memory sections of the audio side 699b, the security module also issues a tamper detect signal to the video side modules. The tamper detect signal is used to initiate a microprocessor-controlled erasure of sensitive information within non-volatile-but-erasable (i.e., electrically erasable programmable read-only memory, EEPROM) used within the video side 699a of subscriber box 692.

Figure 8A:
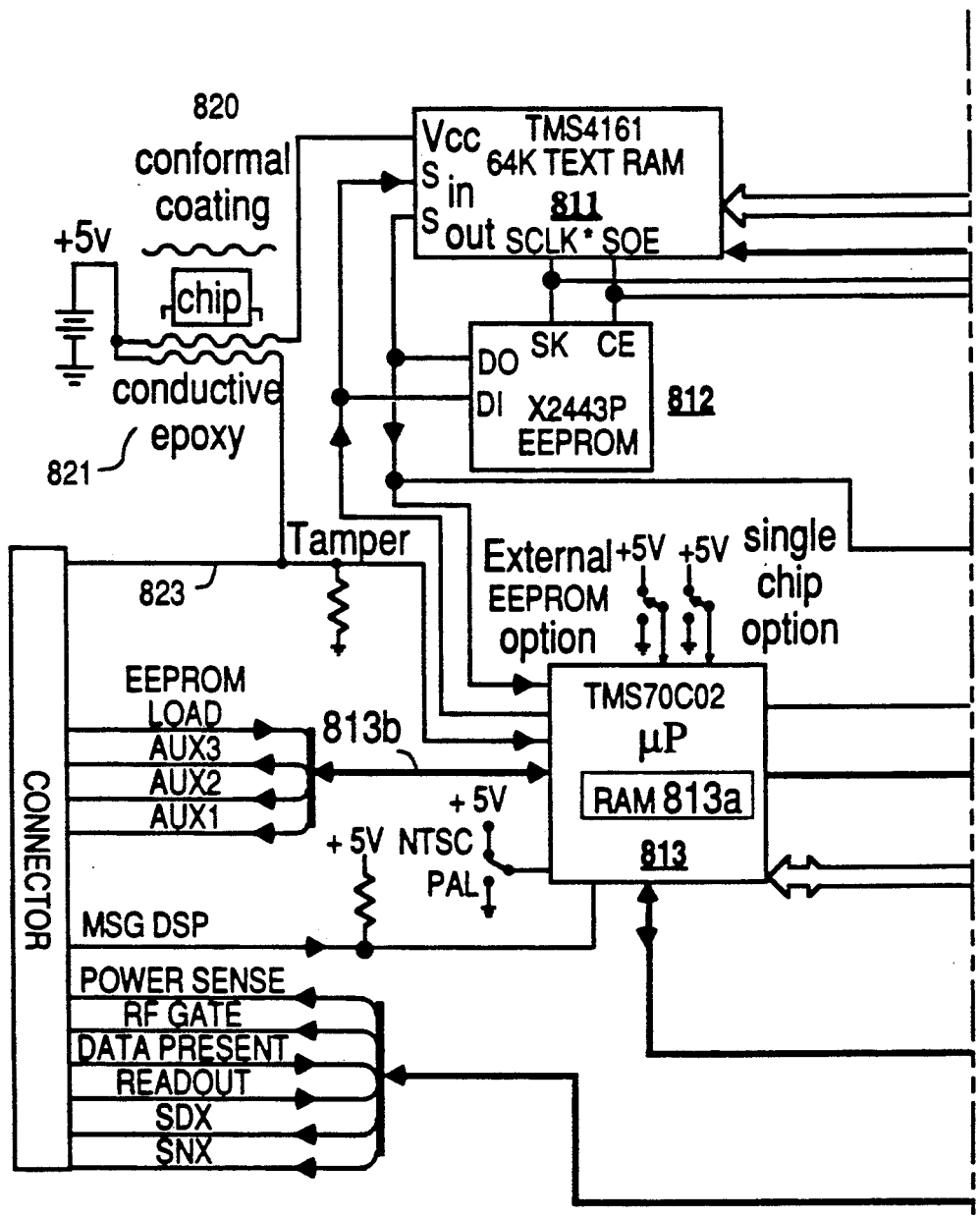
FIG. 8A is a schematic of a digital portion in a video decoder module according to the invention.
Figure 8B:
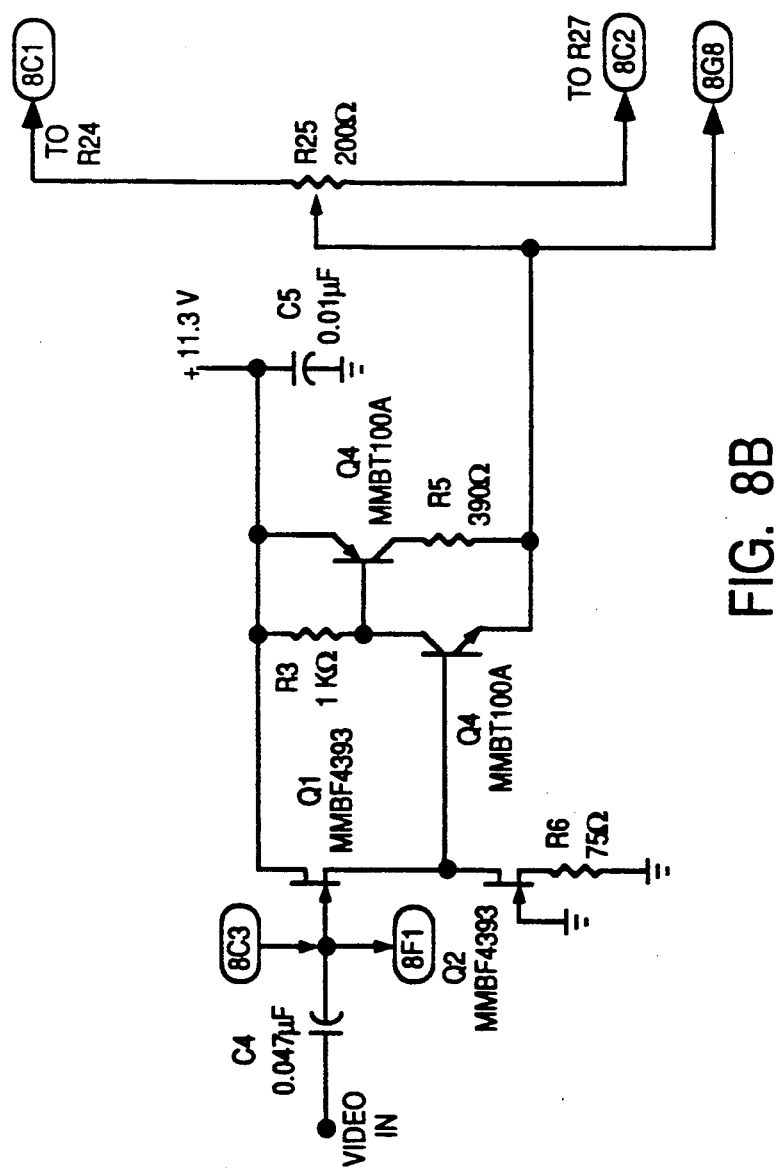
FIGS. 8B-8H are schematics of an analog portion of a video decoder module according to the invention.
Figure 8C:
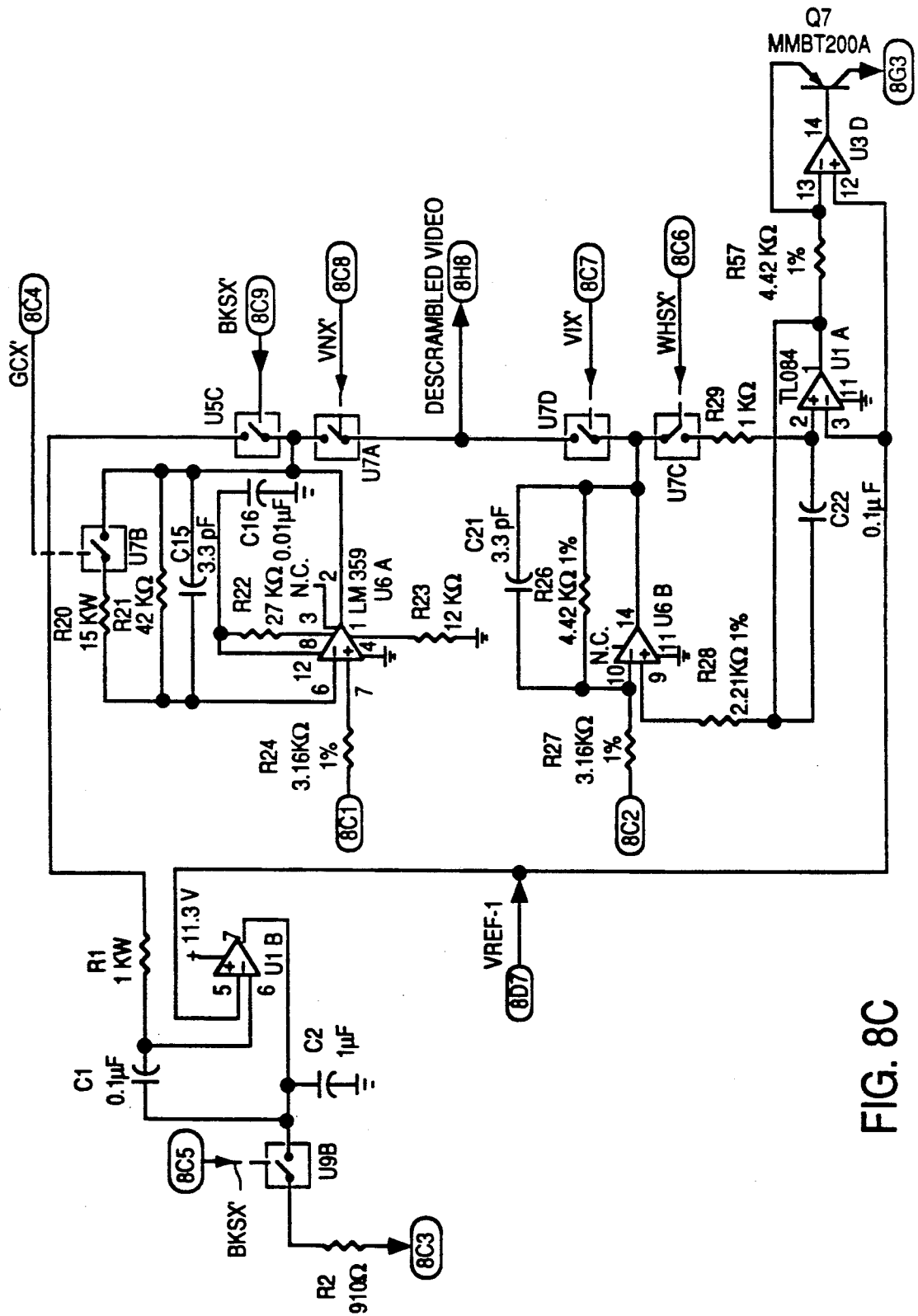
Figure 8D:
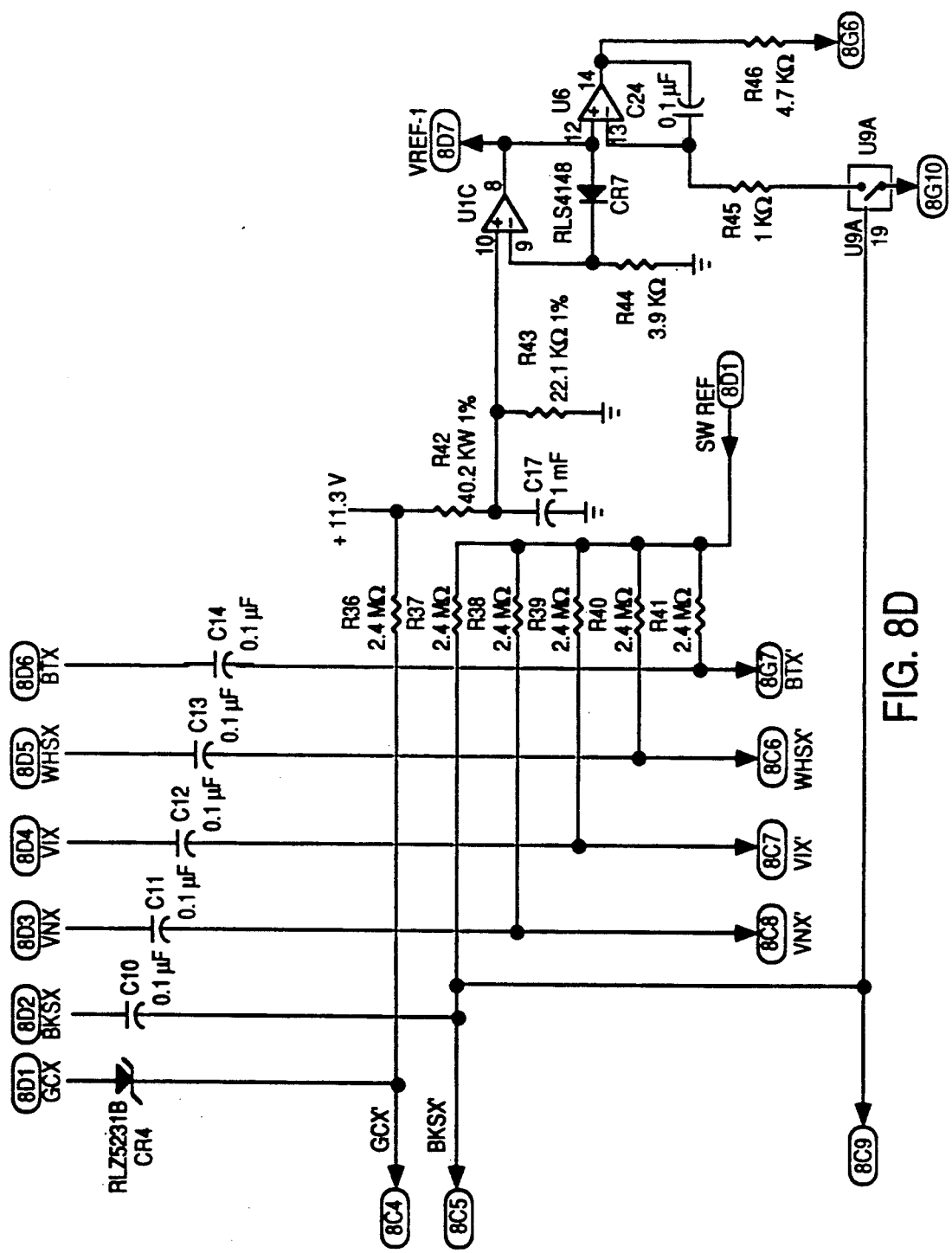
Figure 8E:
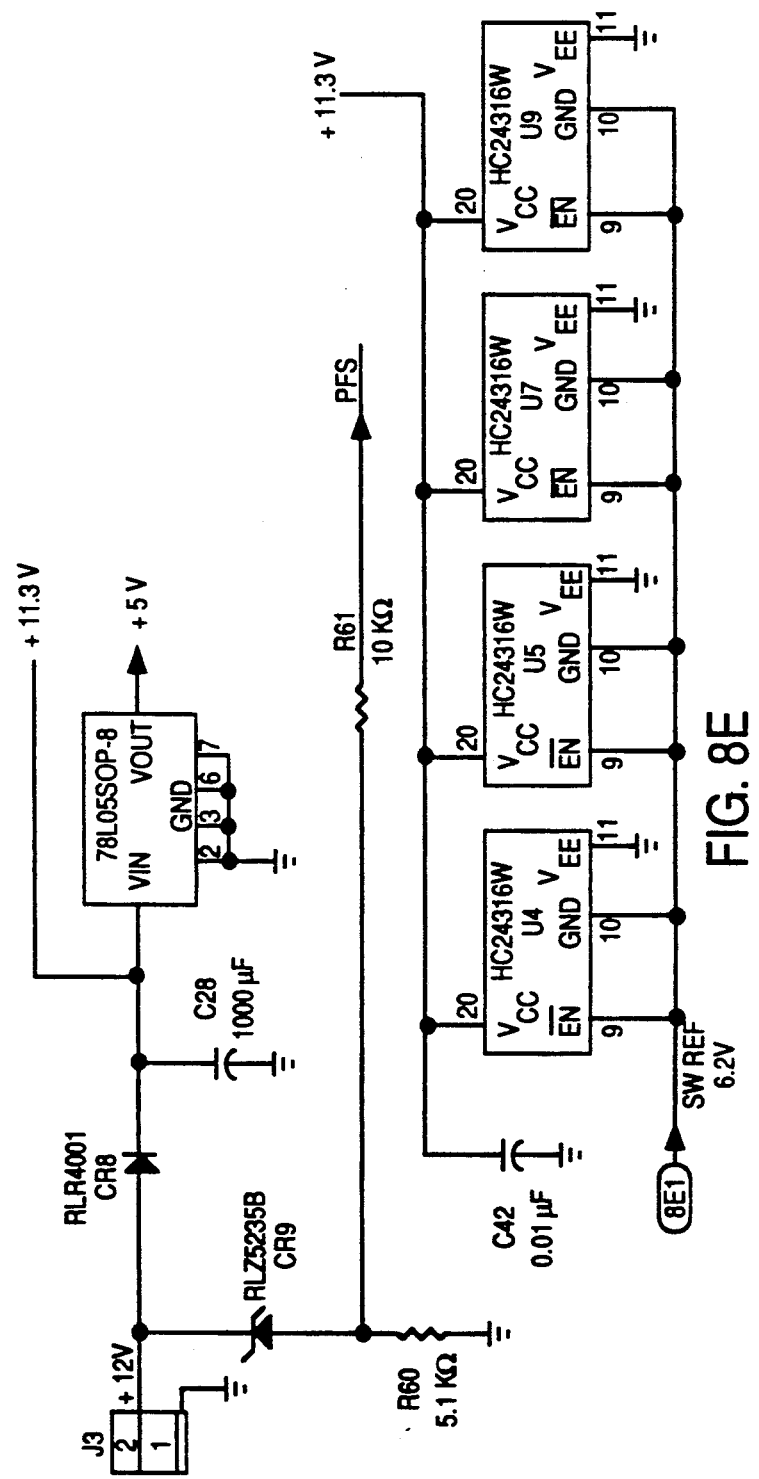
Figure 8F:
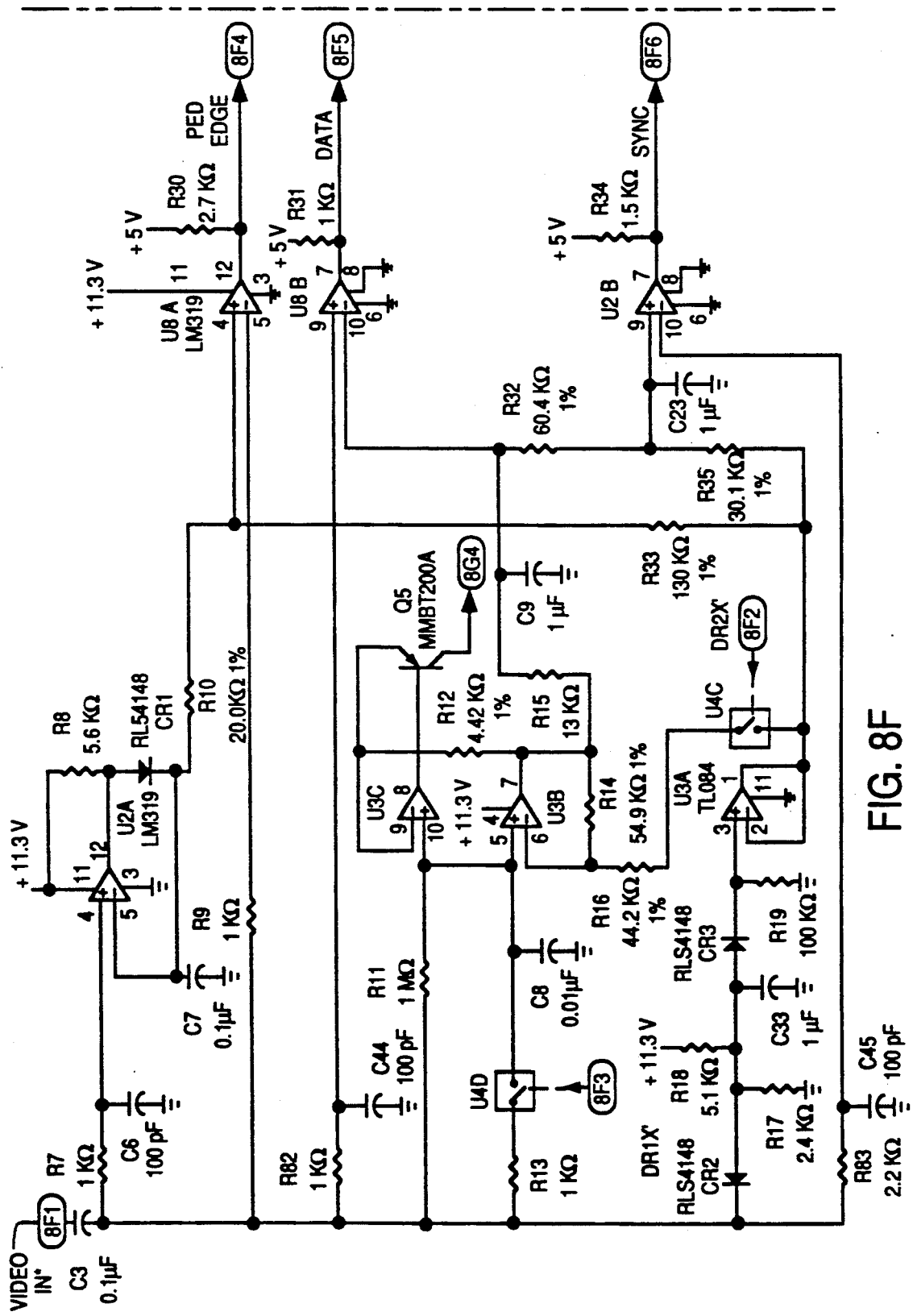

Referring to FIGS. 8A–8I, one embodiment of the video side 699a of FIG. 7 will now be described in more detail. For this part of the discussion, modules 800, 700, and 692a are all considered part of the video decoder side. FIG. 8A is a block diagram of a digital subsection 800d of the video decoder side. FIGS. 8B–8H illustrate analog subsections of the video decoder side. Interconnections between the circuit parts of FIGS. 8A through 8H are denoted by oval surrounded reference numbers of the form 8XY where 8X refers to a Figure number containing the connection point and Y is a unique connection number.

Referring first to the digital subsection 800d of FIG. 8A, a video decoder control computer is defined by a TMS70C02 microprocessor (available from Texas Instruments) 813, a nonvolatile EPROM section (27C64, available from Intel Corporation) 814, a nonvolatile but electrically erasable EEPROM memory section (X2443P, available from Xicor) 812, and a volatile 64K RAM memory section (TMS4161 available from Texas Instruments) 811. The video decoder computer is coupled to an application specific integrated circuit (ASIC) chip 815 which provides an interface between the relatively slow digital signals of the microprocessor 813 and the relatively high speed signals required for operating video control signals such as the video normal and video inverted switch control signals, VNX and VIX.

The 64K RAM 811 stores video-text information intended to be displayed on the subscriber's screen. This information is downloaded over time from the headend transmitter into the text RAM 811. When downloading is complete, the assertion of a MSG DSP line causes the microprocessor to flag the ASIC 815 and initiate a serial transfer process which sends the text through the ASIC 815 for display on the viewer's screen. The message information in RAM 811 is updated by sending message data in the vertical blanking interval data lines attached to either an individual address command, a group command, or an all-call command. These commands, which will be described later, identify which subscriber boxes will store general or box-specific message data in their respective video-text RAMs 811.

The nonvolatile ROM (EPROM) 814 stores a program executed by the microprocessor 813. The program is burnt into the ROM 814 at the time of manufacture. A listing of such a program is found in microfiche Appendix A.

The nonvolatile but overwriteable EEPROM unit 812 stores three types of information: fixed, system variable and short-term variable. The fixed information includes a video BIDN loaded at the time of manufacture. By setting a write-disable bit in the EEPROM 812, one can instruct the microprocessor 813 to keep the fixed information unchangeable.

The system variable information specifies the settings of certain long term options. The options include automatic periodic output of the subscriber box status over the serial port of the microprocessor, automatic display of error messages on the subscriber's screen, enabling the tamper-detect and automatic erase functions, enabling an automatic timeout function to clear all box authorization bits if the subscriber box is not updated by a new authorization signal from the headend in a specific period of time, enabling a show preview function to allow initial 2 minute viewing of unauthorized programs, enabling the descrambling functions of the subscriber box and fixing the BIDN value as fixed information. The BIDN can be written once into EEPROM 812 during manufacture, and is made unchangeable thereafter by setting the fixing bit in the EEPROM 812 as described above. System variable information is loaded into the EEPROM 812 through a serial port 813b of the microprocessor 813 when the box is configured for a specific pay-per-view system. The system variable information can be read or changed through the serial port while in the field as well as at the factory.

The short-term variable information held in the EEPROM 812 is the authorization information of keys, tiers and groups, as will be described in further detail when FIG. 8I is explained. The short-term variable information is updated by command data signals sent in the vertical interval data lines from the headend 610. These data signals are sent with individual BIDN addresses or group identifiers to specify the subscriber boxes which will respond to the commands and upgrade the short-term variable information in their EEPROMs 812. The data signals are sent to a 256 byte internal RAM section 813a within the microprocessor 813 by the ASIC chip 815 as described below, and if these data represent a change in the short-term variable information, then the microprocessor 813 transfers the data from its internal RAM 813a to the EEPROM 812. Alternatively, the short-term variable information can be upgraded by data entered through the serial port 813b of the microprocessor 813. The information in the EEPROM 812 is preferably scrambled and assigned a checksum which is a function of the box-unique BIDN as well as recently-downloaded short-term information. Tampering with the information stored in the EEPROM 812 may cause the microprocessor 813 to read an incorrect checksum and upon such an occurrence it will immediately begin to clear all authorization bits within the EEPROM 812.

The video ASIC 815 provides a high speed extension to the I/O functions of the microprocessor 813. It may be hard for the relatively slow microprocessor 813 to keep up with the incoming video data. The ASIC 815 receives digitized parts of received video signals from the analog sections of the decoder. The analog sections are schematically shown in FIGS. 8B-8H. The ASIC 815 processes the digitized signals and sends some of the signals to the microprocessor 813 as described below. All intelligent functions and decisions are made by the microprocessor 813 and it, in turn, activates certain lines or functions within the ASIC 815 in order to cause the mechanics of the descrambling to occur at high speed. The ASIC chip 815 is clocked by a 7.15909 MHz clock signal so that it can keep up with serial information contained in the incoming video signal.

The ASIC 815 receives three video related signals from the analog section: (1) pedestal edge, (2) separated sync, and (3) control data. These are produced at respective connection points 8F4, 8F6 and 8F5 of FIG. 8F.

The Pedestal Edge signal (8F4) is generated by setting a slice level about 15% below peak white amplitude. This signal is used only in the scrambled mode for deriving accurate horizontal timing from the video since the inserted bogus horizontal sync pulses are jittering. The Pedestal Edge signal (8F4) is coupled on an H-sync regenerator 815a within the ASIC 815 during the scrambled mode to generate and synchronize Horizontal Drive (HORIZ DRIVE) pulses which substitute for the original non-bogus H-sync pulses that have been stripped out of the original video signal prior to transmission. The Horizontal Drive pulses are fed to the microprocessor 813 to signal the beginning of each video line in the scrambled mode. In the unscrambled mode, the separated sync pulses (8F6) are used to produce the Horizontal Drive pulses.

The Separated Sync signal (8F6) is generated by setting a slice level HS at 50% of the H-sync amplitude (between compressed black and super black as shown in FIG. 2D). Pulse width information about the width HW of the bogus horizontal sync pulses in the incoming video is derived from the separated sync signal by starting and stopping a timer as HS crossings are detected (using for example the >HS digital signal, as earlier described with relation to FIG. 2E). Information about the timing of the vertical blanking interval is derived within ASIC 815 from the pulse width information HW and then transferred to the microprocessor 813 over the L10/N1 signal line. The processing of the separated sync signal by the ASIC 815 with regard to pulse width information changes the L10/N1 output signal in such a manner that the microprocessor 813 can determine if the incoming video is scrambled or not. If nonscrambled video is present, the H-sync pulses are all of approximately the same width. If scrambled video is present, the L1 and L10 bogus sync pulses have widths HW* (e.g., 3 microseconds) that are distinguishable from the widths HW (4-5 microseconds) of other lines.

The Data signal (8F5) is derived by quantizing the video signal with a slice level DS at the 50% video amplitude point and generating a digital output signal (DATA) that is fed into a shift register circuit 815b within the ASIC 815. The serial DATA signal is collected into bytes by the DATA Shift Register 815b and passed over the data bus to the microprocessor 813 one byte at a time. There it is stored in the internal RAM section 813a and processed at free time periods when the microprocessor is not servicing time-critical interrupts.

The output signals from the ASIC 815 that control the video are primarily associated with (a) reconstructing a normal signal from a scrambled signal, (b) displaying video-text, and (c) sampling the incoming video for approximate voltage levels and data information. The white and black level sample switch lines, WHSX and BKSX respectively, create gates for analog integrator circuits (see FIG. 8C) during which time the input video white and black levels are sampled and stored in order to scale and position the reconstructed video with respect to sync and burst signals.

The decode output signal DX (8H4) is a state indicator indicating whether the input signal is scrambled or not. The microprocessor 813 sets the DX line when it determines that the input signal is scrambled thus causing the video decoder functions to go into action (see FIG. 8H).

The video normal (VNX) and video inverted (VIX) switch signals (8D3, 8D4) do exactly as their names imply and are direct derivatives of an inversion toggling flip-flop 815c found in the ASIC 815. The flip-flop 815c is clocked by the Horizontal Drive signal, is enabled to toggle at the appropriate times by the microprocessor 813, except that at certain predetermined "decision points" when the microprocessor 813 is interrupted, the microprocessor decides to disable the flip-flop 815c from toggling at the certain decision points and thus creates skip lines. Skip lines preferably occur not more often than at 16 line intervals per field in this embodiment to free the microprocessor 813 for other tasks.

Figure 8G:
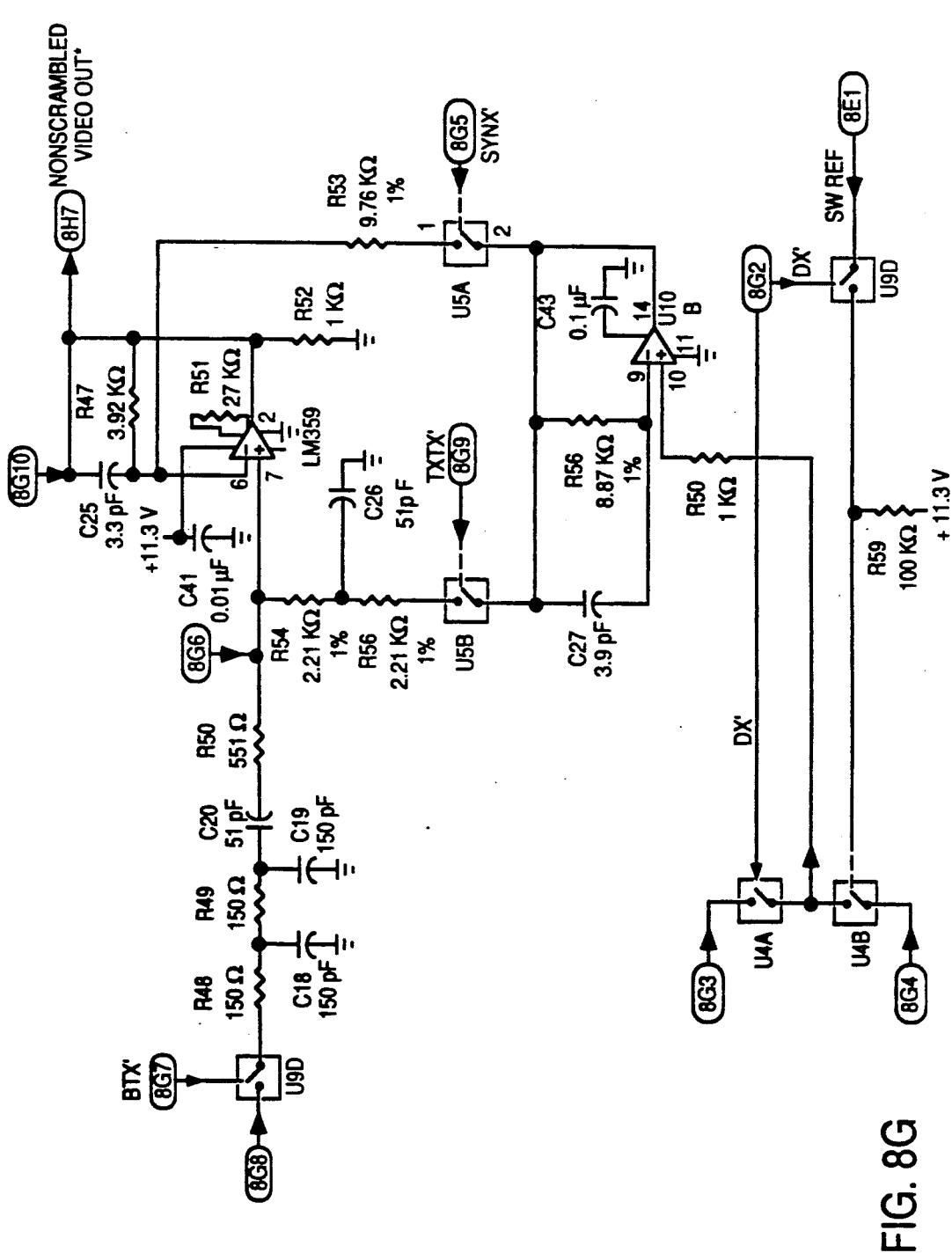

The burst injection switch signal BTX (8D6) creates a time gate when the chroma burst signal is allowed to pass from the video input to the video output jack with the appropriate amplification during de-scrambling (see point 8G7 of FIG. 8G).

Figure 8H:
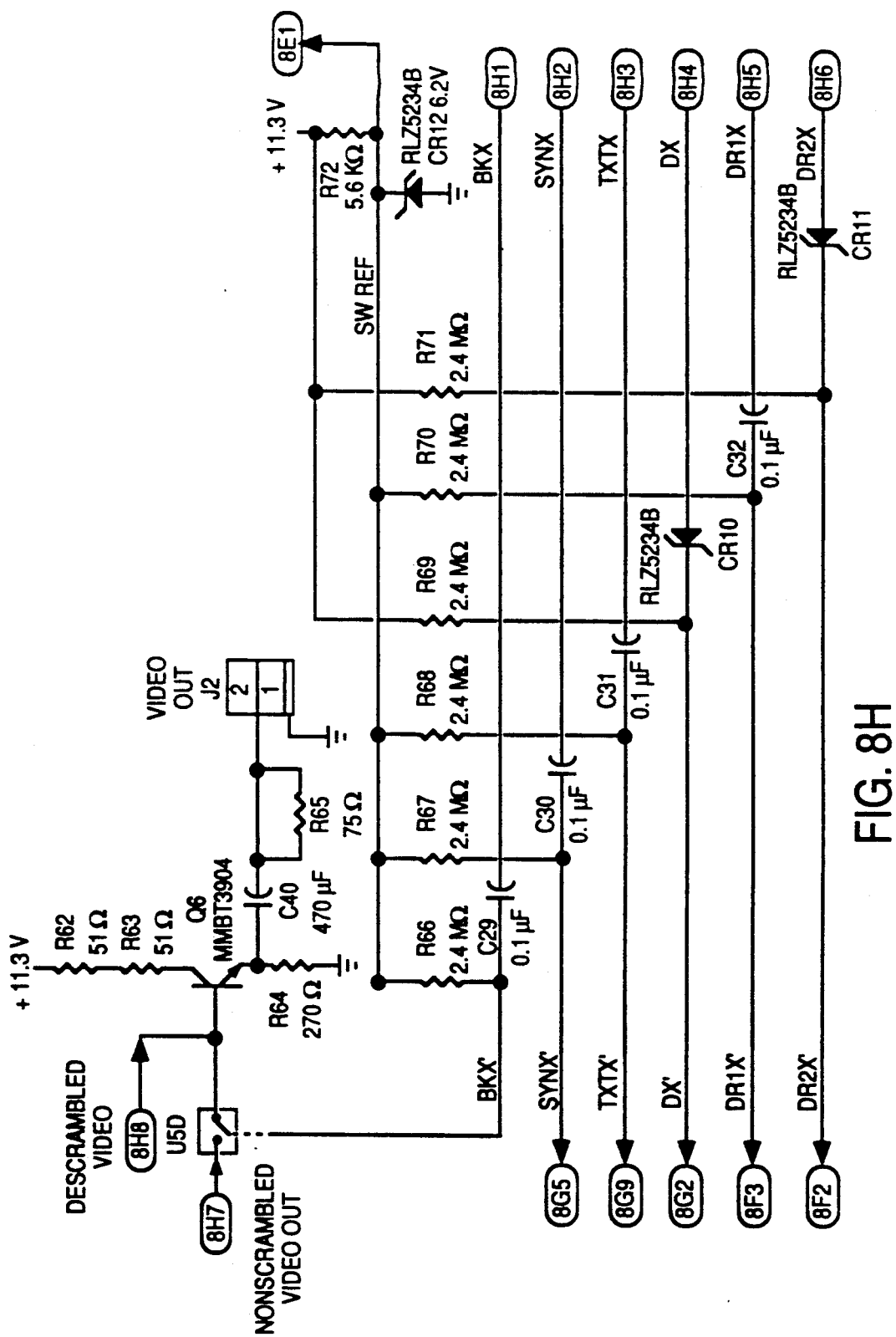

The black level switch signal BKX (8H1) creates a gate used primarily during non-scrambled video input to allow the video signal black level to be clamped to an appropriate reference level (see FIG. 8H).

The sync level switch signal SYNX (8H2) re-constructs the standard NTSC or PAL sync structure of the video at the output of the decoder when the input signal is scrambled (see point 8G5 of FIG. 8G). If the subscriber box is authorized for any tier, the sync structure will be output. If the subscriber box is authorized for the video being received, the video will be added to the sync structure producing a descrambled picture.

The text switch signal TXTX (8H3) is used when text is to be displayed. It outputs a signal that injects a video white or black level in a pattern required to form letters and symbols of the text on the screen. The letters and symbols are gated into the output video during the lower third of the picture in place of the normal video until the text is no longer required.

The gain control switch signal GCX (8D1) changes the gain of the video amplifiers during scrambling because the scrambled signal has its active video portion attenuated (compressed) into a magnitude range well inside the magnitude range of the scrambled pedestal (see FIG. 2C) before transmission in order to produce a "black screen" effect on television sets that do not have decoders. This gain change restores the active video portion of the signal to its nominal level and insures a unity gain function through the decoder.

The data reference switch signals DR1X and DR2X (8H5, 8H6) are used to change the quantizing level for data pick-off between scrambled and non-scrambled input video conditions. During scrambled operation the data slicer level, DS, should be at the true average level of the black to white video level, whereas for normal nonscrambled video the slice level DS should be about 35% below peak white.

The ASIC 815 also manages the power-up/power-fail functions. It resets the microprocessor 813 during power-up and warns the microprocessor to store information in the EEPROM 812 if the start of a power-down is sensed on its DC POWER line. The ASIC 85 also controls the lines (e.g. RAS and CAS) needed to store and display the 5 message information in the video-text RAM 811. The ASIC 815 reads the message information out through the serial output port ($S_{out}$) of the text RAM 811.

The ASIC 815 also houses the oscillator circuit for the 7.15909 Mhz crystal and includes dividers used for generating the master clock (CLKIN). ASIC 815 provides synchronization, clocking and register storage (815$b$) for reading the digital data contained in the vertical interval.

The EPROM unit 814 which stores the program instructions for the microprocessor 813 has a 16 bit wide address input port. The TMS70C02 microprocessor 813 has only an 8 bit wide address and data bus. A 16 bit wide address latch (A LATCH) 815$d$ is included in the ASIC chip 815 to enable the microprocessor 813 to access the full address space of the EPROM 814. Two bytes of address information are loaded sequentially into the A LATCH 815$d$ from the data bus of the microprocessor in order to address the EPROM 814. When information is to be transferred from the EPROM 814 to the microprocessor 813, a ROM ENABLE line is asserted. The text RAM 811 and EEPROM 812 share serial lines. When data is to be written into or read from the EEPROM 812, a chip enabling line EEPE is activated. When this line is not activated, the text RAM 811 is accessed.

The video-decoder digital section 800$d$ is provided on a single printed circuit board together with a later described audio-decoder section (900$d$, FIG. 11A). All parts on this circuit board are covered by an insulative conformal coating 820 such as Stycast 2850KT #9 catalyst available from Eastman Kodak of Rochester, N.Y. In combination with the conformal coating, there is provided a conductive epoxy layer 821 such as International Micro-Electronics Research Corp. #BA762-E also available from Eastman Kodak of Rochester, N.Y.

A series circuit wire which carries power or other tamper detecting signals is defined within the conductive layer 821. If this wire is broken or shorted, its tamper detecting signal may be altered. The insulative conformal coating 820 covers the conductive epoxy material 821. The insulative conformal coating and conductive epoxy materials are selected such that their colorations are relatively the same, thereby preventing unsuspecting tamperers from discovering their separate existence. Both epoxy materials, 820 and 821, can be dissolved by relatively the same class of solvents. The insulative conformal coating 820 must be at least partly removed in order to access underlying electrical conductors on the printed circuit board. Thus if a solvent or knife is used for removing the conformal coating 820, there is a likelihood that the tamper detecting wire defined within the conductive epoxy layer 821 will be opened or shorted to another line. As shown, the conductive epoxy layer 82$i$ includes a wire that conducts a +5V power signal to the RAM memory section 811 and also an active-low tamper-detect line 823 which connects to the microprocessor 813. When breach of the conductive epoxy 821 occurs, data within the volatile RAM section 811 will be erased if its power is cut off. The microprocessor 813 is also signaled by a voltage drop on tamper line 823 to immediately begin erasing authorization information contained within the EEPROM memory section 812 its internal RAM section 813$a$. Thus sensitive data stored in the memory of the digital section 800$d$ may be protected from unauthorized access.

Referring to FIG. 81, the sensitive data stored in the memory of the digital section 800$d$ will now be described in more detail. Most of the digital commands transmitted from the headend 610 (FIG. 6) to the subscriber boxes 692 are encrypted according to at least one of a ROM Key and a Subscription Show Key. The ROM Key is a 32 bit wide word which is stored in a first area 814$a$ of the EPROM 814. All subscriber boxes have the same ROM Key. This ROM Key remains constant because it is stored in a read-only section of memory. Also stored in the ROM 814 are Tables generating instructions 814$b$ which causes the CPU 813 to generate pseudo-random streams of ones and zeroes that are coupled to the line inverting flip-flop 815$c$ (FIG. 8A) and decryption instructions 814$c$ which allow the CPU 813 to decrypt messages enciphered by the ROM Key 814$a$ and other keys soon to be described.

In a writable section of memory (EEPROM 812), a plurality of switch-over lists, 812$a$1, 812$a$2, 812$a$3, . . . , etc. are defined. Each switch-over list 812$bx$ has a corresponding show-key holding list 812-$bx$ associated therewith and defined in the writable section 812 (x represents an arbitrary integer here).

A 32 bit wide subscription show-key is downloaded from the headend 610 and written into a selected one of the show-key holding lists (812$b$1, 812$b$2, 812$b$3, . . . ). The subscription show-key of a given show-key holding list 812$bx$ is needed in order to decrypt later transmitted data which is to be written into its corresponding switch-over list 812$ax$. Each switch-over list 812$ax$ is partitioned into a series of rows and columns. The rows of the switch-over list 812$ax$ are identified by a "slot number". In a first column of the switch-over list 812$ax$, the "table number" associated with a table of randomly generated ones and zeroes (such as the tables earlier shown in FIG. 3C) are entered. Thus, each slot of each switch-over list 812$ax$ has information written into it identifying a unique table of randomly or pseudo-randomly distributed ones and zeroes. It is to be understood that the table identifying number can, instead of pointing to a table, point to a table generating module defined within the microcomputer. Selection of an appropriate one of a plurality of table generating modules produces the same end result as selecting a table, namely, the production of a pseudo-randomly distributed stream of ones and zeroes. The pseudo-random function preferably favors ones over zeroes so that skip lines occur sporadically.

The CPU memory includes a current slot number entry which designates one of the slots in the associated switch-over list 812*ax* as being the "current" slot number. Each show-key holding list 812*bx* has a tier number stored therein for association with its corresponding subscription show-key. The tier number may be considered an extension of the subscription show-key. A specially transmitted authorization word (not shown) is used to download the tier value into each show-key holding list in the same way that the show-key is downloaded. Also downloaded into each show-key holding list 812*bx* is a Show-ID tag whose function will be explained shortly. Only one show-key holding list and its corresponding switch-over list is "active" at any time. The other switch-over and show-key holding lists lie dormant until one of them is selected as a new active set by the CPU 813. After appropriate authorization of the subscriber box, each show-key holding list (e.g., 812*b*1, ) of the plural show-key holding lists (812*b*1, 812*b*2, etc.) should have a unique Show-ID tag preloaded into it. When the CPU receives a scrambled transmission, the CPU 813 also receives a Show-ID value within an "All-Call Word No. 1" (FIG. 9D) sent from the headend 610. The CPU scans through the Show-ID tags of EEPROM 812 and compares them against the Show-ID value received from the headend 610. The first show-key holding list 81*bx* having a matching Show-ID tag is designated as the activated show-key list together with its corresponding switch-over list 812*ax*. If no match is found, the CPU 8113 deactivates all lists and loops endlessly until a further command is received from the headend. Thus, if a subscriber box does not have a Show-ID tag preloaded into it to correspond with the Show-ID value that is sent from the headend together with an entertainment show, the box is disabled from selecting the show-key necessary for descrambling the show even if the box contains that show key. On the other hand, if the box is authorized by virtue of having a Show-ID tag matching the Show-ID value, then the corresponding show-key holding list and switch-over list will be activated. The activated lists are represented in FIG. 8I as being popped on top of the other underlying lists. Thus, in FIG. 8I, show-key holding list 812*b*1 and switch-over list 812*a*1 are the active lists.

When the ASIC 815 first detects that scrambled video signals are present (because of their unique H-sync pulse duration signature) the CPU (microprocessor) 813 waits for reception of an "All-Call Word No. 2" (FIG. 9E, to be explained later). The headend 610 sends such an All-Call Word No. 2 once every N fields, N being an integer greater than one. The CPU reads a "Table Row Select" field within the All-Call Word No. 2 (FIG. 9E) and stores this number in its memory as a current row number. The CPU 813 then goes to the corresponding slot number of the active switch-over list 812*a*1 and picks out the corresponding table number.

The just stored current row number indicates where to start within the selected table for descrambling the current video field. Using that data in combination with tables generating instructions 814*b* stored within the ROM 814, the CPU 813 sends a pseudo-random stream of toggle enable or disable instructions to the ASIC chip 815 at synchronized time points corresponding to the predetermined "decision points" earlier described. As scrambling continues, the CPU updates its internally-stored current-row number and compares it against the "Row Select" value transmitted from the head-end 610 every N fields. The numbers should be the same at each Nth field. If the numbers fail to match once, the CPU assumes that a noise glitch has corrupted the Row Select value. If a mismatch is detected over plural comparisons, the CPU assumes it has lost synchronization with the headend and loads the last received Row Select as its current row number at the top of the field.

At arbitrary instances, the headend unit 610 can send a command to the CPU 813 instructing the CPU 813 to switch the current slot number from a first value to a second value. Thus, if slot number 1 had been previously selected, the current descrambling table is table number "212" which was started at a row number dictated by a previously received All-Call Word No. 2 (FIG. 9E). If the switch-over command instructs the CPU 813 to now use slot number 3, the CPU 813 immediately goes to table number "107" and begins to output the pseudo-random stream of ones and zeroes from that table. The start row number for the newly selected table is the "Row Select" value (see FIG. 9E) most recently received from the headend 610. Preferably, a table switch-over command is transmitted before the full pseudo-random contents of any given table are exhausted.

In addition to commanding a table switch-over within a currently active switch-over list, the headend unit 610 may command the CPU 813 to pop a previously dormant pair of show-key holding list 812*b*2 and corresponding switch-over list 812*a*2 to the top thus making these the active lists. In such a case, the subscription show-key (#2, not shown) of the newly activated holding list becomes the "active" key. When the new lists are activated, the CPU 813 fetches the pre-written current slot number of the newly activated show-key holding list 812*b*2 and uses that to fetch the starting table number from the indicated slot number of the newly activated switch-over list 812*a*2. The starting row number is the last stored current row number within the CPU's memory. If the headend sends a different Row Select value in its All-Call Word 2 (FIG. 9E), the CPU begins to use the new Row Select value as its current row number once a mismatch over N fields has been detected.

It can be seen that, in order to enjoy a scrambled show, a subscriber box 692 must have appropriate values preloaded into its show-key holding lists (812*b*1l, 812*b*2, . . . , etc.) and corresponding switch-over lists (812*a*, 812*a*2, . . . , While a first pair of a show-key holding list and switch-over list are active, new data is downloaded from the headend unit 610 into the other 5 dormant pairs in order to prepare them for a pop-up activating operation which can occur at prearranged times such as once a month or once a week. The new numbers for the dormant pairs can be sporadically downloaded over a preceding relatively-long period of time (e.g. over a month or more before activation) in order to keep their information proprietary.

Each subscriber box 692 has a unique identification number, BIDN, which is stored in a further region 812c of the EEPROM 8112. This BIDN 812c is used in conjunction with a tier bit map 812d and a group bit map 812e to assign the particular subscriber box 692 to one or more subscriber groups and enjoyment tiers.

In case it is learned that the ROM Key 814a has been compromised, a secret EEPROM number 812f is stored in the EEPROM 812 to be used as a substitute upon a special command issued from the headend unit 610.

To protect the EEPROM 812 from unauthorized tampering, an EEPROM checksum value 812g is stored within a preselected area of the EEPROM 812. The CPU 813 periodically computes the checksum of data stored within the EEPROM 812, and if it discovers that the calculated value is different from the stored value in area 812g, the 813 begins to erase authorization data contained in the switch-over lists 812a1, 812a2, ..., etc. in the show-key holding lists 812b1, 812b2, ..., etc. in the tier bit map 812d, in the group bit map 812e, in the secret number box 812f and in other regions of the EEPROM 812 which are considered to hold "sensitive" data.

To prevent subscribers from disconnecting their boxes 692 from the antenna or cable network so that authorization erasure (DEL) commands cannot be received from the headend unit 610, the EEPROM 812 further includes information indicating the time 812h when a last update command was received from the headend unit 610. The headend 610 periodically transmits data indicating current time. If the CPU 813 detects that an unduly long time has elapsed since the last update time 812h, the CPU 813 begins to automatically delete authorizations from the EEPROM 812. Thus, a subscriber is unable to keep a relatively high level of authorizations over a long period of time unless the subscriber continuously receives authorization updates from the headend unit 610.

As a further safeguard, for pay-per-view types of transmissions, each subscriber is granted a maximum viewing time 812i. The CPU 813 keeps track of the total viewing time spent thus far for enjoying scrambled shows and stores this in an accumulated view time box 812j. If the accumulated view time 812j exceeds the maximum view time 812i, the CPU 813 stops sending descrambling instructions to the ASIC 815.

With the structure of FIG. 8I in mind, it will now be explained how a headend unit 610 authorizes a particular subscriber box to enjoy shows and how the headend unit activates a switch-over operation simultaneously in a plurality of subscriber boxes.

FIG. 9A shows the structure of a first authorization word (Authorization Word No. 1). The first 8 bits of Authorization Word No. 1 are not encrypted. The first four bits represent a word identification number (Word ID) which identifies the remainder of the 40 bit wide word as being an Authorization Word No. 1. There are many different kinds of command words which can be sent from the headend unit 610. Each kind of word has a unique word identifying number. For the sake of brevity, only a few will be described here. Other words such as those which assign a box to a group or toggle the tier map bits of the box are defined in accompanying microfiche appendix A.

The next four bits of Authorization Word No. 1 represent a checksum covering the entire word. If the CPU 813 at the receiver end discovers a checksum error in any word received from the headend, the CPU 813 ignores the rest of that word. Thus, if a transmission is interrupted by a noise burst, it is relatively unlikely that it will have any detrimental effects on subscriber boxes. Each command word is preferably sent more than once to assure that it gets through to the intended receiver.

The remainder of Authorization Word No. 1 is encrypted according to the ROM key 814a prior to transmission. Each subscriber box must therefore have the appropriate ROM key 814a and corresponding decryption algorithm 814c stored in its ROM 814 in order to make sense of the remaining information in Authorization Word No. 1. This information includes a BIDN value for addressing a unique subscriber box 692, a subscription key-list number for selecting a specific one of the show-key holding lists 812b1, 812b2, ..., etc., a subscription show-key delete (DEL) or add (ADD) command and a plurality of randomly generated (dice) bits. The randomly generated dice bits keep the word's checksum value rolling over time and cover up the box's BIDN so that persons having two or more subscriber boxes in their possession cannot easily learn the values of their box identification numbers (BIDN's). When a delete (DEL) command is received, the subscription show-key number in the subscription key holding list (812bx) that was selected by Authorization Word No. 1 is cleared. When an add command is sent, the CPU 813 waits for receipt of Authorization Word No. 2 as shown in FIG. 9B and enters a new Subscription-Show Key within that word into the key holding list selected by Authorization Word No. 1.

The structure of Authorization Word No. 2, as shown in FIG. 9B, is similar to that of Authorization Word No. 1. The first 8 bits include a word identification value and a checksum. The remaining 32 bits are encrypted not only by the ROM Key 814a but also by the box identification number (BIDN) of EPROM area 812c. Referring briefly to FIG. 9E, it can be seen that the subscription show key is needed to decrypt a critical part of an All-Call word later transmitted from the headend unit 610 to all boxes 692. Thus, without possession of the correct BIDN and ROM Key, it is next to impossible for a subscriber box 692 to obtain the necessary subscription show key which will allow it to later enjoy transmitted show information. Typically, the subscription show-key holding list number of Authorization Word No. 1 selects a nonactive subscription show-key holding list (812b2) into which the subscription show key of Authorization Word No. 2 will be written. The currently active show-key holding list (812b1 is not interfered with. At the end of a programming month or some other predetermined time period, the nonactive but previously updated show-key holding list 812b2 is popped to the top and thus made the new active show-key holding list. Subscribers who have not had the new subscription show-key (#2) earlier written into their subscriber box are considered to be "nonauthorized" and they will be prevented from enjoying programs that rely on the new subscription show-key (#2).

Referring to FIG. 9C, there is shown a third authorization word whose structure is similar to that of the authorization words shown in FIGS. 9A and 9B. The first 8 bits comprise a word identification number and a checksum. The remainder of the word is encrypted by the BIDN and the ROM Key. Authorization Word No. 3 is always preceded by a box identifying command. The identifying command could be Authorization Word No. 1 or a group identifying word. The encrypted data of Authorization Word No. 3 includes a switch-over list number for selecting a particular switch-over list (812a1, 812a2, . . . ) not necessarily associated with the show-key holding list specified by Authorization Word No. 1. Further included in the encrypted section of Authorization Word No. 3 are the new table numbers to be loaded into each of the slots in the selected switch-over list (four such slots are assumed here). Thus Authorization Word No. 3 is used for downloading from the headend unit 610 the specific table numbers to be entered into the specified switch-over list. Typically, the specified switch-over list is a nonactive list (e.g. 812a2) which will be later popped into an active status together with its corresponding show-key holding list (e.g. 812b2).

The authorization words of FIGS. 9A-9C may be sent out in a time spread manner over a period of a month or so to individually addressed boxes to load each of those subscriber boxes 692 with data necessary for enjoying a future show (e.g. a month's worth of programming). Authorization Word No. 1 or some other box-identifying command word (e.g. group authorization) should always accompany one of Authorization Words 2 and 3 in order to identify the box or boxes targeted by Authorization Words 2 and 3.

Once all entitled boxes have been appropriately loaded with subscription show keys, tier values, table numbers and other information corresponding to their enjoyment entitlements, the headend unit 610 begins to scramble its video transmissions and to periodically send All-Call words as shown in FIGS. 9D and 9E which are addressed to all the subscriber boxes. The All-Call words are repeated many times over a subscription period. The first 8 bits of All-Call Word No. 1 (FIG. 9D) comprise a word identification value and checksum as earlier described. The remainder of All-Call Word No. 1 is encrypted by the ROM Key. The encrypted data normally includes a show identification (Show-ID) value assigned to each transmitted show. When the CPU detects one of these All-Call Words No. 1, the CPU extracts the Show-ID value. The CPU then selects a corresponding one of the show-key holding lists which has a matching tag and a corresponding one of the table switch-over lists (812bx and 812ax ) as the newly activated lists. The remainder of All-Call Word No. 1 includes random bits for scrambling the nonencrypted checksum and additional parity and checksum bits for assuring that the correct information has been received.

At least one bit of the All-Call Word No. 1 is used for transmitting repetition line data to the subscriber box. A same command word (e.g., All-Call Word No. 1) can be repeated many times within a single vertical blanking interval in order to assure that it is properly received over what could be a noisy transmission channel. When the line data bit is a logic zero, the CPU expects only one such command word within the vertical blanking interval. When the line data bit is a logic one, the CPU waits for the reception of multiple copies such as three or a higher odd number of the same command word within the vertical blanking interval, and if one such received word is different, a majority voting mechanism is implemented to decide what bits were zero or one in the originally transmitted, same command words.

FIG. 9E shows the structure of a second All-Call Word (No. 2). Again, the first 8 bits comprise a word identification value and checksum. The remainder of this All-Call Word No. 2 is encrypted by the active subscription show-key. If the active show-key holding list (812b1 ) of the subscriber box does not have the appropriate subscription show-key written therein, that box cannot properly decipher this encrypted portion of the All-Call Word No. 2. The box will develop an erroneous checksum value (and also a parity error), leading the box to a step where it ignores the received word.

All Word No. 2 is typically transmitted many times and distributed over a sequence of frames before a table switch-over operation takes place. Typically, All-Call Word 1 is transmitted within the field 1 blanking interval of each interlaced frame and All-Call Word 2 is transmitted within the field 2 blanking interval of the frame. A warning to the CPU 813 that a switch-over is coming is included within All-Call Word No. 2 in the form of a countdown value. The countdown value sometimes indicates that a table switch-over is about to occur some N' frames away (N' here is an arbitrarily selected integer which has nothing to do with the previously mentioned number of N fields for which Row Select values are transmitted) but sometimes it does not. If the microprocessor detects that the countdown value is decreasing according to a predetermined countdown sequence over its corresponding sequence of video frames, the microprocessor accepts it as true warning that a switch-over is coming at the time indicated by most of the All-Call No. 2 words. If the countdown value does not change over adjacent frames according to the predetermined sequence, the microprocessor 813 ignores the remainder of the instructions since a true switch-over is not being commanded. In a true switch-over warning command, the sequence of countdown values from one video frame to the next adjacent frame may take the form of, for example, 50, 49, 48, 47 , . . . , 3, 2, 1. In a bogus switch-over command (which is ignored by CPU 813) the stream of countdown values will take a nonsequential form of, for example, 50, 49, 3, 12, 51, 33, 32, 40, . . . . When the CPU detects such a nonsequential stream, it ignores the switch-over command. It may be possible that one or a few countdown values are missed in a true countdown due to transmission noise. The microprocessor looks at a stream of at least 10 All-Call Words No. 2 before deciding whether it is a true countdown with a noise glitch or a bogus countdown.

Also included in All-Call Word No. 2 is a value representing either a maximum view time to be loaded into the maximum view box 812i or a tier byte which must correspond to the tier value stored in the current (active) show-key list 812b1 if the subscriber is to be allowed to view the corresponding program. The slot number of the next table to be used upon switch-over follows. The starting row for this next table at the top of a next Nth (not N') field is also included as the Row Select field of All-Call Word No. 2. Following this are parity bits, check sum, check sum bits, one bit of line data and some random dice bits which scramble the repeated All-Call Word No. 2 over time.

When the countdown value for table switch-over reaches zero (or it is calculated to be zero, but a noise spike obliterated the last All-Call Word No. 2), the CPU 813 switches to the table specified by the next table slot number transmitted in the majority of the received All-Call Words No. 2 and the CpU 813 begins using the data specified by the next table row select of the All-Call Words No. 2. It is possible that transmission channel noise may interfere with one of the series of All-Call Words No. 2 sent from the headend 610. But since the CPU 813 has advance warning from the countdown values, the CPU can take corrective action if one or a few of the second All-Call Words do not get through. The CPU 813 will still switch over in a timely manner to the new table and new starting row so that properly authorized subscribers will be unaware that a switch over to a new scrambling pattern has been made even where the transmission channel is relatively noisy (e.g., when a space satellite link is used).

Figure 10A:
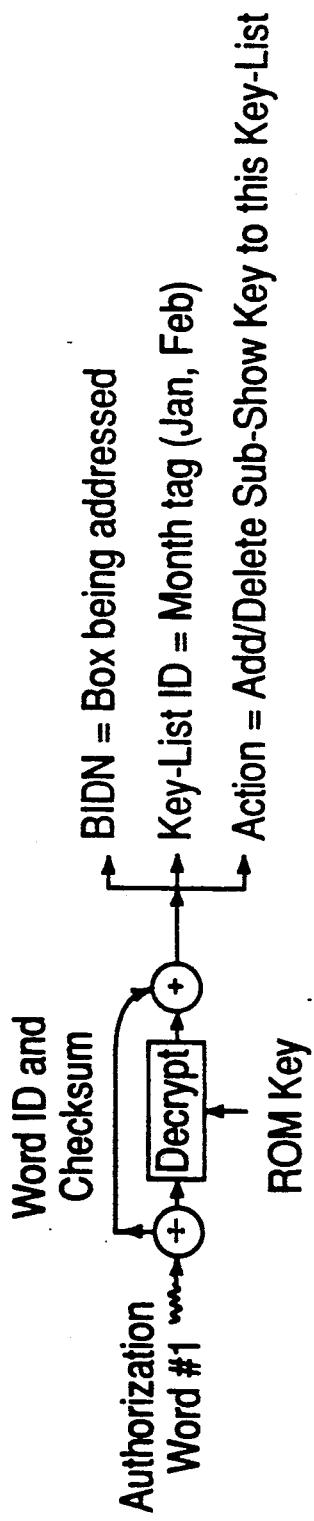
Figure 10B:
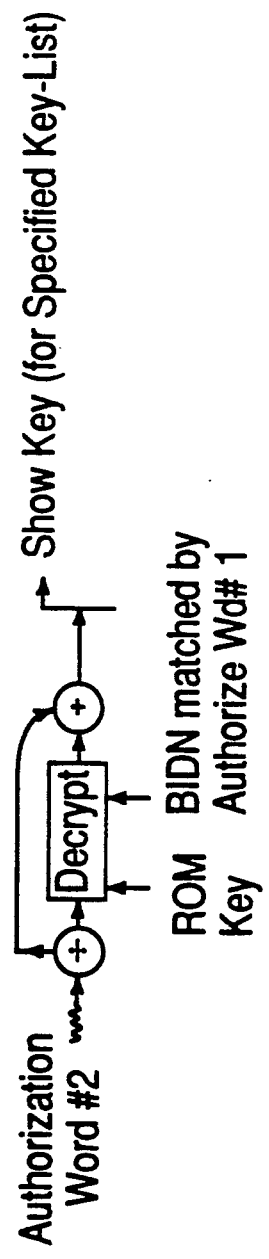
Figure 10C:
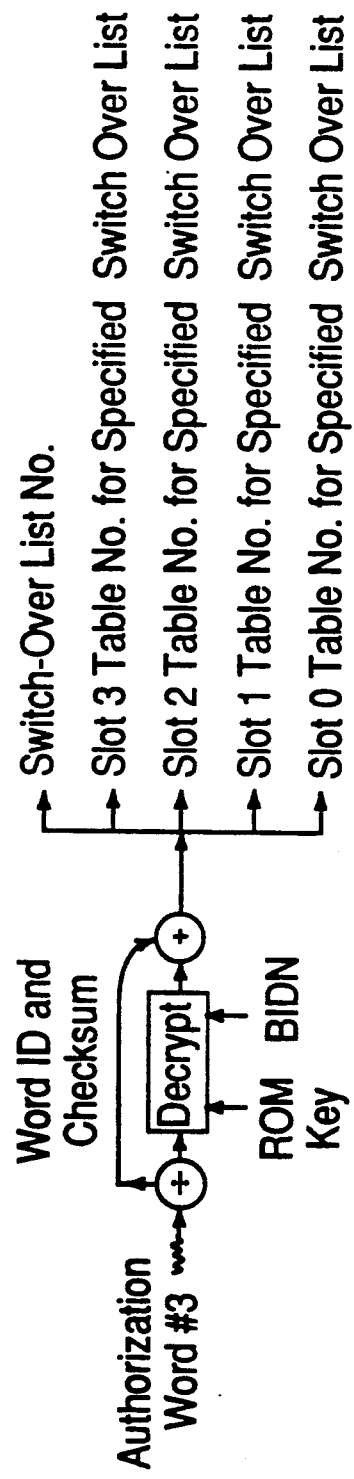

Referring to FIGS. 10A-10E, these figures schematically show the operation of the CPU 813 upon reception of each of the command words in corresponding FIGS. 9A-9E. When Authorization Word No. 1 arrives, as shown in FIG. 10A, the CPU 813 parses out the word ID and check sum, decrypts the remainder of the word using the ROM key of area 814a and decryption instructions of ROM area 814c, combines the decrypted word portion with the check sum and Word ID, checks for an error, and if all is well, produces from the decrypted word portion, the address (BIDN) of the box to whom the message is intended as well as the show-key holding list identification number and the action to be performed by the addressed box. If the received BIDN does not match that of the receiving subscriber box 692, the CPU 813 ignores the message. If the transmitted BIDN matches the BIDN of the subscriber box, the CPU 813 proceeds to the operation dictated by the next word. As shown in FIG. 10B, if Authorization Word No. 2 is next, the microprocessor extracts the show key for the specified key holding list. When Authorization Word No. 3 is received (together with Authorization Word No. 1), as depicted at FIG. 10C, the CPU 813 uses its ROM key and BIDN to decrypt the message and update the table numbers in the specified switch-over list. In FIG. 10D, the CPU 813 detects an All-Call Word No. 1, extracts the transmitted show ID value and searches for a show-key holding list 812bx which has a matching show ID tag. The matching list is automatically designated as the active list. If a recently received show-ID value is different from the show ID tag of the currently active list, an automatic switch-over takes place designating either a new show key or disabling the descrambling process since the CPU 813 searches for a matching tag, and if there is one, activates the newly specified show-key holding list and its table switch-over list (812bx and 812ax) according to the received show-ID value. In FIG. 10E, it is seen that a sequence of All-Call Words No. 2 are sent over time and the microprocessor collects these to test for a sequence of countdown values leading to a table switch-over.

Referring to FIG 11A, the structure of a digital audio decoder 900d in accordance with the invention will now be described. This audio section 900d is preferably formed on the same printed circuit board with video digital section 800d and coated by tamper detect coating 821 to prevent unauthorized probing. The audio decoder section 900d includes a microcomputer formed of a microprocessor 913 (TMS 70C02 available from Texas Instruments) and a volatile instruction storing unit 914 (SRAM organized as 8K by 8 bits and having an access time of preferably 150 ns or less). The audio decoder section 900d further includes a volatile user-configurable PLD 980 such as the XC3042-50 available from Xilinx, Inc. of San Jose, Calif. The SRAM 914 and PLD 980 are both powered through a battery managing and microprocessor supervising chip 922 (MAX 691). If the managing chip 922 detects that the tamper coating 821 has been broken or shorted, it shuts power off to the SRAM 914 and PLD 980 thereby erasing all information contained in these volatile devices. If power that is supplied for an external power unit through voltage regulator 997 is interrupted, the managing chip 922 automatically switches to a standby three volt lithium battery 998 to maintain the data stored in SRAM 914 and PLD 980. PLD 980 is coupled to a PCM chip 915 such as a NEC uPD9327GF PCM decoder chip which is used for decoding standard PCM audio frames of the form shown in FIG. IC. The PCM chip 915 receives a PCM input signal from the RF receiver and outputs a sound data signal to a digital-to-analog converter (D/A, not shown). PCM chip 915 sends encrypted data (ENC DATA IN) into the PLD 980, and if the PLD 980 is properly configured (to have a plurality of decryption functions 980d which are later described) and the PLD 980 is being correctly operated by microprocessor 913 (through the loading and activation of appropriate keys as well as activation of an appropriate one of the decryption functions), decrypted PCM data (DEC DATA OUT) will be transmitted back from the PLD 980 to the PCM chip 915 for producing enjoyable sound data.

The method by which the audio decoder section 900d is configured will now be described. Initially, the 256 byte internal RAM 913a of microprocessor 913 and the 64K memory area of SRAM 914 are blank. The user-configurable internal circuitry of PLD 980 is not yet configured. A boot-strapping program is first loaded into the internal RAM of microprocessor 913 under control of a bootstrapping EPROM 916 which is part of a manufacturing fixture that is connected to the audio decoder section 900d during manufacture. This fixture is referred to as a "DIT" because it provides a Data Initialization and Testing function. The bootstrap EPROM 916 is coupled to the data and address buses of microprocessor 913. Managing chip 922 sends a reset signal to the microprocessor 913 to start the bootstrap process. Thereafter, as long as the microprocessor 913 is operating under a valid control program, the microprocessor 913 periodically interrupts a watchdog loop in which managing chip 922 is inserted. The microprocessor 913 interrupts the watchdog loop through its output line EC2 so as to prevent managing chip 922 from sending a second reset to the *RESET terminal of microprocessor 913.

The bootstrap program establishes a communication module within the internal 256 byte RAM 913a of microprocessor 913. The communication module couples data sent from a UART port loader 917 to the microprocessor UART port and then into the configuration data input terminal (DIN) of the PLD 980. Synchronizing clock pulses are simultaneously transferred from microprocessor 913 to the CCLK terminal of PLD 980. The initial configuration data passed through the data input terminal DIN configures the PLD 980 to have a LSB latch 980a defined therein coupling the 8-bit wide data bus of the microprocessor 913 to the less significant 8 bits of the address port on SRAM 914. This allows the microprocessor 913, which has only an 8 bit address bus, to address all 16 bits of the address port provided on the 64K SRAM 914. The LSB latch 980a loads data from the data bus when an ALATCH line is asserted by the microprocessor 913.

The initial configuration data further defines an initially closed switch 980b coupling a first reconfiguration data dump/program terminal D/*PI of the PLD 980 to a loop-back terminal D/*P0 which is externally connected to the main configuration dump/program control terminal D/*P of the PLD 980. As long as switch 980b is closed, the microprocessor 913 is able to load new configuration data into the PLD 980. If one of the new reconfiguration instructions opens this switch 980b, the microprocessor 913 is blocked from further reconfiguring the circuits formed within the PLD 980.

The initial configuration of the PLD 980 links PLD terminal R/*WEI to PLD terminal R/*WEO. This allows the microprocessor to send write enable (*WE) signals to SRAM 914 for all SRAM address values. Later, a SRAM Write Protect module 980c is defined in PLD 980 to "fix" some of the data within SRAM 914. With the LSB latch 980a defined within the PLD 980 and the full address space of SRAM 914 being now writable to, the bootstrap program begins to load program data from the UART port loader 917 through CPU 913 and into the 64K SRAM 914.

A first program downloaded into the SRAM 914 checks the operability of all parts within the PLD 980, the microprocessor 913 and the SRAM 914 itself.

After initial testing is complete, a second program is downloaded from the UART port into the SRAM 914 for reconfiguring the PLD 980 to give the PLD 980 a "field personality". After the field personality is configured into the PLD 980, the dump/program inhibiting switch 980b is broken open to prevent further reconfiguration of the PLD 980. The LSB latch 980a remains to allow the microprocessor to access the full memory space of the 64K SRAM 914. The SRAM Write Protect circuitry 980c is now formed and coupled to the MSB address input of the PLD 980 as well as the R/*WEI and R/*WEO terminals of PLD 980 to prevent the microprocessor 913 from writing into certain areas of SRAM 914. This "fixes" certain data within the SRAM 914. Among the fixed data is an audio BIDN whose function is similar to that of the video BIDN earlier description and various in-the-field operating programs which cause microprocessor 913 to respond to Authorization, All-Call and other commands sent from the headend 610 in similar fashion to the responses of the video side microprocessor 813.

One major difference, though, is that decryption of PCM audio data does not take place within the microprocessor 913. Only so-called independent data (ID) portions of each PCM frame are decrypted by the microprocessor. The encrypted independent data corresponds to the encrypted command words found in the video blanking intervals of the video side. A plurality of PCM data decrypting circuits or "functions" (DE FUNCS) 980d are defined within the PLD 980 as shown in FIG. 11B to decrypt the remaining nonindependent parts of each PCM frame.

Figure 11B:
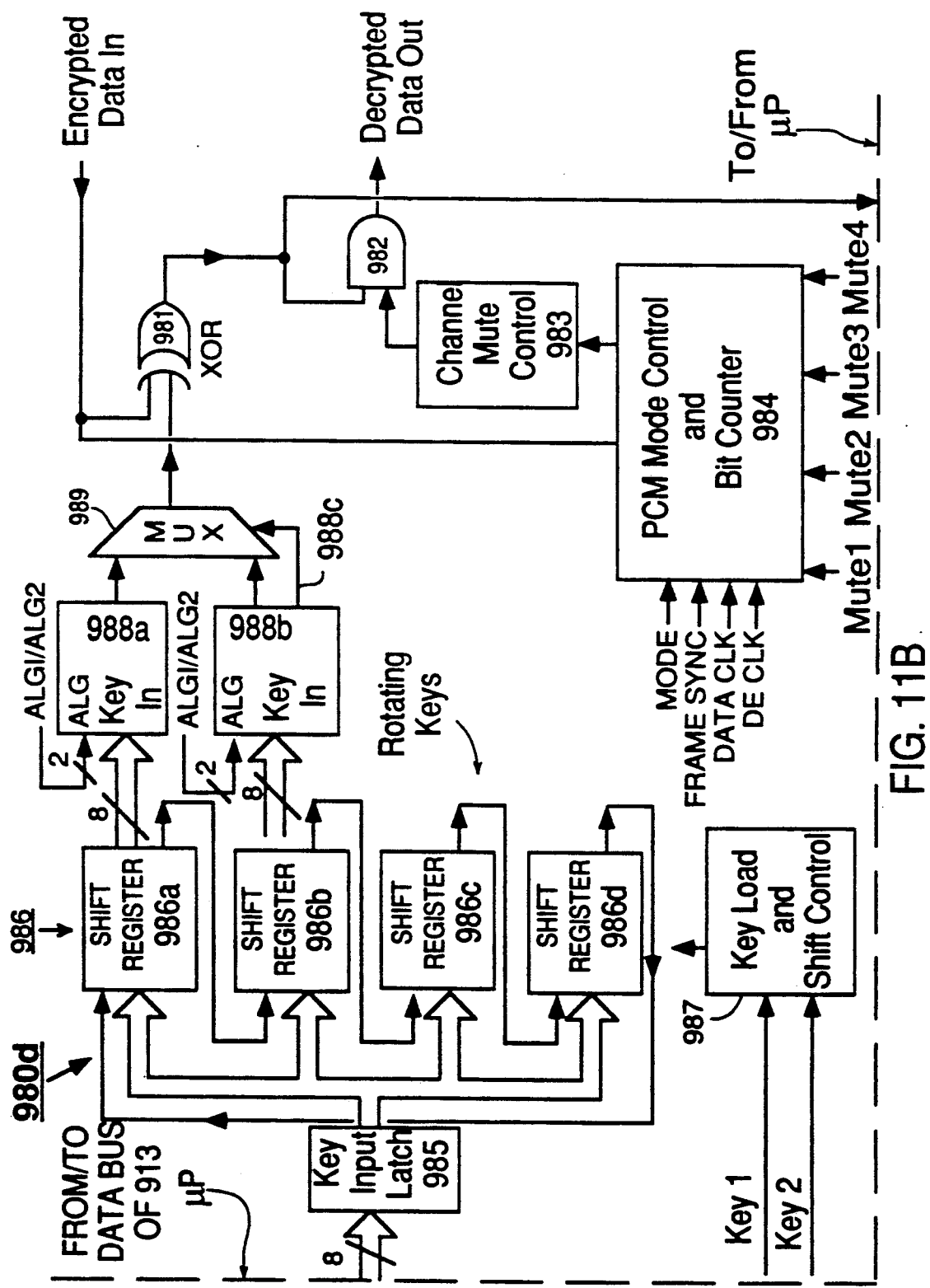
FIG. 11B is a block diagram of a signal decrypting circuit included in the audio decoder of FIG. 11A.

Referring to FIG. 11B, a decryption functions area 980d of the PLD 980 is configured to include an exclusive-OR gate 981 which has a first input terminal coupled to the encrypted data input port (ENC DATA IN) of the PLD. A second input terminal of the XOR gate 981 is coupled to an inversion bit-stream generating circuit (including multiplexer 989) which will be described later. The output terminal of the XOR gate 981 is coupled to an input terminal of a sound muting AND gate 982 and also to the data bus of the CPU 913. A second input terminal of the muting AND gate 982 is coupled to a channel mute control unit 983. If the XOR gate 981 is not receiving an appropriate inversion bitstream from multiplexer 989, the non-decrypted data which will be output on the output terminal of XOR gate 981 is typically nonenjoyable, and in some instances it can produce rather annoying sounds because of the effects that the random scrambling of its data bits will have on PCM decoder chip 915. The channel mute control 983 places a logic low on the second input terminal of the muting AND gate 982 whenever the microprocessor 913 determines that the data being output from XOR gate 981 is not enjoyable or when the microprocessor 913 determines that the subscriber box is not entitled to enjoy that sound even if it is being properly deciphered. Four channels of sound are provided for in this embodiment, and accordingly, the microprocessor 913 supplies four control signals, Mute-1, Mute-2, Mute-3, and Mute-4 to a PCM mode control unit 984 defined within the PLD 980. The sound data of different channels are multiplexed over time. PCM mode control unit 984 keeps track of the timing of each frame of PCM data as it is received and sends the appropriate channel muting signal to mute control unit 983 as necessary. PCM mode control unit 984 further includes a bit counter which receives the encrypted data bits from the encrypted data input port of PLD 980 and synchronizes the remaining decryption operations of the PLD 980 to the arrival times of the PCM data frames (by outputting a DE clock which clocks bit stream generators 988a and 988b).

Microprocessor 913, SRAM 914 and PLD 980 are configured to perform the operations shown in FIG. 10A through FIG. 10E so that the headend unit may deal with both video and audio information in the same manner. Video command words are included in the video blanking intervals between scrambled video fields. Audio command words are contained in the ID section of each transmitted PCM frame. The video and audio command words have substantially identical data structures even if the manner in which these commands are obeyed differs.

CPU 913 has to select and load byte-size portions of an appropriate Subscription Show Key into a key input latch 985 of the PLD 980 (FIG. 11B) from among the show-key holding lists that are contained in the SRAM 914. The byte-size portions of the selected Show Key are then loaded from input latch 985 into a long, key-rotating shift register 986 comprised of subunits 986a, 986b, 986c c and 986d. Rotating shift register 986 is made sufficiently long so that it can hold at least one if not a plurality of keys. Each key is rotated through rotator 986 by a predetermined amount before preselected parts of the key are applied to two alternate pseudo-random bitstream generating circuits 988a and 988b. The structure of these bit-stream generating circuits, 988a and 988b, corresponds to the general structure shown in FIGS. 5A and 5B. In addition to the key signals which they receive from the rotator 986, the bit-stream generating circuits 988a and 988b receive a 2-bit wide algorithm selecting signal (ALG1/ALG2) from the microprocessor. This algorithm selecting signal (ALG1/ALG2) corresponds to the table slot selecting signal used on the video decoder side It sets various switches (i.e., $SW_{12}$ and $SW_{13}$ of FIG. 5A) in circuits 988a, 988b to thereby define one of a plurality of possible bit stream generating circuits in each of boxes 988a and 988b. Thus, when the microprocessor 913 receives an All-Call Word No. 2 (FIG. 9E), it applies the 2-bit wide Next Table value to the ALG1/ALG2 bus in order to select one of a plurality of bit-stream generating functions or "algorithms" which may be performed by circuits 988a and 988b. Bit-stream generating circuit 988b has a tapline 988c which operates the multiplexer 989 to pseudo-randomly select one of the bit streams emerging from generating circuits 988a or 988b as the driving bit-stream for controlling the inversion function of XOR gate 981.

Subscription show-keys are loaded into the rotating shift register 986 from the microprocessor 913 in the same way to decipher All-Call Word No. 2 (FIG. 9E). The audio BIDN and audio ROM Keys are stored in write-protected areas of SRAM 914 and accessed by the microprocessor 913 for similar processing of Authorization Word No.s 1-3 (FIG. 9A-9C). The Key-1 and Key-2 lines which couple to the key load and shift control 987 of FIG. 11B are used to load four bytes of data into the rotating register to form a full 32-bit wide subscription show-key. There can be more than one subscription show-key circulating in the extra long shift register 986. The shift control unit 987 determines when and which part of a circulating key in long shift register 986 will be loaded into the bit-stream generating units 988a and 988b. The output from XOR gate 981 is coupled back to the microprocessor 913 so that the microprocessor 913 can process various commands included in the transmitted audio frames. The field-personality programs and manufacturing site initialization/test programs (DIT) of microprocessor 913 are listed in Microfiche Appendices B and C.

Figure 11C:
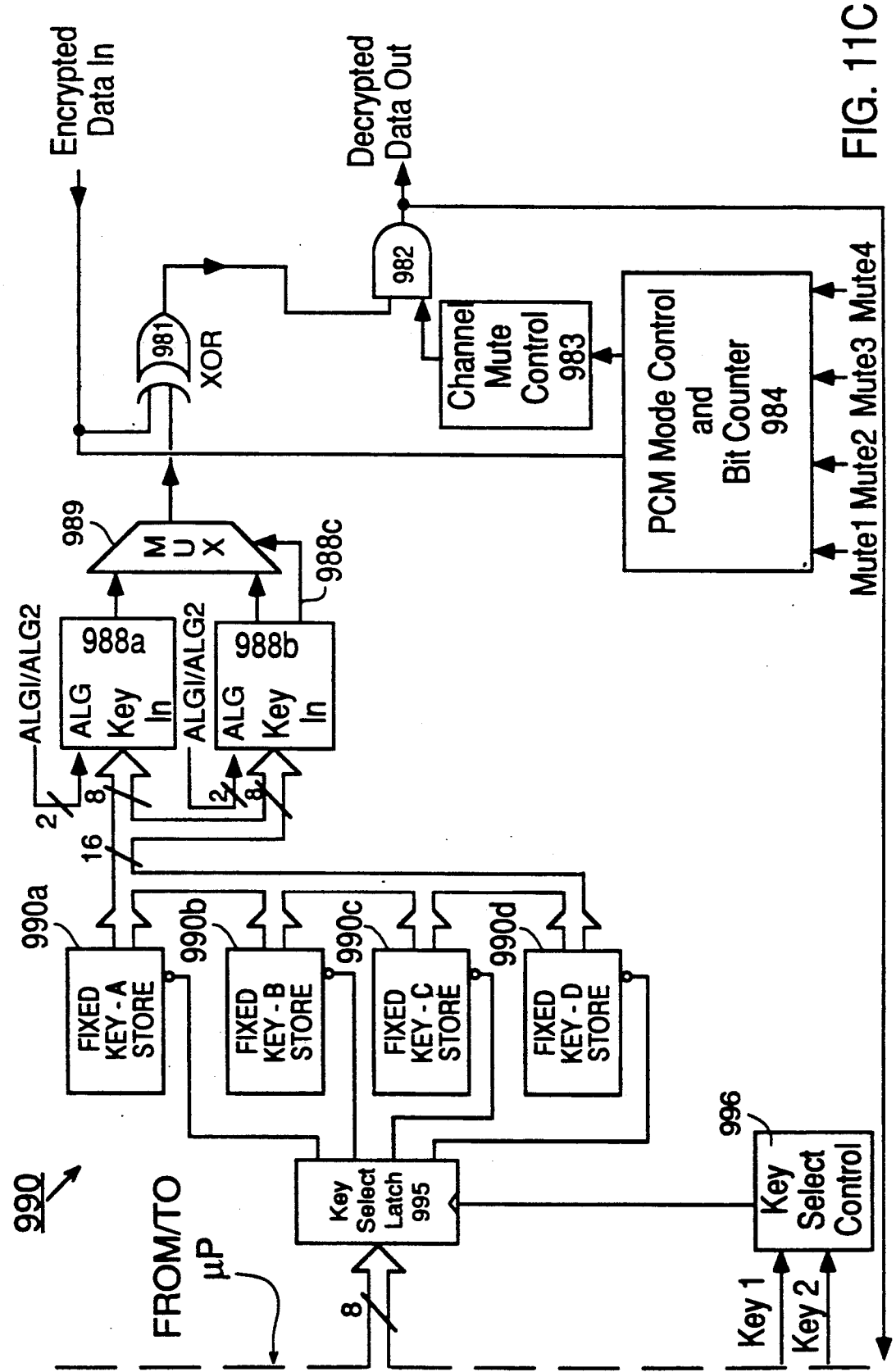
FIG. 11C is a block diagram of a fixed key embodiment.

Referring to FIG. 11C, as an alternate to having a rather lengthy rotating shift register 986 within the PLD 980, fixed decryption keys can be stored within nonreconfigurable storage areas of PLD 980. The fixed-key generating circuits are denoted in FIG. 11C as 990a, 990b, 990 c and 990d. Microprocessor 913 operates a key select latch 995 to pick one of the fixedly stored keys as the active key for transmission to one of stream generating units 988a and 988b. The key select control unit 996 determines when one of the signals sent from microprocessor 913 will be loaded into the key selecting latch 995. An advantage of this embodiment is that less circuit area is required for generating the fixed key circuits 990 as compared to the long shift register 986 of FIG. 11B. The PLD 980' of FIG. 11C can thus be made smaller in size and cost savings are realized.

Many variations to the methodologies described herein will become apparent to those skilled in the art after studying the above disclosure. It is to be accordingly understood that the scope of the inventions claimed hereafter are not to be limited solely to the described embodiments.

What is claimed is:

1. A subscription system decoding unit comprising:
    subscription show-key storing means for storing a plurality of subscription show-keys, selection of a proper one of said show-keys being required to decipher certain received enciphered commands;
    show-key selecting means for selecting one of said subscription show-keys as an active show-key;
    deciphering functions storage means for storing a plurality of deciphering functions;
    function selecting means for selecting one of said deciphering functions as an active function;
    command receiving means for receiving enciphered commands; and
    deciphering means for deciphering said commands according to the active subscription show-key, extracting a deciphering function identification from a deciphered command, and supplying said deciphering function identification to said function selecting means to cause said function selecting means to select an active deciphering function.

2. The decoding unit of claim 1 further comprising a read-only memory (ROM) means within said decoding unit for initially deciphering said enciphered commands to identify said show-key to be selected as an active show-key.

3. The decoding unit of claim 1 wherein scrambled video signals and said enciphered commands are received by said decoding unit, and wherein said active deciphering function is used to descramble said scrambled video signals.

4. The decoding unit of claim 1 wherein contents of said subscription show-key storing means may be modified by a remote transmitter.

5. The decoding unit of claim 1 wherein said subscription show-key storing means also stores a show-ID tag associated with a specific show-key, whereby said enciphered commands identify one of said show-keys as an active show-key by specifying a show-ID value.

6. The decoding unit of claim 1 further comprising a read-only-memory (ROM) means for providing initial deciphering of said enciphered commands and for deciphering an authorization word, said deciphering of said authorization word being based on a deciphering algorithm stored n said ROM and based upon a unique address of said decoding unit, a deciphered authorization word providing information to said decoding unit to manipulate show-key information stored in said subscription show-key storing means for enabling or disabling a decoding unit's ability to properly descramble video signals.

7. A method performed by a subscription system for detecting a deciphering algorithm switch-over command comprising:
    receiving a plurality of switch-over commands, each containing a countdown value, over a period of time;
    detecting whether received countdown values a predetermined sequence;
    ignoring a switch-over command when said predetermined sequence is not followed; and
    switching over to a new deciphering algorithm at a predetermined point in said predetermined sequence.

8. The method of claim 7 further comprising:
    loading a countdown value into a switch-over counter;
    loading a received switch-over command identifying a next deciphering algorithm into a memory means;
    decrementing said counter in response to a periodically transmitted signal; and
    using the contents of said counter to signal a switch-over to a new deciphering algorithm at a predetermined point in a countdown sequence so as to enable switch-over even when one or more switch-over commands received by said decoding unit do not conform to said predetermined sequence.

9. The method of claim 7 wherein said switch-over commands identify a next deciphering algorithm to be implemented and identify a countdown value indicating a time when switch-over to said next deciphering algorithm is to take place, and wherein said next deciphering algorithm is for descrambling a scrambled video signal.

10. A subscriber system including a digital data decrypting system comprising:
    a microprocessor;

a memory means for storing program instructions for said microprocessor;

a volatile programmable logic device, operatively coupled to said microprocessor, in which a digital data decrypting circuit is defined;

a memory means for storing key values;

wherein said microprocessor selects a specific one of said key values, based upon instructions transmitted to said subscriber system, as an active key to be used by said programmable logic device for directly decrypting encrypted data inputted into said programmable logic device.

11. The decrypting system of claim 10 wherein said programmable logic device is a logic array integrated circuit which is connected within said decryption system such that, if a tamper attempt is detected, the contents of said volatile programmable logic device will be erased, and where said programmable logic device has its volatile memory programmed during manufacture of said decrypting system.

* * * * *

REEXAMINATION CERTIFICATE (3119th)

United States Patent [19]

Thompson et al.

[11] B1 5,091,938

[45] Certificate Issued *Feb. 4, 1997

[54] SYSTEM AND METHOD FOR TRANSMITTING ENTERTAINMENT INFORMATION TO AUTHORIZED ONES OF PLURAL RECEIVERS

[75] Inventors: John R. Thompson, La Quinta; C. J. Hunting, Altadena; William L. Phipps, Bermuda Dunes; Steven J. Raynesford, Cathedral City, all of Calif.; Philip H. Rittmueller, St. Charles, Ill.

[73] Assignee: NEC Home Electronics, Ltd., Osaka, Japan

[*] Notice: The term of this patent shall not extend beyond the expiration date of Pat. No. 5,406,627.

Reexamination Request:
No. 90/004,164, Mar. 4, 1996

Reexamination Certificate for:
Patent No.: 5,091,938
Issued: Feb. 25, 1992
Appl. No.: 563,165
Filed: Aug. 6, 1990

[51] Int. Cl.⁶ .............. H04L 9/02; H04N 7/167
[52] U.S. Cl. .............. 380/21; 380/10; 380/28; 380/45; 380/47; 380/20
[58] Field of Search .............. 380/10, 20, 21, 380/28, 44, 45, 47

[56] References Cited

U.S. PATENT DOCUMENTS

| | | |
|---|---|---|
| 2,619,530 | 11/1952 | Roschke . |
| 3,054,857 | 9/1962 | Weiss . |
| 3,668,307 | 6/1972 | Face et al. . |
| 3,684,823 | 8/1972 | McVoy . |
| 3,716,654 | 2/1973 | Hendrickson et al. . |
| 3,733,431 | 5/1973 | Kirk, Jr. et al. . |
| 3,789,131 | 1/1974 | Harney . |
| 4,112,464 | 9/1978 | Guif et al. . |
| 4,193,131 | 3/1980 | Lennon et al. . |
| 4,203,166 | 5/1980 | Ehrsam et al. . |
| 4,222,068 | 9/1980 | Thompson . |
| 4,278,837 | 7/1981 | Best . |
| 4,288,659 | 9/1981 | Atalla . |
| 4,292,650 | 9/1981 | Hendrickson . |
| 4,323,921 | 4/1982 | Guillou . |
| 4,323,922 | 4/1982 | den Toonder et al. . |
| 4,337,483 | 6/1982 | Guillou . |
| 4,348,696 | 9/1982 | Beier . |
| 4,354,201 | 10/1982 | Sechet et al. . |
| 4,388,643 | 6/1983 | Aminetzah . |
| 4,396,947 | 8/1983 | Cheung . |
| 4,424,532 | 1/1984 | den Toonder et al. . |
| 4,460,922 | 7/1984 | Ensinger et al. . |
| 4,464,678 | 8/1984 | Schiff et al. . |
| 4,527,195 | 7/1985 | Cheung . |
| 4,531,020 | 7/1985 | Wechselberger et al. . |
| 4,700,388 | 10/1987 | Okada et al. .............. 380/20 |
| 4,716,588 | 12/1987 | Thompson et al. .............. 380/20 |
| 4,771,458 | 9/1988 | Citta et al. .............. 380/20 |
| 4,890,320 | 12/1989 | Monslow .............. 380/10 |
| 4,965,804 | 10/1990 | Trbovich et al. .............. 380/21 |
| 4,972,472 | 11/1990 | Brown et al. .............. 380/21 |
| 5,008,938 | 4/1991 | Freeburg et al. .............. 380/50 |

FOREIGN PATENT DOCUMENTS

WO83/01881  5/1983  WIPO .

OTHER PUBLICATIONS

T. Yoshino et al, AES 3rd Intl. Conf., pp. 95–99, Jun. 20 1985.

H. Ukai et al, IEEE Intl. Conf. On Consumer Electronics, 1984, pp. 166–167.

*Primary Examiner*—Stephen C. Buczinski

[57] ABSTRACT

An audiovisual subscription system includes means for aperiodically inverting the lines of a transmitted video signal on a frame-by-frame basis and for decrypting encrypted PCM audio information which is transmitted along with the aperiodically inverted video information.

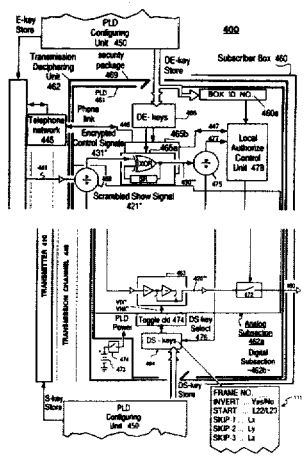

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–11 is confirmed.

Claims 1, 7 are determined to be patentable as amended.

Claims 2–6, 8, 9, dependent on an amended claim, are determined to be patentable.

New claims 12–14 are added and determined to be patentable.

1. A subscription system decoding unit comprising:

subscription show-key storing means for storing a plurality of subscription show-keys, selection of a proper one of said show-keys being required to decipher certain received enciphered commands;

show-key selecting means for selecting one of said subscription show-keys as an active show-key;

deciphering functions storage means [for] storing *at one time* a plurality of deciphering functions;

function selecting means for selecting one of said deciphering functions as an active function;

command receiving means for receiving enciphered commands; and deciphering means for deciphering said commands according to the active subscription show-key, extracting a deciphering function identification from a deciphered command, and supplying said deciphering function identification to said function selecting means to cause said function selecting means to select an active deciphering function.

7. A method performed by a subscription system for detecting a deciphering algorithm switch-over command comprising:

receiving a plurality of switch-over commands, each containing a countdown value, over a period of time;

detecting whether received countdown values *follow* a predetermined sequence;

ignoring a switch-over command when said predetermined sequence is not followed; and switching over to a new deciphering algorithm at a predetermined point in said predetermined sequence.

*12. The decoding unit of claim 1, wherein said plurality of deciphering functions are stored during manufacture of said decoding unit.*

*13. The decrypting system of claim 10, wherein said volatile programmable logic device stores at one time a plurality of decrypting functions.*

*14. The decrypting system of claim 13, wherein said plurality of decrypting functions are stored during manufacture of said decrypting system.*

* * * * *